United States Patent
Kumar et al.

(10) Patent No.: US 9,233,622 B2
(45) Date of Patent: Jan. 12, 2016

(54) SYSTEM AND METHOD FOR MANAGING AN AMOUNT OF STORED ENERGY IN A POWERED SYSTEM

(75) Inventors: Ajith Kuttannair Kumar, Erie, PA (US); Wolfgang Daum, Erie, PA (US); Steven Gray, Erie, PA (US); John Dineen, Erie, PA (US)

(73) Assignee: General Electric Company, Schenectady, NY (US)

( * ) Notice: Subject to any disclaimer, the term of this patent is extended or adjusted under 35 U.S.C. 154(b) by 2212 days.

(21) Appl. No.: 12/137,090

(22) Filed: Jun. 11, 2008

(65) Prior Publication Data

US 2009/0234521 A1 Sep. 17, 2009

Related U.S. Application Data

(60) Provisional application No. 61/035,495, filed on Mar. 11, 2008.

(51) Int. Cl.
| | |
|---|---|
| *B60L 11/18* | (2006.01) |
| *B60L 15/20* | (2006.01) |
| *B60W 10/24* | (2006.01) |
| *B60W 30/14* | (2006.01) |
| *B60W 50/04* | (2006.01) |
| *B60W 50/00* | (2006.01) |

(52) U.S. Cl.
CPC ......... B60L 11/1851 (2013.01); B60L 15/2045 (2013.01); *B60L 2200/26* (2013.01); *B60L 2260/54* (2013.01); *B60W 10/24* (2013.01); *B60W 30/14* (2013.01); *B60W 50/04* (2013.01); *B60W 2050/0062* (2013.01); *Y02T 10/7005* (2013.01); *Y02T 10/705* (2013.01); *Y02T 10/7283* (2013.01)

(58) Field of Classification Search
CPC ............ B60L 11/1851; B60L 15/2045; B60L 2200/26; B60L 2260/54; B60W 10/24; B60W 50/04; B60W 30/14; B60W 2050/0062; Y02T 10/7283; Y02T 10/7005; Y02T 10/705
USPC ...................... 701/22, 25; 180/65.265–65.29; 318/151, 153
See application file for complete search history.

(56) References Cited

U.S. PATENT DOCUMENTS

| | | | |
|---|---|---|---|
| 5,892,346 A | 4/1999 | Moroto et al. | |
| 6,405,818 B1 * | 6/2002 | Anthony et al. | 180/65.8 |

(Continued)

FOREIGN PATENT DOCUMENTS

EP 1 256 476 11/2002

*Primary Examiner* — John Q Nguyen
*Assistant Examiner* — Jordan S Fei
(74) *Attorney, Agent, or Firm* — GE Global Patent Operation; John A. Kramer

(57) ABSTRACT

A system is provided for managing an amount of stored energy in a powered system. The powered system is configured to complete a mission from an initial stage to a final stage. The system includes a controller including a memory configured to store a plurality of handling stages. The controller is configured to determine the stored energy at the initial stage based upon the initial stage and a handling stage positioned between the initial stage and the final stage, and selected from among the plurality of handling stages stored in memory. The stored energy is necessary to propagate the powered system from the initial stage to the handling stage upon the occurrence of an anomaly in the powered system. Additionally, a method and computer readable media are provided for managing an amount of stored energy in a powered system.

24 Claims, 23 Drawing Sheets

(56) References Cited

U.S. PATENT DOCUMENTS

| | | | |
|---|---|---|---|
| 6,946,749 B2* | 9/2005 | Turner | 290/40 C |
| 7,275,610 B2* | 10/2007 | Kuang et al. | 180/65.265 |
| 7,444,944 B2* | 11/2008 | Kumar et al. | 105/26.05 |
| 2005/0206331 A1* | 9/2005 | Donnelly | 318/52 |
| 2005/0228553 A1* | 10/2005 | Tryon | 701/22 |
| 2005/0279242 A1* | 12/2005 | Maier et al. | 105/26.05 |
| 2006/0012320 A1* | 1/2006 | Kumar | 318/376 |
| 2006/0129289 A1 | 6/2006 | Kumar | |
| 2008/0021628 A1* | 1/2008 | Tryon | 701/99 |
| 2008/0288132 A1* | 11/2008 | King et al. | 701/22 |

* cited by examiner

SYSTEM AND METHOD FOR MANAGING AN AMOUNT OF STORED ENERGY IN A POWERED SYSTEM

CROSS-REFERENCE TO RELATED APPLICATIONS

This application claims priority to U.S. Provisional Application No. 61/035,495, filed Mar. 11, 2008.

BACKGROUND OF THE INVENTION

Some powered systems such as, but not limited to, off-highway vehicles, marine vessels and propulsion plants, stationary powered systems, transport vehicles such as transport buses, agricultural vehicles, and rail vehicle systems or trains, are typically powered by one or more power generating units. With respect to rail vehicle systems, a power generation unit is usually a part of at least one locomotive that is powered, for example, by at least one diesel internal combustion engine, and the train further includes a plurality of rail cars, such as freight cars. Usually more than one locomotive is provided for moving the rail cars. Locomotives are complex systems with numerous subsystems, with each subsystem being interdependent on other subsystems.

An operator is usually aboard a locomotive to ensure the proper operation of the locomotive, and when there is a locomotive consist, the operator is usually aboard a lead locomotive. A locomotive consist is a group of locomotives that operate together in operating a train. In addition to ensuring proper operations of the locomotive, or locomotive consist, the operator also is responsible for determining operating speeds of the train and forces within the train that the locomotives are part of. To perform this function, the operator generally must have extensive experience with operating the locomotive and various trains over the specified terrain. This knowledge is needed to comply with prescribeable operating parameters, such as speeds, emissions and the like that may vary with the train location along the track. Moreover, the operator is also responsible for assuring in-train forces remain within acceptable limits.

In marine applications, an operator is usually aboard a marine vessel to ensure the proper operation of the vessel, and when there is a vessel consist, the lead operator/pilot is usually aboard a lead vessel. As with the locomotive example cited above, a vessel consist is a group of vessels that operate together in carrying out a combined mission. In addition to ensuring proper operations of the vessel, or vessel consist, the lead operator also is responsible for determining operating speeds of the consist and forces within the consist that the vessels are part of. To perform this function, the operator generally must have extensive experience with operating the vessel and various consists over the specified waterway or mission. This knowledge is needed to comply with prescribeable operating speeds and other mission parameters that may vary with the vessel location along the mission. Moreover, the operator is also responsible for ensuring that intra-vessel and inter-vessel forces and mission location remain within acceptable limits.

Some powered systems are powered by a power delivery system, such as a diesel engine in a diesel powered locomotive, for example, and a secondary energy source, such as an electrical storage device, for example. Should the power delivery system be degraded, conventional powered systems routinely run the risk of becoming inoperable due to a lack of power/energy capacity. Additionally, once the power delivery system of a locomotive becomes inoperable, conventional powered systems are unable to "limp home" or travel to an upcoming location, such as a siding, for example, in order to prevent blockage of the route, or the track in the case of a train, for example. Additionally, similar degradations may occur to power delivery systems in marine applications, off-highway vehicle (OHV) applications, and stationary generator applications. For example, a propulsion system anomaly or degradation may occur in a marine application. As another example, a brake system anomaly may occur during an OHV operation. As a further example, a thermal anomaly may occur during operation of a stationary generator.

Accordingly, it would be advantageous to provide a system which manages an amount of energy within a secondary energy source of a powered system upon a detected or predicted degradation of a power delivery system, such that the powered system has adequate energy to travel to an upcoming location or to otherwise configure itself in a back-up or secondary mode of operation. For stationary applications, if a degradation occurs in a power delivery system, a sufficient amount of power needs to be supplied so that the loads may be controllably shed, or an amount of power may need to be transferred to a generator so an additional source may be started, for example.

BRIEF DESCRIPTION OF THE INVENTION

One embodiment of the present invention provides a system for managing an amount of stored energy in a powered system. The powered system is configured to complete a mission from an initial stage to a final stage. The system includes a controller including a memory configured to store a plurality of handling stages. The controller is configured to determine the stored energy at the initial stage based upon the initial stage and a handling stage positioned between the initial stage and the final stage, and selected from among the plurality of handling stages stored in memory. The stored energy is necessary to propagate the powered system from the initial stage to the handling stage upon the occurrence of an anomaly in the powered system.

Another embodiment of the present invention provides a method for managing an amount of stored energy in a powered system. The powered system is configured to complete a mission from an initial stage to a final stage. The method includes determining the stored energy at the initial stage based upon the initial stage and a handling stage positioned between the initial stage and the final stage and selected from among the plurality of handling stages. The method further includes propagating the powered system from the initial stage to the handling stage upon the occurrence of an anomaly in the powered system, using the stored energy.

Another embodiment of the present invention provides computer readable media for managing an amount of stored energy in a powered system. The powered system is configured to complete a mission from an initial stage to a final stage. A controller includes a memory configured to store a plurality of handling stages. The computer readable media includes a computer program code for determining the stored energy at the initial stage based upon the initial stage and a handling stage positioned between the initial stage and the final stage and selected from among the plurality of handling stages. The stored energy is necessary to propagate the powered system from the initial stage to the handling stage upon the occurrence of an anomaly in the powered system.

Another embodiment of the present invention provides a method for managing a powered system. The powered system is configured to complete a mission from an initial stage to a final stage. The method includes monitoring the powered system for the occurrence of an anomaly in the powered system. Upon determining that an anomaly has occurred, the method includes propagating the powered system from the initial stage to a handling stage selected from among a plurality of handling stages stored in a memory. The selected handling stage lies subsequent to the initial stage and up to and coincident with the final stage.

Another embodiment of the present invention provides a system for managing an amount of stored energy in a powered system. The powered system is configured to complete a mission from an initial stage to a final stage. The powered system includes a diesel internal combustion engine and a battery system for storing the stored energy. The system includes a controller including a memory configured to store a plurality of handling stages. The controller is configured to determine the stored energy in the battery system at the initial stage based upon the initial stage and a handling stage positioned between the initial stage and the final stage and selected from among the plurality of handling stages stored in the memory. The stored energy is necessary to propagate the powered system from the initial stage to the handling stage upon the occurrence of an anomaly in the diesel internal combustion engine.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which.

DETAILED DESCRIPTION OF THE INVENTION

Figure 1:
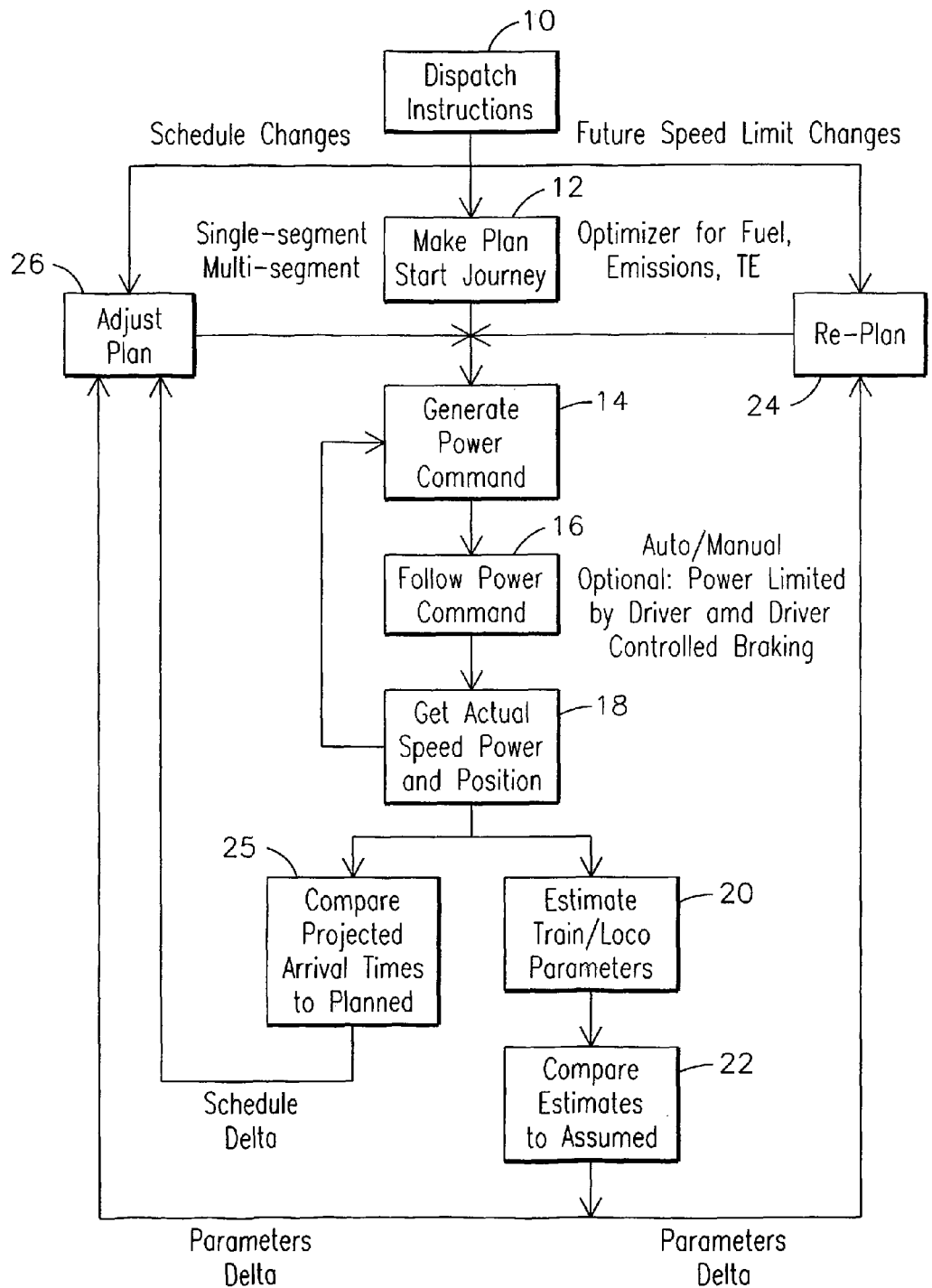
FIG. 1 is a flowchart that depicts a method of trip optimization, according to an embodiment of the present invention.

Reference will now be made in detail to the embodiments consistent with the invention, examples of which are illustrated in the accompanying drawings. Wherever possible, the same reference numerals used throughout the drawings refer to the same or like parts.

Though exemplary embodiments of the present invention are described with respect to rail vehicles, or railway transportation systems, specifically trains and locomotives having diesel engines, exemplary embodiments of the invention are also applicable for other uses, such as but not limited to off-highway vehicles, marine vessels, stationary units, and other vehicles such as agricultural vehicles and transport buses, each which may use at least one diesel engine, or diesel internal combustion engine. Towards this end, when discussing a specified mission, this includes a task or requirement to be performed by the diesel powered system. Therefore, with respect to railway, marine, transport vehicles, agricultural vehicles, or off-highway vehicle applications this may refer to the movement of the system from a present location to a destination. In the case of stationary applications, such as but not limited to a stationary power generating station or network of power generating stations, a specified mission may refer to an amount of wattage (e.g., MW/hr) or other parameter or requirement to be satisfied by the diesel powered system. Likewise, operating conditions of the diesel-fueled power generating unit may include one or more of speed, load, fueling value, timing, and the like. Furthermore, though diesel powered systems are disclosed, those skilled in the art will readily recognize that embodiments of the invention may also be utilized with non-diesel powered systems, such as but not limited to natural gas powered systems, bio-diesel powered systems, etc. Furthermore, as disclosed herein, such non-diesel powered systems, as well as diesel powered systems, may include multiple engines, other power sources, and/or additional power sources, such as, but not limited to, battery sources, voltage sources (such as but not limited to capacitors), chemical sources, pressure based sources (such as but not limited to spring and/or hydraulic expansion), electrical current sources (such as but not limited to inductors), inertial sources (such as but not limited to flywheel devices), gravitational-based power sources, and/or thermal-based power sources.

In one exemplary example involving marine vessels, a plurality of tugs may be operating together where all are moving the same larger vessel, where each tug is linked in time to accomplish the mission of moving the larger vessel. In another exemplary example, a single marine vessel may have a plurality of engines. Off highway vehicle (OHV) applications may involve a fleet of vehicles that have a same mission to move earth, from location A to location B, where each OHV is linked in time to accomplish the mission. With respect to a stationary power generating station, a plurality of stations may be grouped together for collectively generating power for a specific location and/or purpose. In another exemplary embodiment, a single station is provided, but with a plurality of generators making up the single station. In one exemplary example involving locomotive vehicles, a plurality of diesel powered systems may be operated together, where all are moving the same, larger load, e.g., a plurality of rail cars, and where each system is linked in time to accomplish the mission of moving the larger load. In another exemplary embodiment a locomotive vehicle may have more than one diesel powered system.

Exemplary embodiments of the invention solve problems in the art by providing a system, method, and computer implemented method, such as a computer software code, for improving overall fuel efficiency and emissions through optimized power makeup. With respect to locomotives, exemplary embodiments of the present invention are also operable when the locomotive consist is in distributed power operations.

Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, a technical effect is operating a diesel powered system having at least one diesel-fueled power generating unit, such as, but not limited to, by selectively choosing a preferred operating characteristic of the diesel powered system to correspond to a mission objective of the diesel powered system. To facilitate an understanding of the exemplary embodiments of the invention, it is described hereinafter with reference to specific implementations thereof. Exemplary embodiments of the invention may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules include routines, programs, objects, components, data structures, etc. that perform particular tasks or implement particular abstract data types. For example, the software programs that underlie exemplary embodiments of the invention can be coded in different programming languages, for use with different devices, or platforms. In the description that follows, examples of the invention may be described in the context of a web portal that employs a web browser. It will be appreciated, however, that the principles that underlie exemplary embodiments of the invention can be implemented with other types of computer software technologies as well.

Moreover, those skilled in the art will appreciate that exemplary embodiments of the invention may be practiced with other computer system configurations, including hand-held devices, multiprocessor systems, microprocessor-based or programmable consumer electronics, minicomputers, mainframe computers, and the like. Exemplary embodiments of the invention may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the locomotive, or adjacent locomotives in a consist, or off-board in wayside or central offices where wireless communication is used.

Throughout this document the term "locomotive consist" is used. As used herein, a locomotive consist may be described as having one or more locomotives in succession, connected together so as to provide motoring and/or braking capability. The locomotives are connected together where no train cars are in between the locomotives. The train can have more than one locomotive consists in its composition. Specifically, there can be a lead consist and one or more remote consists, such as midway in the line of cars and another remote consist at the end of the train. Each locomotive consist may have a first locomotive and trail locomotive(s). Though a first locomotive is usually viewed as the lead locomotive, those skilled in the art will readily recognize that the first locomotive in a multi locomotive consist may be physically located in a physically trailing position. Though a locomotive consist is usually viewed as involving successive locomotives, those skilled in the art will readily recognize that a consist group of locomotives may also be recognized as a consist even when one or more rail cars separate the locomotives, such as when the locomotive consist is configured for distributed power operation, wherein throttle and braking commands are relayed from the lead locomotive to the remote trains by a radio link or physical cable. Towards this end, the term locomotive consist should be not be considered a limiting factor when discussing multiple locomotives within the same train.

As disclosed herein, the idea of a consist may also be applicable when referring to other types of diesel powered systems, including, but not limited to, marine vessels, off-highway vehicles, and/or stationary power plants, that operate together so as to provide motoring, power generation, and/or braking capability. Therefore, even though the term locomotive consist is used herein in regards to certain illustrative embodiments, this term may also apply to other powered systems. Similarly, sub-consists may exist. For example, the diesel powered system may have more than one diesel-fueled power generating unit. For example, a power plant may have more than one diesel electric power unit where optimization may be at the sub-consist level. Likewise, a locomotive may have more than one diesel power unit.

Referring now to the drawings, embodiments of the present invention will be described. Exemplary embodiments of the invention can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the invention are discussed below.

FIG. 1 depicts an exemplary illustration of a flow chart for trip optimization. As illustrated, instructions are input specific to planning a trip either on board or from a remote location, such as a dispatch center 10. Such input information includes, but is not limited to, train position, consist description (such as locomotive models), locomotive power description, performance of locomotive traction transmission, consumption of engine fuel as a function of output power, cooling characteristics, the intended trip route (including information relating to effective track grade and curvature as function of milepost, and/or an "effective grade" component to reflect curvature following standard railroad practices), the train represented by car makeup and loading together with effective drag coefficients, trip desired parameters including, but not limited to, start time and location, end location, desired travel time, crew (user and/or operator) identification, crew shift expiration time, and route.

This data may be provided to the locomotive 42 in a number of ways, such as, but not limited to, an operator manually entering this data into the locomotive 42 via an onboard display, inserting a memory device such as a hard card and/or USB drive containing the data into a receptacle aboard the locomotive, and transmitting the information via wireless communication from a central or wayside location 41, such as a track signaling device and/or a wayside device, to the locomotive 42. Locomotive 42 and train 31 load characteristics (e.g., drag) may also change over the route (e.g., with altitude, ambient temperature and condition of the rails and rail-cars), and the plan may be updated to reflect such changes as needed by any of the methods discussed above and/or by real-time autonomous collection of locomotive/train conditions. This includes for example, changes in locomotive or train characteristics detected by monitoring equipment on or off board the locomotive(s) 42.

The track signal system determines the allowable speed of the train. There are many types of track signal systems and operating rules associated with each of the signals. For example, some signals have a single light (on/off), some signals have a single lens with multiple colors, and some signals have multiple lights and colors. These signals can indicate that the track is clear and the train may proceed at a maximum allowable speed. They can also indicate that a reduced speed or stop is required. This reduced speed may need to be achieved immediately, or at a certain location (e.g., prior to the next signal or crossing).

The signal status is communicated to the train and/or operator through various means. Some systems have circuits in the track and inductive pick-up coils on the locomotives. Other systems have wireless communications systems. Signal systems can also require the operator to visually inspect the signal and take the appropriate actions.

The track signaling system may interface with the onboard signal system and adjust the locomotive speed according to the inputs and the appropriate operating rules. For signal systems that require the operator to visually inspect the signal status, the operator screen will present the appropriate signal options for the operator to enter based on the train's location. The type of signal systems and operating rules, as a function of location, may be stored in an onboard database 63.

Based on the specification data input into the exemplary embodiment of the present invention, an optimal plan which minimizes fuel use and/or emissions produced subject to speed limit constraints along the route with desired start and end times is computed to produce a trip profile 12. The profile contains the optimal speed and power (notch) settings the train is to follow, expressed as a function of distance and/or time, and such train operating limits, including but not limited to, the maximum notch power and brake settings, and speed limits as a function of location, and the expected fuel used and emissions generated. In an exemplary embodiment, the value for the notch setting is selected to obtain throttle change decisions about once every 10 to 30 seconds. Those skilled in the art will readily recognize that the throttle change decisions may occur at a longer or shorter duration, if needed and/or desired to follow an optimal speed profile. In a broader sense, it should be evident to ones skilled in the art that the profiles provide power settings for the train, either at the train level, consist level, and/or individual train level. Power comprises braking power, motoring power, and airbrake power. In another preferred embodiment, instead of operating at the traditional discrete notch power settings, the exemplary embodiment of the present invention is able to select a continuous power setting determined as optimal for the profile selected. Thus, for example, if an optimal profile specifies a notch setting of 6.8, instead of operating at notch setting 7 (assuming discreet notch setting of, e.g., 6, 7, 8, and so on), the locomotive 42 can operate at 6.8. Allowing such intermediate power settings may bring additional efficiency benefits as described below.

The procedure used to compute the optimal profile can be any number of methods for computing a power sequence that drives the train 31 to minimize fuel and/or emissions subject to locomotive operating and schedule constraints, as summarized below. In some cases the required optimal profile may be close enough to one previously determined, owing to the similarity of the train configuration, route and environmental conditions. In these cases it may be sufficient to look up the driving trajectory within a database 63 and attempt to follow it. When no previously computed plan is suitable, methods to compute a new one include, but are not limited to, direct calculation of the optimal profile using differential equation models which approximate the train physics of motion. The setup involves selection of a quantitative objective function, commonly a weighted sum (integral) of model variables that correspond to rate of fuel consumption and emissions generation plus a term to penalize excessive throttle variation.

An optimal control formulation is set up to minimize the quantitative objective function subject to constraints including but not limited to, speed limits and minimum and maximum power (throttle) settings and maximum cumulative and instantaneous emissions. Depending on planning objectives at any time, the problem may be implemented flexibly to minimize fuel subject to constraints on emissions and speed limits, or to minimize emissions, subject to constraints on fuel use and arrival time. It is also possible to establish, for example, a goal to minimize the total travel time without constraints on total emissions or fuel use where such relaxation of constraints would be permitted or required for the mission.

Throughout the document exemplary equations and objective functions are presented for minimizing locomotive fuel consumption. These equations and functions are for illustration only as other equations and objective functions can be employed to optimize fuel consumption or to optimize other locomotive/train operating parameters.

Mathematically, the problem to be solved may be stated more precisely. The basic physics are expressed by:

$$\frac{dx}{dt} = v; x(0) = 0.0; x(T_f) = D$$

$$\frac{dv}{dt} = T_e(u, v) - G_a(x) - R(v); v(0) = 0.0; v(T_f) = 0.0$$

Where x is the position of the train, v its velocity and t is time (in miles, miles per hour, and minutes or hours, as appropriate) and u is the notch (throttle) command input. Further, D denotes the distance to be traveled, $T_f$ the desired arrival time at distance D along the track, $T_e$ is the tractive effort produced by the locomotive consist, $G_a$ is the gravitational drag which depends on the train length, train makeup, and terrain on which the train is located, and R is the net speed dependent drag of the locomotive consist and train combination. The initial and final speeds can also be specified, but without loss of generality are taken to be zero here (e.g., train stopped at beginning and end). Finally, the model is readily modified to include other important dynamics such the lag between a change in throttle, u, and the resulting tractive effort or braking. Using this model, an optimal control formulation is set up to minimize the quantitative objective function subject to constraints including but not limited to, speed limits and minimum and maximum power (throttle) settings. Depending on planning objectives at any time, the problem may be set up flexibly to minimize fuel subject to constraints on emissions and speed limits, or to minimize emissions, subject to constraints on fuel use and arrival time.

It is also possible to implement, for example, a goal to minimize the total travel time without constraints on total emissions or fuel use where such relaxation of constraints would be permitted or required for the mission. All these performance measures can be expressed as a linear combination of any of the following:

$$\min_{u(t)} \int_0^{T_f} F(u(t))\,dt\text{-Minimize total fuel consumption} \quad (1)$$

$$\min_{u(t)} T_f\text{-Minimize Travel Time}$$

$$\min_{u_i} \sum_{i=2}^{n_d} (u_i - u_{i-1})^2\text{-}$$

Minimize notch jockeying (piecewise constant input)

$$\min_{u(t)} \int_0^{T_f} (du/dt)^2\,dt\text{-}$$

Minimize notch jockeying(continuous input)

Replace the fuel term F in (1) with a term corresponding to emissions production. For example for emissions $$\min_{u(t)} \int_0^{T_f} E(u(t))\,dt\text{-Minimize total emissions production}$$

In this equation E is the quantity of emissions in gm/hphr for each of the notches (or power settings). In addition a minimization could be done based on a weighted total of fuel and emissions.

A commonly used and representative objective function is thus:

$$\min_{u(t)} \alpha_1 \int_0^{T_f} F(u(t))\,dt + \alpha_3 T_f + \alpha_2 \int_0^{T_f} (du/dt)^2\,dt \quad (OP)$$

The coefficients of the linear combination depend on the importance (weight) given to each of the terms. Note that in equation (OP), u(t) is the optimizing variable that is the continuous notch position. If discrete notch is required, e.g. for older locomotives, the solution to equation (OP) is discretized, which may result in lower fuel savings. Finding a minimum time solution ($\alpha_1$ set to zero and $\alpha_2$ set to zero or a relatively small value) is used to find a lower bound for the achievable travel time ($T_f = T_{fmin}$). In this case, both u(t) and $T_f$ are optimizing variables. In one embodiment, equation (OP) is solved for various values of $T_f$ with $T_f > T_{fmin}$ with $\alpha_3$ set to zero. In this latter case, $T_f$ is treated as a constraint.

For those familiar with solutions to such optimal problems, it may be necessary to adjoin constraints, e.g. the speed limits along the path:

$$0 \leq v \leq SL(x) \qquad \text{i.}$$

or when using minimum time as the objective, that an end point constraint must hold, e.g., total fuel consumed must be less than what is in the tank, e.g. via:

$$0 < \int_0^{T_f} F(u(t))dt \leq W_F \qquad \text{ii.}$$

Here, $W_F$ is the fuel remaining in the tank at $T_f$. Those skilled in the art will readily recognize that equation (OP) can be in other forms as well and that what is presented above is an exemplary equation for use in the exemplary embodiment of the present invention. For example, those skilled in the art will readily recognize that a variation of equation (OP) is required where multiple power systems, diesel and/or non-diesel, are used to provide multiple thrusters, such as, but not limited to, those that may be used when operating a marine vessel.

Reference to emissions in the context of the exemplary embodiment of the present invention is actually directed towards cumulative emissions produced in the form of oxides of nitrogen (NOx), carbon oxides (COX), unburned hydrocarbons (HC), and particulate matter (PM), etc. However, other emissions may include, but not be limited to a maximum value of electromagnetic emission, such as a limit on radio frequency (RF) power output, measured in watts, for respective frequencies emitted by the locomotive. Yet another form of emission is the noise produced by the locomotive, typically measured in decibels (dB). An emission requirement may be variable based on a time of day, a time of year, and/or atmospheric conditions such as weather or pollutant level in the atmosphere. Emission regulations may vary geographically across a railroad system. For example, an operating area such as a city or state may have specified emission objectives, and an adjacent area may have different emission objectives, for example a lower amount of allowed emissions or a higher fee charged for a given level of emissions.

Accordingly, an emission profile for a certain geographic area may be tailored to include maximum emission values for each of the regulated emissions included in the profile to meet a predetermined emission objective required for that area. Typically, for a locomotive, these emission parameters are determined by, but not limited to, the power (notch) setting, ambient conditions, and engine control method. By design, every locomotive must be compliant with EPA emission standards, and thus in an embodiment of the present invention that optimizes emissions this may refer to mission-total emissions, for which there is no current EPA specification. Operation of the locomotive according to the optimized trip plan is at all times compliant with EPA emission standards. Those skilled in the art will readily recognize that because diesel engines are used in other applications, other regulations may also be applicable. For example, $CO_2$ emissions are considered in certain international treaties.

If a key objective during a trip mission is to reduce emissions, the optimal control formulation, equation (OP), would be amended to consider this trip objective. A key flexibility in the optimization setup is that any or all of the trip objectives can vary by geographic region or mission. For example, for a high priority train, minimum time may be the only objective on one route because it is high priority traffic. In another example emission output could vary from state to state along the planned train route.

To solve the resulting optimization problem, in an exemplary embodiment the present invention transcribes a dynamic optimal control problem in the time domain to an equivalent static mathematical programming problem with N decision variables, where the number 'N' depends on the frequency at which throttle and braking adjustments are made and the duration of the trip. For typical problems, this N can be in the thousands. For example, in an exemplary embodiment, suppose a train is traveling a 172-mile stretch of track in the southwest United States. Utilizing the exemplary embodiment of the present invention, an exemplary 7.6% saving in fuel used may be realized when comparing a trip determined and followed using the exemplary embodiment of the present invention versus an actual driver throttle/speed history where the trip was determined by an operator. The improved savings is realized because the optimization realized by using the exemplary embodiment of the present invention produces a driving strategy with both less drag loss and little or no braking loss compared to the trip plan of the operator.

Figure 2:
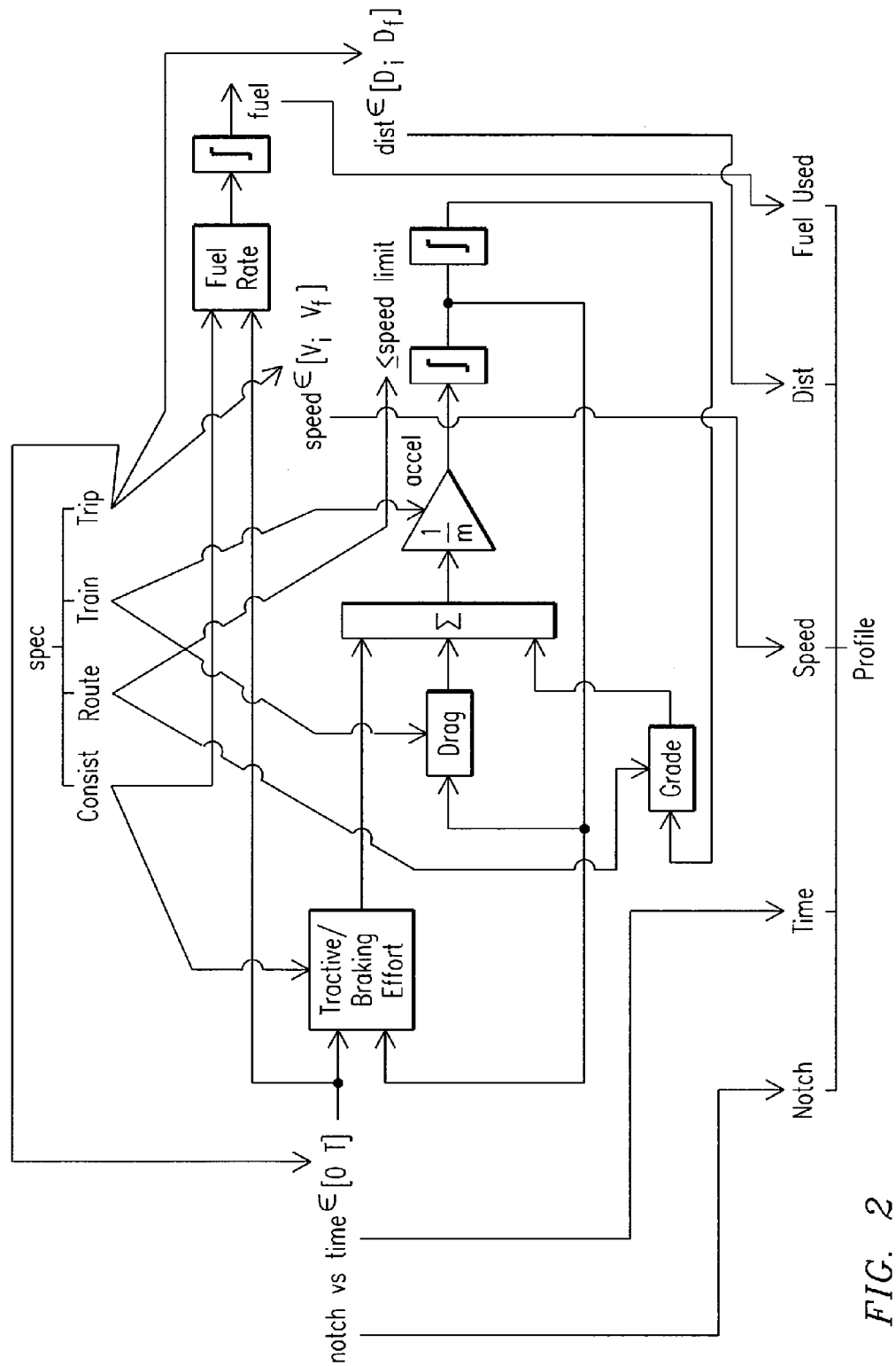
FIG. 2 depicts a simplified mathematical model of a train that may be employed in connection with an embodiment of the present invention.

To make the optimization described above computationally tractable, a simplified mathematical model of the train may be employed, such as illustrated in FIG. 2 and the equations discussed above. As illustrated, certain set specifications, such as but not limited to information about the consist, route information, train information, and/or trip information, are considered to determine a profile, preferably an optimized profile. Such factors included in the profile include, but are not limited to, speed, distance remaining in the mission, and/or fuel used. As disclosed herein, other factors that may be included in the profile are notch setting and time. One possible refinement to the optimal profile is produced by driving a more detailed model with the optimal power sequence generated, to test if other thermal, electrical, and mechanical constraints are violated. This leads to a modified profile with speed versus distance that is closest to a run that can be achieved without harming locomotive or train equipment, i.e., satisfying additional implied constraints such as thermal and electrical limits on the locomotive and inter-car forces in the train. Those skilled in the art will readily recognize how the equations discussed herein are utilized with FIG. 2.

Referring back to FIG. 1, once the trip is started 12, power commands are generated 14 to put the plan in motion. Depending on the operational set-up of the exemplary embodiment of the present invention, one command is for the locomotive to follow the optimized power command 16 so as to achieve the optimal speed. The exemplary embodiment of the present invention obtains actual speed and power information from the locomotive consist of the train 18. Owing to the inevitable approximations in the models used for the optimization, a closed-loop calculation of corrections to optimized power is obtained to track the desired optimal speed. Such corrections of train operating limits can be made automatically or by the operator, who always has ultimate control of the train.

In some cases, the model used in the optimization may differ significantly from the actual train. This can occur for many reasons, including, but not limited to, extra cargo pick-ups or setouts, locomotives that may become inoperable in route, and errors in the initial database 63 or data entry by the operator. For these reasons a monitoring system is in place that uses real-time train data to estimate locomotive and/or train parameters in real time 20. The estimated parameters are then compared to the assumed parameters used when the trip was initially created 22. Based on any differences in the assumed and estimated values, the trip may be re-planned 24, should large enough savings accrue from a new plan.

Other reasons a trip may be re-planned include directives from a remote location, such as dispatch, and/or the operator requesting a change in objectives to be consistent with more global movement planning objectives. Additional global movement planning objectives may include, but are not limited to, other train schedules, allowing exhaust to dissipate from a tunnel, maintenance operations, etc. Another reason may be due to an onboard degradation of a component. Strategies for re-planning may be grouped into incremental and major adjustments depending on the severity of the disruption, as discussed in more detail below. In general, a "new" plan must be derived from a solution to the optimization problem equation (OP) described above, but frequently faster approximate solutions can be found, as described herein.

Figure 4:
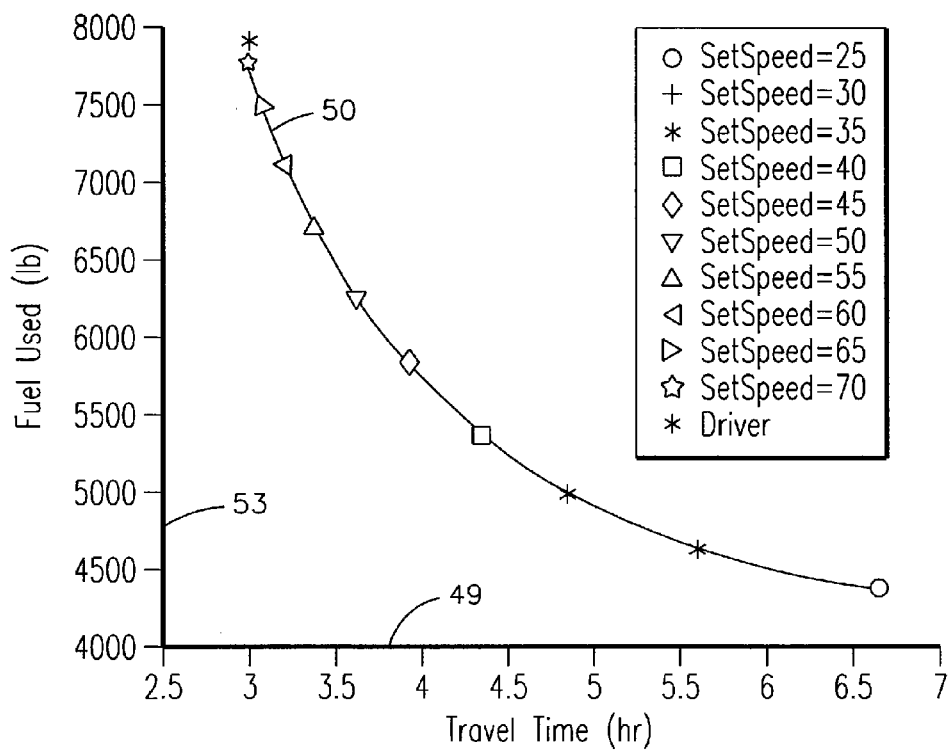
FIG. 4 depicts an exemplary embodiment of a fuel-use/travel time curve.

In operation, the locomotive 42 will continuously monitor system efficiency and continuously update the trip plan based on the actual efficiency measured, whenever such an update would improve trip performance. Re-planning computations may be carried out entirely within the locomotive(s) or fully or partially moved to a remote location, such as dispatch or wayside processing facilities where wireless technology is used to communicate the plans to the locomotive 42. The exemplary embodiment of the present invention may also generate efficiency trends that can be used to develop locomotive fleet data regarding efficiency transfer functions. The fleet-wide data may be used when determining the initial trip plan, and may be used for network-wide optimization tradeoff when considering locations of a plurality of trains. For example, the travel-time fuel use tradeoff curve as illustrated in FIG. 4 reflects a capability of a train on a particular route at a current time, updated from ensemble averages collected for many similar trains on the same route. Thus, a central dispatch facility collecting curves like FIG. 4 from many locomotives could use that information to better coordinate overall train movements to achieve a system-wide advantage in fuel use or throughput. As disclosed above, those skilled in the art will recognize that various fuel types, such as but not limited to diesel fuel, heavy marine fuels, palm oil, bio-diesel, etc., may be used.

Furthermore, as disclosed above, those skilled in the art will recognize that various energy storage devices may be used. For example, the amount of power withdrawn from a particular source, such as a diesel engine and batteries, could be optimized so that the maximum fuel efficiency/emission, which may be an objective function, is obtained. As further illustration, suppose the total power demand is 2000 horse power (HP), where the batteries can supply 1500 HP and the engine can supply 4400 HP. The optimum point could be when batteries are supplying 1200 HP and engine is supplying 200 HP.

Similarly, the amount of power may also be based on the amount of energy stored and the need for the energy in the future. For example, if there is a long high demand coming for power, the battery could be discharged at a slower rate. For example, if 1000 horsepower hour (HPhr) is stored in the battery and the demand is 4400 HP for the next 2 hours, it may be optimum to discharge the battery at 800 HP for the next 1.25 hours and take 3600 HP from the engine for that duration.

Many events in daily operations can lead to a need to generate or modify a currently executing plan, where it desired to keep the same trip objectives, for example when a train is not on schedule for planned meet or pass with another train and it needs to make up time. Using the actual speed, power and location of the locomotive, a comparison is made between a planned arrival time and the currently estimated (predicted) arrival time 25. Based on a difference in the times, as well as the difference in parameters (detected or changed by dispatch or the operator), the plan is adjusted 26. This adjustment may be made automatically according to a railroad company's desire for how such departures from plan should be handled, or alternatives may be manually proposed for the on-board operator and dispatcher to jointly decide the best way to get back on plan. Whenever a plan is updated, in the case where the original objectives (such as, but not limited to, arrival time) remain the same, additional changes may be factored in concurrently, e.g., new future speed limit changes, which could affect the feasibility of ever recovering the original plan. In such instances, if the original trip plan cannot be maintained, or in other words the train is unable to meet the original trip plan objectives, as discussed herein other trip plan(s) may be presented to the operator and/or remote facility, or dispatch.

A re-plan may also be made when it is desired to change the original objectives. Such re-planning can be done at either fixed preplanned times, manually at the discretion of the operator or dispatcher, or autonomously when predefined limits, such as train operating limits, are exceeded. For example, if the current plan execution is running late by more than a specified threshold, such as tirty minutes, the exemplary embodiment of the present invention can re-plan the trip to accommodate the delay at the expense of increased fuel use, as described above, or to alert the operator and dispatcher how much of the time can be made up at all (i.e., what minimum time to go or the maximum fuel that can be saved within a time constraint). Other triggers for re-plan can also be envisioned based on fuel consumed or the health of the power consist, including but not limited time of arrival, loss of horsepower due to equipment degradation (such as operating too hot or too cold), and/or detection of gross setup errors, such as in the assumed train load. That is, if the change reflects impairment in the locomotive performance for the current trip, these may be factored into the models and/or equations used in the optimization.

Changes in plan objectives can also arise from a need to coordinate events where the plan for one train compromises the ability of another train to meet objectives and arbitration at a different level, e.g., the dispatch office, is required. For example, the coordination of meets and passes may be further optimized through train-to-train communications. Thus, as an example, if a train knows that it is behind schedule in reaching a location for a meet and/or pass, communications from the other train can notify the late train (and/or dispatch). The operator can then enter information pertaining to being late into the exemplary embodiment of the present invention, wherein the exemplary embodiment will recalculate the train's trip plan. The exemplary embodiment of the present invention can also be used at a high level, or network level, to allow a dispatch to determine which train should slow down or speed up should it be the case that a scheduled meet and/or pass time constraint may not be met. As discussed herein, this is accomplished by trains transmitting data to the dispatch to prioritize how each train should change its planning objective. A choice could be based on either schedule or fuel saving benefits, depending on the situation.

Figure 5:
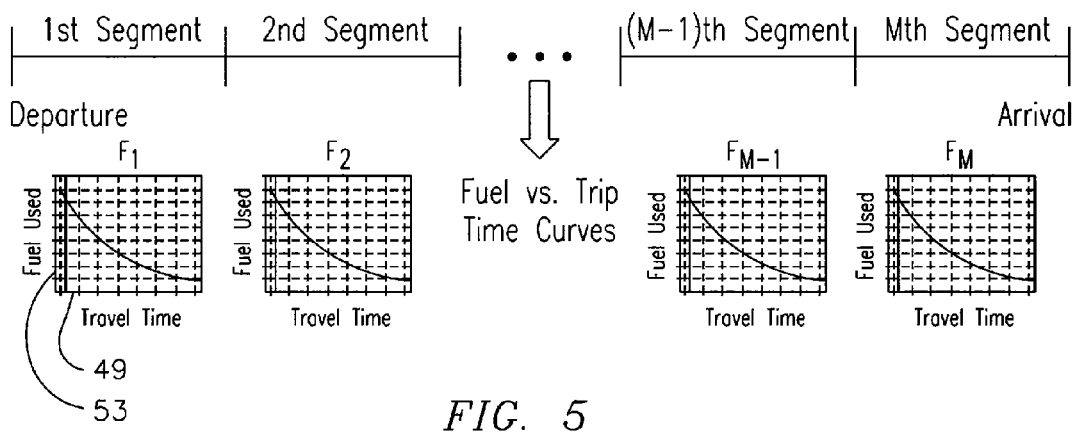
FIG. 5 depicts an exemplary embodiment of a segmentation decomposition for trip planning.

For any of the manually or automatically initiated re-plans, exemplary embodiments of the present invention may present more than one trip plan to the operator. In an exemplary embodiment the present invention will present different profiles to the operator, allowing the operator to select the arrival time and understand the corresponding fuel and/or emission impact. Such information can also be provided to the dispatch for similar consideration, either as a simple list of alternatives or as a plurality of tradeoff curves such as illustrated in FIG. 5.

The exemplary embodiment of the present invention has the ability to learn and adapted to key changes in the train and power consist, which can be incorporated either in the current plan and/or in future plans. For example, one of the triggers discussed above is loss of horsepower. When building up horsepower over time, either after a loss of horsepower or when beginning a trip, transition logic is utilized to determine when desired horsepower is achieved. This information can be saved in the locomotive database 61 for use in optimizing either future trips or the current trip should loss of horsepower occur again.

Likewise, in a similar fashion where multiple thrusters are available, each may need to be independently controlled. For example, a marine vessel may have many force producing elements, or thrusters, such as but not limited to propellers. Each propeller may need to be independently controlled to produce the optimum output. Therefore, utilizing transition logic, the trip optimizer may determine which propeller to operate based on what has been learned previously and by adapting to key changes in the marine vessel's operation.

Figure 3:
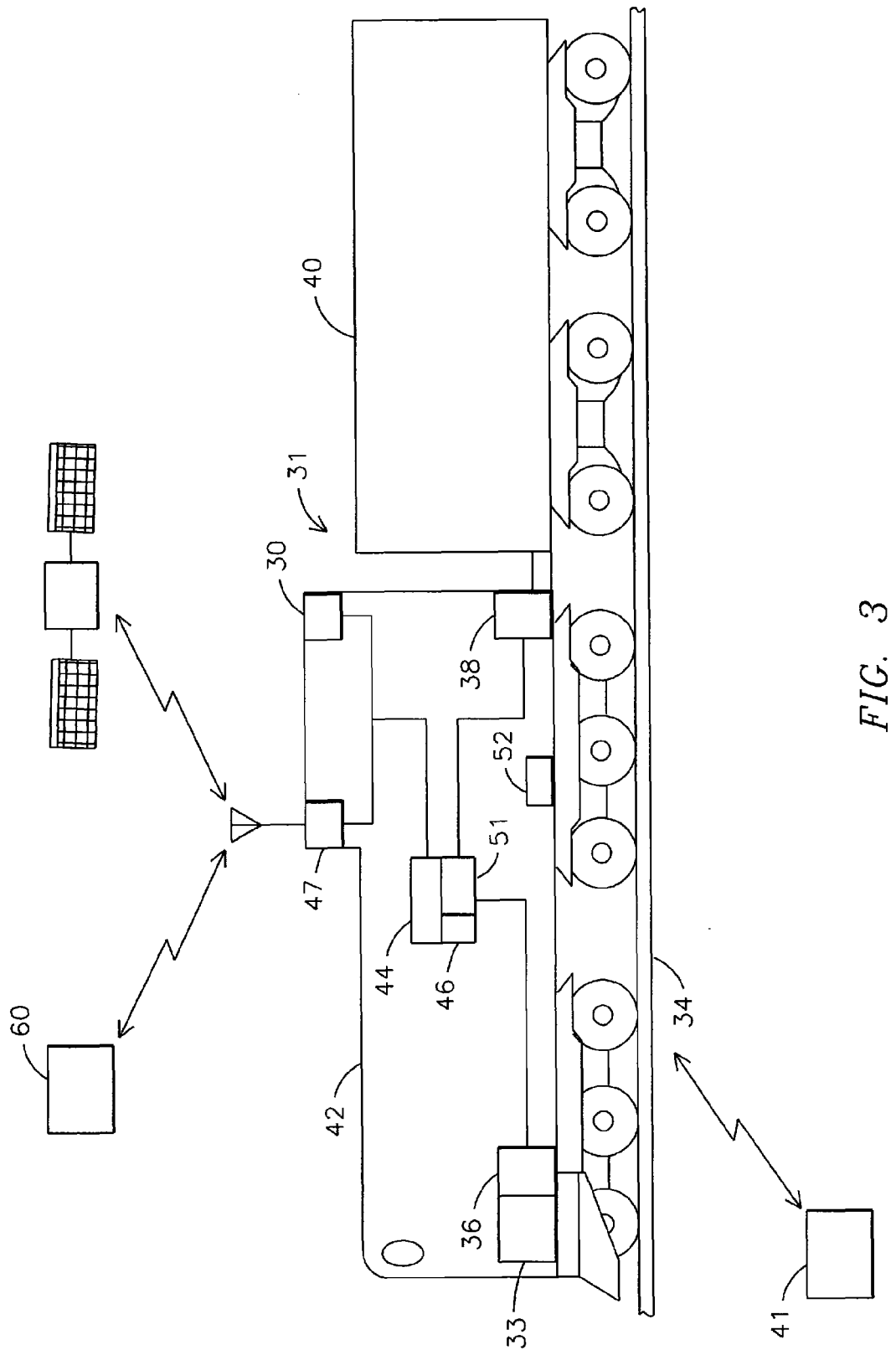
FIG. 3 depicts an exemplary embodiment of elements for trip optimization.

FIG. 3 depicts various elements that may part of an exemplary trip optimizer system, according to an embodiment of the invention. A locator element 30 to determine a location of the train 31 is provided. The locator element 30 can be a GPS sensor, or a system of sensors, that determines a location of the train 31. Examples of such other systems include, but are not limited to, wayside devices, such as radio frequency automatic equipment identification (RF AEI) tags, dispatch, and/or video determination. Another system may include the tachometer(s) aboard a locomotive and distance calculations from a reference point. As discussed previously, a wireless communication system 47 may also be provided to allow for communications between trains and/or with a remote location, such as dispatch. Information about travel locations may also be transferred from other trains.

A track characterization element 33 to provide information about a track, principally grade and elevation and curvature information, is also provided. The track characterization element 33 may include an on-board track integrity database 36. Sensors 38 are used to measure a tractive effort 40 being hauled by the locomotive 42, throttle setting of the locomotive consist 42, locomotive consist 42 configuration information, speed of the locomotive consist 42, individual locomotive configuration, individual locomotive capability, etc. In an exemplary embodiment the locomotive consist 42 configuration information may be loaded without the use of a sensor 38, but is input in other manners as discussed above. Furthermore, the health of the locomotives in the consist may also be considered. For example, if one locomotive in the consist is unable to operate above power notch level 5, this information is used when optimizing the trip plan.

Information from the locator element may also be used to determine an appropriate arrival time of the train 31. For example, if there is a train 31 moving along a track 34 towards a destination and no train is following behind it, and the train has no fixed arrival deadline to adhere to, the locator element, including, but not limited to, RF AEI tags, dispatch, and/or video determination, may be used to gage the exact location of the train 31. Furthermore, inputs from these signaling systems may be used to adjust the train speed. Using the on-board track database, discussed below, and the locator element, such as GPS, the exemplary embodiment of the present invention can adjust the operator interface to reflect the signaling system state at the given locomotive location. In a situation where signal states would indicate restrictive speeds ahead, the planner may elect to slow the train to conserve fuel consumption.

Information from the locator element 30 may also be used to change planning objectives as a function of distance to destination. For example, owing to inevitable uncertainties about congestion along the route, "faster" time objectives on the early part of a route may be employed as a hedge against delays that statistically occur later. If it happens on a particular trip that delays do not occur, the objectives on a latter part of the journey can be modified to exploit the built-in slack time that was banked earlier, and thereby recover some fuel efficiency. A similar strategy could be invoked with respect to emissions restrictive objectives, e.g., approaching an urban area.

As an example of the hedging strategy, if a trip is planned from New York to Chicago, the system may have an option to operate the train slower at either the beginning of the trip or at the middle of the trip or at the end of the trip. The exemplary embodiment of the present invention would optimize the trip plan to allow for slower operation at the end of the trip since unknown constraints, such as, but not limited to, weather conditions, and track maintenance, may develop and become known during the trip. As another consideration, if traditionally congested areas are known, the plan is developed with an option to have more flexibility around these traditionally congested regions. Therefore, the exemplary embodiment of the present invention may also consider weighting/penalty as a function of time/distance into the future and/or based on known/past experience. Those skilled in the art will readily recognize that such planning and re-planning to take into consideration weather conditions, track conditions, other trains on the track, etc., may be taken into consideration at any time during the trip wherein the trip plan is adjust accordingly.

FIG. 3 further discloses other elements that may be part of the exemplary embodiment of the present invention. A processor 44 is provided that is operable to receive information from the locator element 30, track characterization element 33, and sensors 38. An algorithm 46 operates within the processor 44. The algorithm 46 is used to compute an optimized trip plan based on parameters involving the locomotive 42, train 31, track 34, and objectives of the mission as described above. In an exemplary embodiment, the trip plan is established based on models for train behavior as the train 31 moves along the track 34 as a solution of non-linear differential equations derived from physics with simplifying assumptions that are provided in the algorithm. The algorithm 46 has access to the information from the locator element 30, track characterizing element 33, and/or sensors 38 to create a trip plan minimizing fuel consumption of a locomotive consist 42, minimizing emissions of a locomotive consist 42, establishing a desired trip time, and/or ensuring proper crew operating time aboard the locomotive consist 42. In an exemplary embodiment, a controller element 51 (and/or driver or operator) is also provided. As discussed herein, the controller element 51 is used for controlling the train as it follows the trip plan. In an exemplary embodiment discussed further herein, the controller element 51 makes train operation decisions autonomously. In another exemplary embodiment, the operator may be involved with directing the train to follow the trip plan.

A feature of the exemplary embodiment of the present invention is the ability to initially create and quickly modify "on the fly" any plan that is being executed. This includes creating the initial plan when a long distance is involved, owing to the complexity of the plan optimization algorithm. When a total length of a trip profile exceeds a given distance, an algorithm 46 may be used to segment the mission, wherein the mission may be divided by waypoints. Though only a single algorithm 46 is discussed, those skilled in the art will readily recognize that more than one algorithm may be used (and/or that the same algorithm may be executed a plurality of times) where the algorithms may be connected together. The waypoints may include natural locations where the train 31 stops, such as, but not limited to, sidings where a meet with opposing traffic (or pass with a train behind the current train) is scheduled to occur on a single-track rail, or at yard sidings or industry where cars are to be picked up and set out, and locations of planned work. At such waypoints, the train 31 may be required to be at the location at a scheduled time and be stopped or moving with speed in a specified range. The time duration from arrival to departure at waypoints is called "dwell time."

In an exemplary embodiment, the present invention is able to break down a longer trip into smaller segments in a special systematic way. Each segment can be somewhat arbitrary in length, but is typically picked at a natural location such as a stop or significant speed restriction, or at key mileposts that define junctions with other routes. Given a partition, or segment, selected in this way, a driving profile is created for each segment of track as a function of travel time taken as an independent variable, such as shown in FIG. 4. The fuel used/travel-time tradeoff associated with each segment can be computed prior to the train 31 reaching that segment of track. A total trip plan can be created from the driving profiles created for each segment. The exemplary embodiment of the invention distributes travel time amongst all the segments of the trip in an optimal way so that the total trip time required is satisfied and total fuel consumed over all the segments is as small as possible. An exemplary three-segment trip is disclosed in FIG. 6 and discussed below. Those skilled in the art will recognize, however, that although segments are discussed, the trip plan may comprise a single segment representing the complete trip.

FIG. 4 depicts an exemplary embodiment of a fuel-use/travel time curve 50. As mentioned previously, such a curve 50 is created when calculating an optimal trip profile for various travel times for each segment. That is, for a given travel time 49, fuel used 53 is the result of a detailed driving profile computed as described above. Once travel times for each segment are allocated, a power/speed plan is determined for each segment from the previously computed solutions. If there are any waypoint constraints on speed between the segments, such as, but not limited to, a change in a speed limit, they are matched up during creation of the optimal trip profile. If speed restrictions change in only a single segment, the fuel use/travel-time curve 50 has to be re-computed for only the segment changed. This reduces time for having to re-calculate more parts, or segments, of the trip. If the locomotive consist or train changes significantly along the route, e.g., from loss of a locomotive or pickup or set-out of cars, then driving profiles for all subsequent segments must be recomputed, thereby creating new instances of the curve 50. These new curves 50 would then be used along with new schedule objectives to plan the remaining trip.

Once a trip plan is created as discussed above, a trajectory of speed and power versus distance is used to reach a destination with minimum fuel use and/or emissions at the required trip time. There are several ways in which to execute the trip plan. As provided below in more detail, in an exemplary embodiment, when in an operator "coaching" mode, information is displayed to the operator for the operator to follow to achieve the required power and speed determined according to the optimal trip plan. In this mode, the operating information includes suggested operating conditions that the operator should use. In another exemplary embodiment, acceleration and maintaining a constant speed are autonomously performed. However, when the train 31 must be slowed, the operator is responsible for applying a braking system 52. In another exemplary embodiment of the present invention, commands for powering and braking are provided as required to follow the desired speed-distance path.

Feedback control strategies are used to provide corrections to the power control sequence in the profile to correct for events such as, but not limited to, train load variations caused by fluctuating head winds and/or tail winds. Another such error may be caused by an error in train parameters, such as, but not limited to, train mass and/or drag, when compared to assumptions in the optimized trip plan. A third type of error may occur with information contained in the track database 36. Another possible error may involve un-modeled performance differences due to the locomotive engine, traction motor thermal deration, and/or other factors. Feedback control strategies compare the actual speed as a function of position to the speed in the desired optimal profile. Based on this difference, a correction to the optimal power profile is added to drive the actual velocity toward the optimal profile. To assure stable regulation, a compensation algorithm may be provided which filters the feedback speeds into power corrections so that closed-performance stability is assured. Compensation may include standard dynamic compensation as used by those skilled in the art of control system design to meet performance objectives.

Exemplary embodiments of the present invention allow the simplest and therefore fastest means to accommodate changes in trip objectives, which is the rule, rather than the exception in railroad operations. In an exemplary embodiment, to determine the fuel-optimal trip from point A to point B where there are stops along the way, and for updating the trip for the remainder of the trip once the trip has begun, a sub-optimal decomposition method is usable for finding an optimal trip profile. Using modeling methods, the computation method can find the trip plan with specified travel time and initial and final speeds, so as to satisfy all the speed limits and locomotive capability constraints when there are stops. Though the following discussion is directed towards optimizing fuel use, it can also be applied to optimize other factors, such as, but not limited to, emissions, schedule, crew comfort, and load impact. The method may be used at the outset in developing a trip plan, and more importantly to adapting to changes in objectives after initiating a trip.

Figure 6:
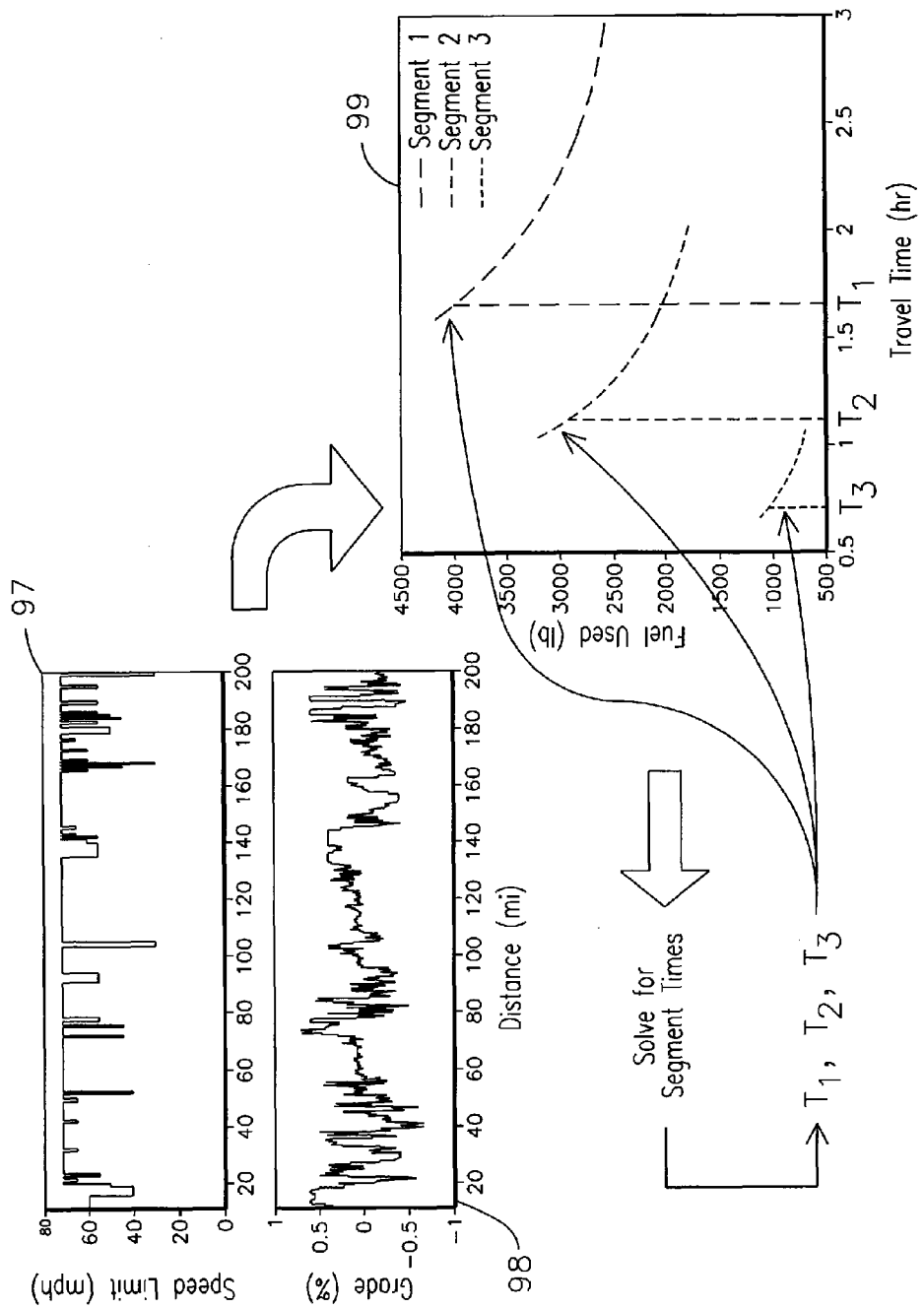
FIG. 6 depicts another exemplary embodiment of a segmentation decomposition for trip planning.

As discussed herein, exemplary embodiments of the present invention may employ a setup as illustrated in the exemplary flow chart depicted in FIG. 5, and as an exemplary three-segment example depicted in detail in FIG. 6. As illustrated, the trip may be broken into two or more segments, T1, T2, and T3. (As noted above, it is possible to consider the trip as a single segment.) As discussed herein, the segment boundaries may not result in equal segments. Instead, the segments may use natural or mission specific boundaries. Optimal trip plans are pre-computed for each segment. If fuel use versus trip time is the trip object to be met, fuel versus trip time curves are built for each segment. As discussed herein, the curves may be based on other factors, wherein the factors are objectives to be met with a trip plan. When trip time is the parameter being determined, trip time for each segment is computed while satisfying the overall trip time constraints. FIG. 6 illustrates speed limits 97 for an exemplary three-segment, 200-mile trip. Further illustrated are grade changes 98 over the 200-mile trip. A combined chart 99 illustrating curves for each segment of the trip of fuel used over the travel time is also shown.

Using the optimal control setup described previously, the present computation method can generate the trip plan with specified travel time and initial and final speeds, so as to satisfy all the speed limits and locomotive capability constraints when there are stops. Though the following detailed discussion is directed towards optimizing fuel use, it can also be applied to optimize other factors as discussed herein, such as, but not limited to, emissions. A key flexibility is to accommodate desired dwell time at stops and to consider constraints on earliest arrival and departure at a location as may be required, for example, in single-track operations where the time to be in or get by a siding is critical.

Exemplary embodiments of the present invention find a fuel-optimal trip from distance $D_0$ to $D_M$, traveled in time T, with M−1 intermediate stops at $D_1, \ldots, D_{M-1}$, and with the arrival and departure times at these stops constrained by $$t_{min}(i) \leq t_{arr}(D_i) \leq t_{max}(i) - \Delta t_i$$

$$t_{arr}(D_i) + \Delta t_i \leq t_{dep}(D_i) \leq t_{max}(i) \quad i=1,\ldots,M-1$$

where $t_{arr}(D_i)$, $t_{dep}(D_i)$, and $\Delta t_i$ are the arrival, departure, and minimum stop time at the $i^{th}$ stop, respectively. Assuming that fuel-optimality implies minimizing stop time, therefore $t_{dep}(D_i) = t_{arr}(D_i) + \Delta t_i$ which eliminates the second inequality above. Suppose for each $i=1, \ldots, M$, the fuel-optimal trip from $D_{i-1}$ to $D_i$ for travel time t, $T_{min}(i) \leq t \leq T_{max}(i)$, is known. Let $F_i(t)$ be the fuel-use corresponding to this trip. If the travel time from $D_{j-1}$ to $D_j$ is denoted $T_j$, then the arrival time at $D_i$ is given by $$t_{arr}(D_i) = \sum_{j=1}^{i}(T_j + \Delta t_{j-1}) \quad \text{i.}$$

where $\Delta t_0$ is defined to be zero. The fuel-optimal trip from $D_0$ to $D_M$ for travel time T is then obtained by finding $T_i$, $i=1,\ldots,M$, which minimize $$\sum_{i=1}^{M} F_i(T_i) T_{min}(i) \leq T_i \leq T_{max}(i) \quad \text{ii.}$$

subject to $$t_{min}(i) \leq \sum_{j=1}^{i}(T_j + \Delta t_{j-1}) \leq t_{max}(i) - \Delta t_i \quad i=1,\ldots,M-1 \quad \text{iii.}$$

$$\sum_{j=1}^{M}(T_j + \Delta t_{j-1}) = T \quad \text{iv.}$$

Once a trip is underway, the issue is re-determining the fuel-optimal solution for the remainder of a trip (originally from $D_0$ to $D_M$ in time T) as the trip is traveled, but where disturbances preclude following the fuel-optimal solution. Let the current distance and speed be x and v, respectively, where $D_{i-1} < x \leq D_i$. Also, let the current time since the beginning of the trip be tact. Then the fuel-optimal solution for the remainder of the trip from x to $D_M$, which retains the original arrival time at $D_M$, is obtained by finding $\tilde{T}_i$, $T_j$, j=i+1, \ldots M, which minimize $$\tilde{F}_i(\tilde{T}_i, x, v) + \sum_{j=i+1}^{M} F_j(T_j) \quad \text{i.}$$

subject to $$t_{min}(i) \leq t_{act} + \tilde{T}_i \leq t_{max}(i) - \Delta t_i \quad \text{ii.}$$

$$t_{min}(k) \leq t_{act} + \tilde{T}_i + \sum_{j=i+1}^{k}(T_j + \Delta t_{j-1}) \leq t_{max}(k) - \Delta t_k \quad \text{iii.}$$

$$k = i+1, \ldots, M-1$$

$$t_{act} + \tilde{T}_i + \sum_{j=i+1}^{M}(T_j + \Delta t_{j-1}) = T \quad \text{iv.}$$

Here, $\tilde{F}_i(t,x,v)$ is the fuel-used of the optimal trip from x to $D_i$, traveled in time t, with initial speed at x of v.

As discussed above, an exemplary way to enable more efficient re-planning is to construct the optimal solution for a stop-to-stop trip from partitioned segments. For the trip from $D_{i-1}$ to $D_i$, with travel time $T_i$, choose a set of intermediate points $D_{ij}$, j=1, \ldots, $N_i$−1. Let $D_{i0}=D_{i-1}$ and $D_{iN_i}=D_i$. Then express the fuel-use for the optimal trip from $D_{i-1}$ to $D_i$ as $$F_i(t) = \sum_{j=1}^{N_i} f_{ij}(t_{ij} - t_{i,j-1}, v_{i,j-1}, v_{ij}) \quad \text{i.}$$

where $f_{ij}(t, v_{i,j-1}, v_{ij})$ is the fuel-use for the optimal trip from $D_{i,j-1}$ to $D_{ij}$, traveled in time t, with initial and final speeds of $v_{i,j-1}$ and $v_{ij}$. Furthermore, $t_{ij}$ is the time in the optimal trip corresponding to distance $D_{ij}$. By definition, $t_{iN_i}-t_{i0}=T_i$. Since the train is stopped at $D_{i0}$ and $D_{iN_i}$, $v_{i0}=v_{iN_i}=0$.

The above expression enables the function $F_i(t)$ to be alternatively determined by first determining the functions $f_{ij}(\bullet)$, $1 \leq j \leq N_i$, then finding $\tau_{ij}, 1 \leq j \leq N_i$ and $v_{ij}, 1 \leq j < N_i$, which minimize $$F_i(t) = \sum_{j=1}^{N_i} f_{ij}(\tau_{ij}, v_{i,j-1}, v_{ij}) \quad \text{i.}$$

subject to $$\sum_{j=1}^{N_i} \tau_{ij} = T_i \quad \text{ii.}$$

$$v_{min}(i,j) \leq v_{ij} \leq v_{max}(i,j) \quad j=1,\ldots,N_i-1 \quad \text{iii.}$$

$$v_{i0} = v_{iN_i} = 0 \quad \text{iv.}$$

By choosing $D_{ij}$ (e.g., at speed restrictions or meeting points), $v_{max}(i,j) - v_{min}(i,j)$ can be minimized, thus minimizing the domain over which $f_{ij}(\,)$ needs to be known.

Based on the partitioning above, a simpler suboptimal re-planning approach than that described above is to restrict re-planning to times when the train is at distance points $D_{ij}$, $1 \leq i \leq M, 1 \leq j \leq N_i$. At point $D_{ij}$, the new optimal trip from $D_{ij}$ to $D_M$ can be determined by finding $\tau_{ik}, j < k \leq N_i, v_{ik}, j < k \leq N_i$, and $\tau_{mn}$, i<m≤M, 1≤n≤$N_m$, $v_{mn}$, i<m≤M, 1≤n<$N_m$, which minimize $$\sum_{k=j+1}^{N_i} f_{ik}(\tau_{ik}, v_{i,k-1}, v_{ik}) + \sum_{m=i+1}^{M} \sum_{n=1}^{N_m} f_{mn}(\tau_{mn}, v_{m,n-1}, v_{mn}) \quad \text{i.}$$

subject to $$t_{min}(i) \leq t_{act} + \sum_{k=j+1}^{N_i} \tau_{ik} \leq t_{max}(i) - \Delta t_i \quad \text{ii.}$$

-continued $$t_{min}(n) \leq t_{act} + \sum_{k=j+1}^{N_i} \tau_{ik} + \sum_{m=i+1}^{n} (T_m + \Delta t_{m-1}) \leq t_{max}(n) - \Delta t_n \quad \text{iii.}$$

$$n = i+1, \ldots, M-1$$

$$t_{act} + \sum_{k=j+1}^{N_i} \tau_{ik} + \sum_{m=i+1}^{M} (T_m + \Delta t_{m-1}) = T \quad \text{iv.}$$

where $$T_m = \sum_{n=1}^{N_m} \tau_{mn} \quad \text{v.}$$

A further simplification is obtained by waiting on the re-computation of $T_m$, $i<m \leq M$, until distance point $D_i$ is reached. In this way, at points $D_{ij}$ between $D_{i-1}$ and $D_i$, the minimization above needs only be performed over $\tau_{ik}$, $j<k \leq N_i$, $v_{ik}$, $j<k<N_i$. $T_i$ is increased as needed to accommodate any longer actual travel time from $D_{i-1}$ to $D_{ij}$ than planned. This increase is later compensated, if possible, by the re-computation of $T_m$, $i<m \leq M$, at distance point $D_i$.

With respect to the closed-loop configuration disclosed above, the total input energy required to move a train 31 from point A to point B consists of the sum of four components, specifically, difference in kinetic energy between points A and B; difference in potential energy between points A and B; energy loss due to friction and other drag losses; and energy dissipated by the application of brakes. Assuming the start and end speeds to be equal (e.g., stationary), the first component is zero. Furthermore, the second component is independent of driving strategy. Thus, it suffices to minimize the sum of the last two components.

Following a constant speed profile minimizes drag loss. Following a constant speed profile also minimizes total energy input when braking is not needed to maintain constant speed. However, if braking is required to maintain constant speed, applying braking just to maintain constant speed will most likely increase total required energy because of the need to replenish the energy dissipated by the brakes. A possibility exists that some braking may actually reduce total energy usage if the additional brake loss is more than offset by the resultant decrease in drag loss caused by braking, by reducing speed variation.

After completing a re-plan from the collection of events described above, the new optimal notch/speed plan can be followed using the closed loop control described herein. However, in some situations there may not be enough time to carry out the segment decomposed planning described above, and particularly when there are critical speed restrictions that must be respected, an alternative is needed. Exemplary embodiments of the present invention accomplish this with an algorithm referred to as "smart cruise control." The smart cruise control algorithm is an efficient way to generate, on the fly, an energy-efficient (hence fuel-efficient) sub-optimal prescription for driving the train 31 over a known terrain. This algorithm assumes knowledge of the position of the train 31 along the track 34 at all times, as well as knowledge of the grade and curvature of the track versus position. The method relies on a point-mass model for the motion of the train 31, whose parameters may be adaptively estimated from online measurements of train motion as described earlier.

The smart cruise control algorithm has three principal components, specifically, a modified speed limit profile that serves as an energy-efficient (and/or emissions efficient or any other objective function) guide around speed limit reductions; an ideal throttle or dynamic brake setting profile that attempts to balance between minimizing speed variation and braking; and a mechanism for combining the latter two components to produce a notch command, employing a speed feedback loop to compensate for mismatches of modeled parameters when compared to reality parameters. Smart cruise control can accommodate strategies in exemplary embodiments of the present invention that do no active braking (e.g., the driver is signaled and assumed to provide the requisite braking) or a variant that does active braking.

With respect to the cruise control algorithm that does not control dynamic braking, the four exemplary components are a modified speed limit profile that serves as an energy-efficient guide around speed limit reductions, a notification signal directed to notify the operator when braking should be applied, an ideal throttle profile that attempts to balance between minimizing speed variations and notifying the operator to apply braking, a mechanism employing a feedback loop to compensate for mismatches of model parameters to reality parameters.

Also included in exemplary embodiments of the present invention is an approach to identify key parameter values of the train 31. For example, with respect to estimating train mass, a Kalman filter and a recursive least-squares approach may be utilized to detect errors that may develop over time.

Figure 7:
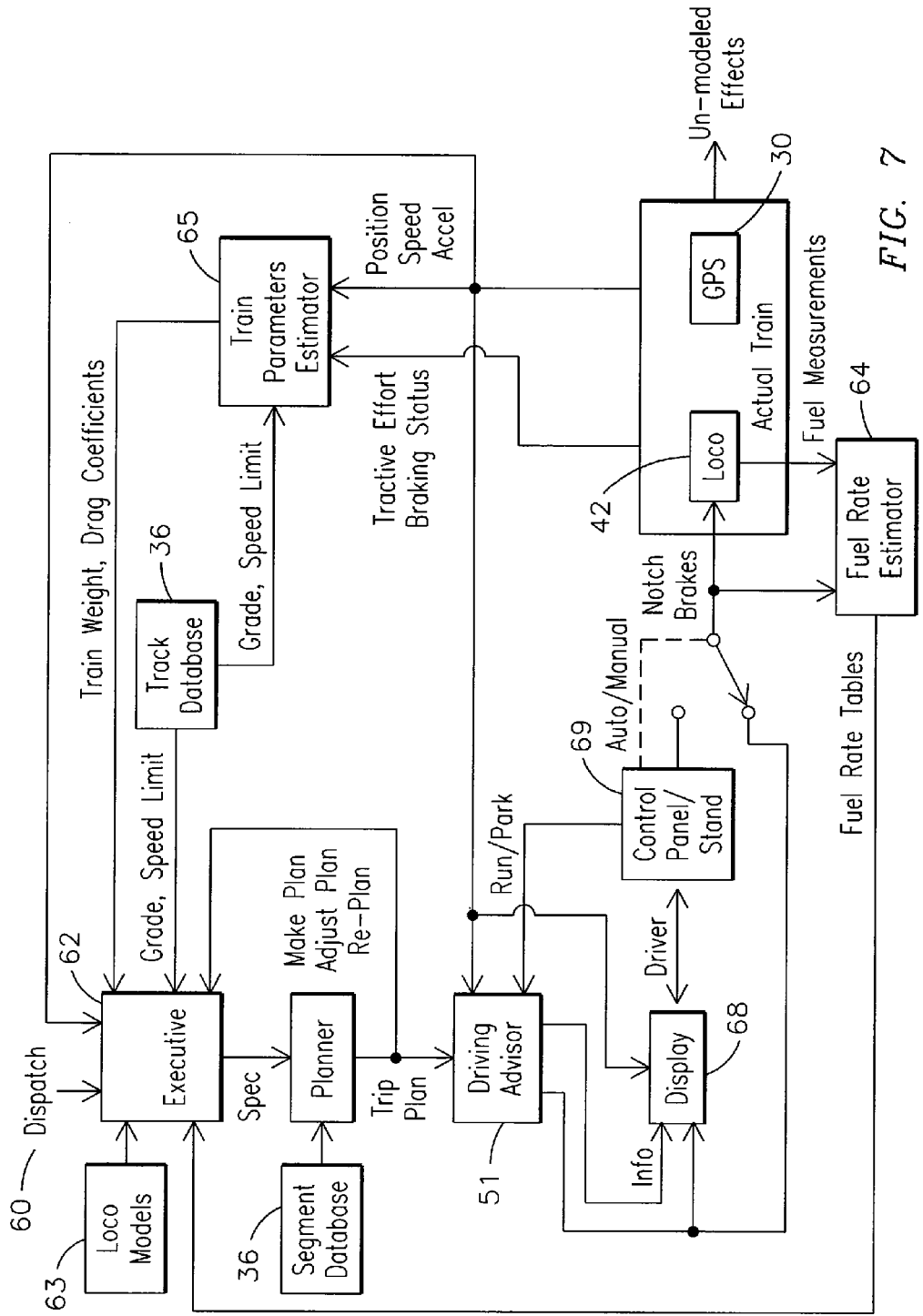
FIG. 7 is a flowchart that depicts another exemplary embodiment of a method of trip optimization.

FIG. 7 depicts an exemplary flow chart of the present invention. As discussed previously, a remote facility, such as a dispatch 60, can provide information. As illustrated, such information is provided to an executive control element 62. Also supplied to the executive control element 62 is information from a locomotive modeling database 63, information from a track database 36 (including, for example, track grade information and speed limit information, and estimated train parameters such as, but not limited to, train weight and drag coefficients), and fuel rate tables from a fuel rate estimator 64. The executive control element 62 supplies information to the trip profile planner 12, which is disclosed in more detail in FIG. 1. Once a trip plan has been calculated, the plan is supplied to a driving advisor, driver/operator, or controller element 51. The trip plan is also supplied to the executive control element 62 so that it can compare the trip when other new data is provided.

As discussed above, the controller element 51 can automatically set a notch power, either a pre-established notch setting or an optimum continuous notch power. In addition to supplying a speed command to the train 31, a display 68 is provided so that the operator can view what the planner has recommended. The operator also has access to a control panel 69. Through the control panel 69 the operator can decide whether to apply the notch power recommended. Towards this end, the operator may limit a targeted or recommended power. That is, at any time the operator always has final authority over what power setting the locomotive consist will operate at. This includes deciding whether to apply braking if the trip plan recommends slowing the train 31. For example, if operating in dark territory, or where information from wayside equipment cannot electronically transmit information to a train and instead the operator views visual signals from the wayside equipment, the operator inputs commands based on information contained in the track database and visual signals from the wayside equipment. Based on how the train 31 is functioning, information regarding fuel measurement is supplied to the fuel rate estimator 64. Since direct measurement of fuel flows is not typically available in a locomotive consist, all information on fuel consumed so far within a trip and projections into the future following optimal plans is carried out using calibrated physics models such as those used in developing the optimal plans. For example, such predictions may include, but are not limited to, the use of measured gross horsepower and known fuel characteristics and emissions characteristics to derive the cumulative fuel used and emissions generated.

The train 31 also has a locator element 30 such as a GPS sensor, as discussed above. Information is supplied to the train parameters estimator 65. Such information may include, but is not limited to, GPS sensor data, tractive/braking effort data, braking status data, speed, and any changes in speed data. With information regarding grade and speed limit information, train weight and drag coefficients information is supplied to the executive control element 62.

Exemplary embodiments of the present invention may also allow for the use of continuously variable power throughout the optimization planning and closed loop control implementation. In a conventional locomotive, power is typically quantized to eight discrete levels. Modern locomotives can realize continuous variation in horsepower, which may be incorporated into the previously described optimization methods. With continuous power, the locomotive 42 can further optimize operating conditions, e.g., by minimizing auxiliary loads and power transmission losses, and fine tuning engine horsepower regions of optimum efficiency, or to points of increased emissions margins. Example include, but are not limited to, minimizing cooling system losses, adjusting alternator voltages, adjusting engine speeds, and reducing number of powered axles. Further, the locomotive 42 may use the on-board track database 36 and the forecasted performance requirements to minimize auxiliary loads and power transmission losses to provide optimum efficiency for the target fuel consumption/emissions. Examples include, but are not limited to, reducing a number of powered axles on flat terrain and pre-cooling the locomotive engine prior to entering a tunnel.

Exemplary embodiments of the present invention may also use the on-board track database 36 and the forecasted performance to adjust the locomotive performance, such as to insure that the train has sufficient speed as it approaches a hill and/or tunnel. For example, this could be expressed as a speed constraint at a particular location that becomes part of the optimal plan generation created solving the equation (OP). Additionally, exemplary embodiments of the present invention may incorporate train-handling rules, such as, but not limited to, tractive effort ramp rates and maximum braking effort ramp rates. These may be incorporated directly into the formulation for optimum trip profile or alternatively incorporated into the closed loop regulator used to control power application to achieve the target speed.

In one embodiment, the present invention is only installed on a lead locomotive of the train consist. Even though exemplary embodiments of the present invention are not dependant on data or interactions with other locomotives, it may be integrated with a consist manager, as disclosed in U.S. Pat. No. 6,691,957 and U.S. Pat. No. 7,021,588 (owned by the Assignee and both incorporated by reference), and/or a consist optimizer functionality to improve efficiency. Interaction with multiple trains is not precluded, as illustrated by the example of dispatch arbitrating two "independently optimized" trains described herein.

Trains with distributed power systems can be operated in different modes. One mode is where all locomotives in the train operate at the same notch command. So if the lead locomotive is commanding motoring—N8, all units in the train will be commanded to generate motoring—N8 power. Another mode of operation is "independent" control. In this mode, locomotives or sets of locomotives distributed throughout the train can be operated at different motoring or braking powers. For example, as a train crests a mountaintop, the lead locomotives (on the down slope of mountain) may be placed in braking, while the locomotives in the middle or at the end of the train (on the up slope of mountain) may be in motoring. This is done to minimize tensile forces on the mechanical couplers that connect the railcars and locomotives. Traditionally, operating the distributed power system in "independent" mode required the operator to manually command each remote locomotive or set of locomotives via a display in the lead locomotive. Using the physics based planning model, train set-up information, on-board track database, on-board operating rules, location determination system, real-time closed loop power/brake control, and sensor feedback, the system is able to automatically operate the distributed power system in "independent" mode.

When operating in distributed power, the operator in a lead locomotive can control operating functions of remote locomotives in the remote consists via a control system, such as a distributed power control element. Thus, when operating in distributed power, the operator can command each locomotive consist to operate at a different notch power level (or one consist could be in motoring and another could be in braking), wherein each individual locomotive in the locomotive consist operates at the same notch power. In an exemplary embodiment, with an exemplary embodiment of the present invention installed on the train, preferably in communication with the distributed power control element, when a notch power level for a remote locomotive consist is desired as recommended by the optimized trip plan, the exemplary embodiment of the present invention will communicate this power setting to the remote locomotive consists for implementation. As discussed below, the same is true regarding braking.

Exemplary embodiments of the present invention may be used with consists in which the locomotives are not contiguous, e.g., with one or more locomotives up front and others in the middle and/or at the rear for train. Such configurations are called "distributed power," wherein the standard connection between the locomotives is replaced by radio link or auxiliary cable to link the locomotives externally. When operating in distributed power, the operator in a lead locomotive can control operating functions of remote locomotives in the consist via a control system, such as a distributed power control element. In particular, when operating in distributed power, the operator can command each locomotive consist to operate at a different notch power level (or one consist could be in motoring and other could be in braking), wherein each individual in the locomotive consist operates at the same notch power.

In an exemplary embodiment, with an exemplary embodiment of the present invention installed on the train, preferably in communication with the distributed power control element, when a notch power level for a remote locomotive consist is desired as recommended by the optimized trip plan, the exemplary embodiment of the present invention will communicate this power setting to the remote locomotive consists for implementation. As discussed below, the same is true regarding braking. When operating with distributed power, the optimization problem previously described can be enhanced to allow additional degrees of freedom, in that each of the remote units can be independently controlled from the lead unit. The value of this is that additional objectives or constraints relating to in-train forces may be incorporated into the performance function, assuming the model to reflect the in-train forces is also included. Thus, exemplary embodiments of the present invention may include the use of multiple throttle controls to better manage in-train forces as well as fuel consumption and emissions.

In a train utilizing a consist manager, the lead locomotive in a locomotive consist may operate at a different notch power setting than other locomotives in that consist. The other locomotives in the consist operate at the same notch power setting. Exemplary embodiments of the present invention may be utilized in conjunction with the consist manager to command notch power settings for the locomotives in the consist. Thus, based on exemplary embodiments of the present invention, since the consist manager divides a locomotive consist into two groups, namely, lead locomotive and trail units, the lead locomotive will be commanded to operate at a certain notch power and the trail locomotives are commanded to operate at another certain notch power. In an exemplary embodiment the distributed power control element may be the system and/or apparatus where this operation is housed.

Likewise, when a consist optimizer is used with a locomotive consist, exemplary embodiments of the present invention can be used in conjunction with the consist optimizer to determine notch power for each locomotive in the locomotive consist. For example, suppose that a trip plan recommends a notch power setting of 4 for the locomotive consist. Based on the location of the train, the consist optimizer will take this information and then determine the notch power setting for each locomotive in the consist. In this implementation, the efficiency of setting notch power settings over intra-train communication channels is improved. Furthermore, as discussed above, implementation of this configuration may be performed utilizing the distributed control system.

Furthermore, as discussed previously, exemplary embodiments of the present invention may be used for continuous corrections and re-planning with respect to when the train consist uses braking based on upcoming items of interest, such as, but not limited to, railroad crossings, grade changes, approaching sidings, approaching depot yards, and approaching fuel stations, where each locomotive in the consist may require a different braking option. For example, if the train is coming over a hill, the lead locomotive may have to enter a braking condition, whereas the remote locomotives, having not reached the peak of the hill may have to remain in a motoring state.

Figure 8:
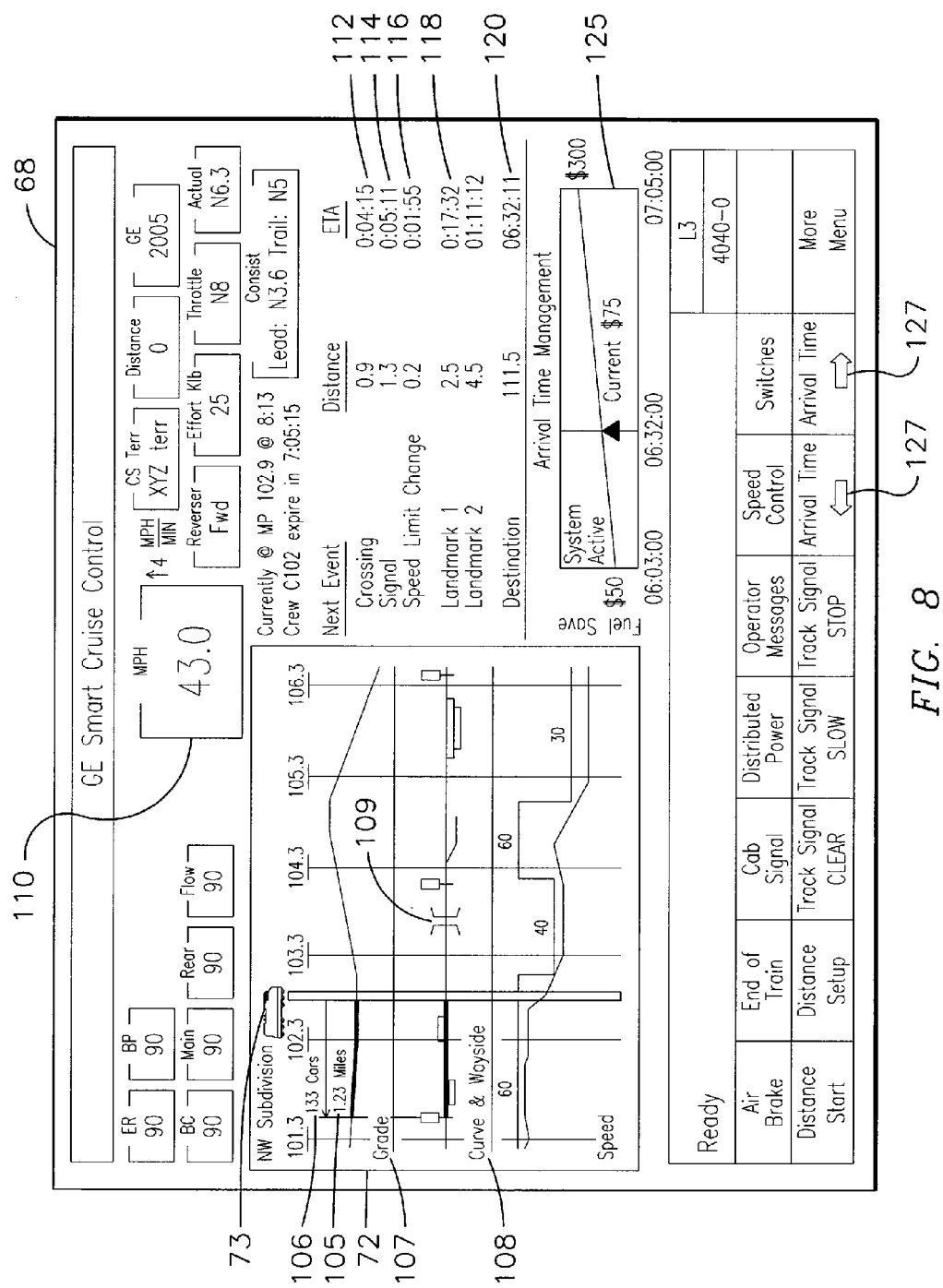
FIG. 8 depicts an exemplary illustration of a dynamic display for use by an operator.
Figure 9:
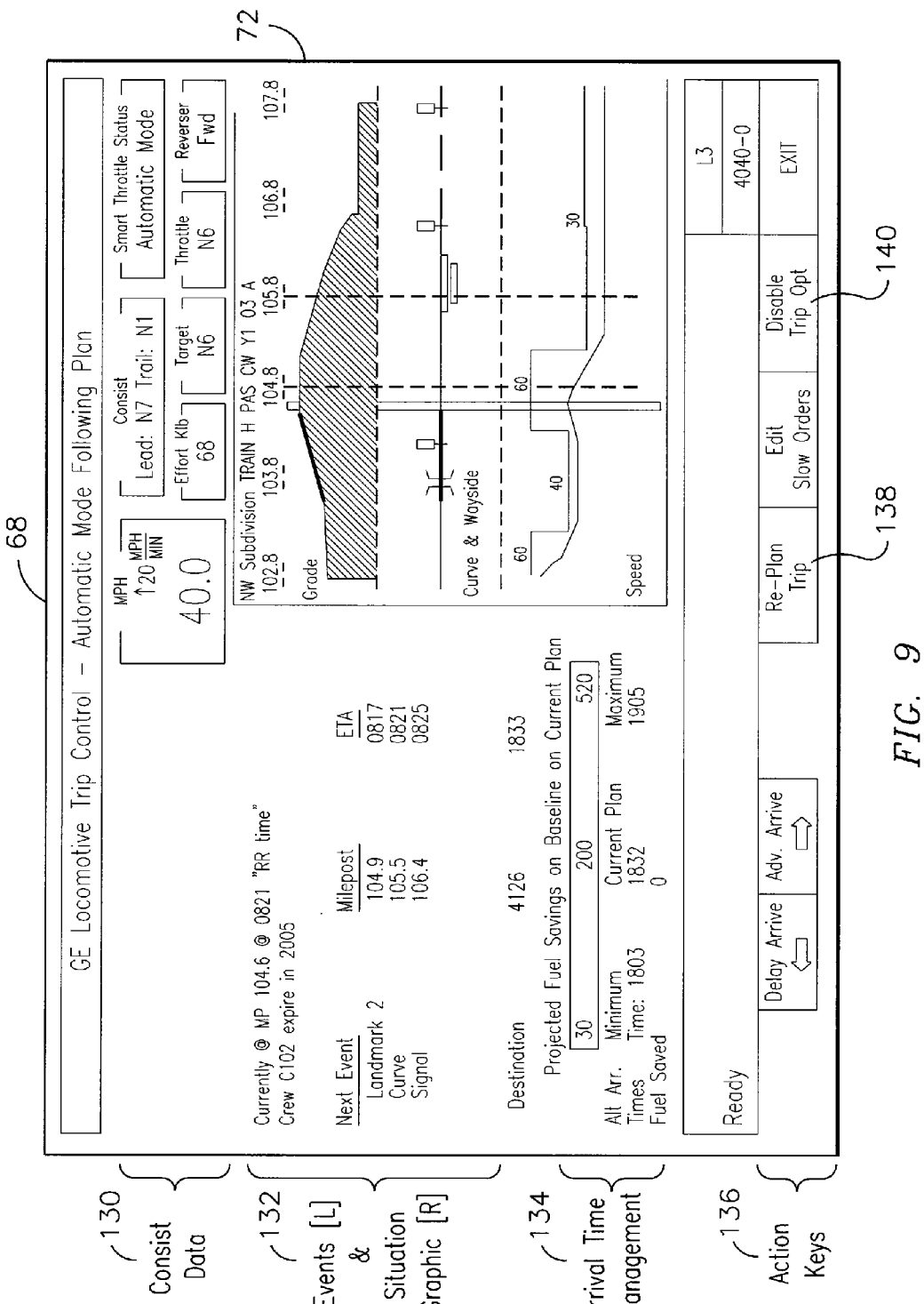
FIG. 9 depicts another exemplary illustration of a dynamic display for use by the operator.
Figure 10:
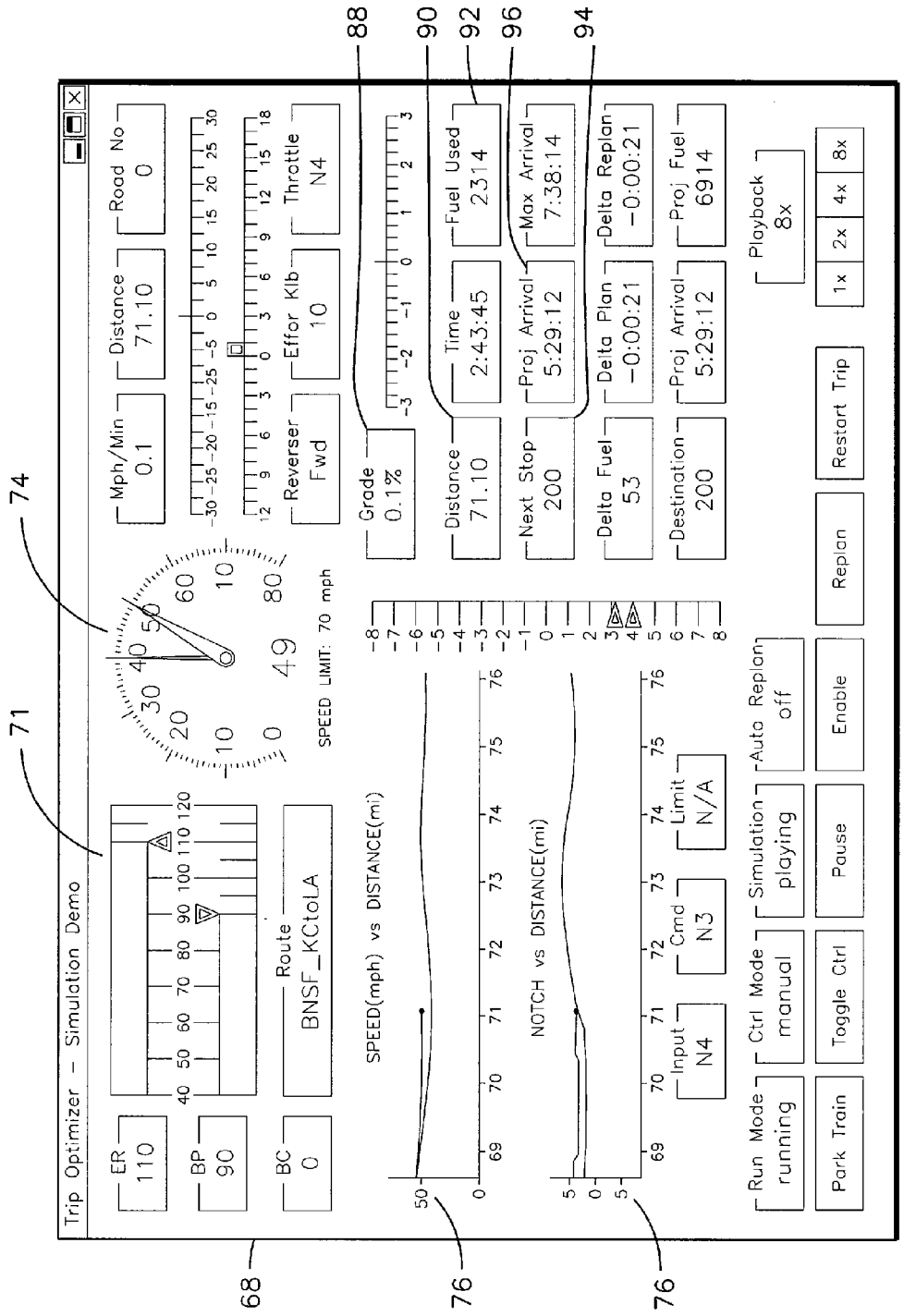
FIG. 10 depicts another exemplary illustration of a dynamic display for use by the operator.

FIGS. 8, 9 and 10 depict exemplary illustrations of dynamic displays 68 for use by the operator. As shown in FIG. 8, a trip profile 72 may be provided as part of the dynamic display 68. Within the profile a location 73 of the locomotive is provided. Such information as train length 105 and the number of cars 106 in the train is provided. Display elements are also provided regarding track grade 107, curve and wayside elements 108, including bridge location 109, and train speed 110. The display 68 allows the operator to view such information and also see where the train is along the route. Information pertaining to distance and/or estimated time of arrival to such locations as crossings 112, signals 114, speed changes 116, landmarks 118, and destinations 120 is provided. An arrival time management tool 125 is also provided to allow the user to determine the fuel savings that is being realized during the trip. The operator has the ability to vary arrival times 127 and witness how this affects the fuel savings. As discussed herein, those skilled in the art will recognize that fuel saving is an exemplary example of only one objective that can be reviewed with a management tool. Towards this end, depending on the parameter being viewed, other parameters discussed herein can be viewed and evaluated with a management tool that is visible to the operator. The operator is also provided information about how long the crew has been operating the train. In exemplary embodiments time and distance information may either be illustrated as the time and/or distance until a particular event and/or location, or it may provide a total elapsed time.

As illustrated in FIG. 9, an exemplary display provides information about consist data 130, an events and situation graphic 132, an arrival time management tool 134, and action keys 136. Similar information as discussed above is provided in this display as well. This display 68 also provides action keys 138 to allow the operator to re-plan, as well as to disengage 140 exemplary embodiments of the present invention.

FIG. 10 depicts another exemplary embodiment of the display. Data typical of a modern locomotive including airbrake status 71, analog speedometer with digital insert 74, and information about tractive effort in pounds force (or traction amps for DC locomotives) is visible. An indicator 74 is provided to show the current optimal speed in the plan being executed, as well as an accelerometer graphic to supplement the readout in mph/minute. Important new data for optimal plan execution is in the center of the screen, including a rolling strip graphic 76 with optimal speed and notch setting versus distance compared to the current history of these variables. In this exemplary embodiment, the location of the train is derived using the locator element. As illustrated, the location is provided by identifying how far the train is away from its final destination, an absolute position, an initial destination, an intermediate point, and/or an operator input.

The strip chart provides a look-ahead to changes in speed required to follow the optimal plan, which is useful in manual control, and monitors plan versus actual during automatic control. As discussed herein, such as when in the coaching mode, the operator can follow either the notch or speed suggested by exemplary embodiments of the present invention. The vertical bar gives a graphic of desired and actual notch, which are also displayed digitally below the strip chart. When continuous notch power is utilized, as discussed above, the display will simply round to the closest discrete equivalent. The display may be an analog display so that an analog equivalent or a percentage or actual horse power/tractive effort is displayed.

Critical information on trip status is displayed on the screen, and shows the current grade the train is encountering 88, either by the lead locomotive, a location elsewhere along the train, or an average over the train length. Also displayed are a distance traveled so far in the plan 90, cumulative fuel used 92, where the next stop is planned 94 (and/or a distance to the next planned stop), and current and projected arrival time 96 for the next stop. The display 68 also shows the maximum possible time to destination possible with the computed plans available. If a later arrival was required, a re-plan would be carried out. Delta plan data shows status for fuel and schedule ahead or behind the current optimal plan. Negative numbers mean less fuel or early compared to plan, positive numbers mean more fuel or late compared to plan, and typically trade-off in opposite directions (slowing down to save fuel makes the train late and conversely).

At all times, these displays 68 give the operator a snapshot of where he stands with respect to the currently instituted driving plan. This display is for illustrative purpose only as there are many other ways of displaying/conveying this information to the operator and/or dispatch. Towards this end, the information disclosed above could be intermixed to provide a display different than the ones disclosed.

Other features that may be included in exemplary embodiments of the present invention include, but are not limited to, allowing for the generation of data logs and reports. This information may be stored on the train and downloaded to an off-board system at some point in time. The downloads may occur via manual and/or wireless transmission. This information may also be viewable by the operator via the locomotive display. The data may include information such as, but not limited to, operator inputs, the time the system is operational, fuel saved, fuel imbalance across locomotives in the train, train journey off course, and system diagnostic issues such as if a GPS sensor is malfunctioning.

Since trip plans must also take into consideration allowable crew operation time, exemplary embodiments of the present invention may take such information into consideration as a trip is planned. For example, if the maximum time a crew may operate is eight hours, then the trip is fashioned to include stopping location for a new crew to take the place of the present crew. Such specified stopping locations may include, but are not limited to, rail yards, meet/pass locations, and the like. If, as the trip progresses, the trip time may be exceeded, exemplary embodiments of the present invention may be overridden by the operator to meet criteria as determined by the operator. Ultimately, regardless of the operating conditions of the train (e.g., high load, low speed, and train stretch conditions), the operator remains in control to command a speed and/or operating condition of the train.

Using exemplary embodiments of the present invention, the train may operate in a plurality of operations. In one operational concept, an exemplary embodiment of the present invention may provide commands for commanding propulsion and dynamic braking. The operator then handles all other train functions. In another operational concept, an exemplary embodiment of the present invention may provide commands for commanding propulsion only. The operator then handles dynamic braking and all other train functions. In yet another operational concept, an exemplary embodiment of the present invention may provide commands for commanding propulsion, dynamic braking, and application of the airbrake. The operator then handles all other train functions.

Exemplary embodiments of the present invention may also be used to notify the operator of upcoming items of interest and/or of actions to be taken. Specifically, using the forecasting logic of exemplary embodiments of the present invention, the continuous corrections and re-planning to the optimized trip plan, and/or the track database, the operator can be notified of upcoming crossings, signals, grade changes, brake actions, sidings, rail yards, fuel stations, etc. This notification may occur audibly and/or through the operator interface.

Specifically, using the physics based planning model, train set-up information, on-board track database, on-board operating rules, location determination system, real-time closed loop power/brake control, and sensor feedback, the system presents and/or notifies the operator of required actions. The notification can be visual and/or audible. Examples include notifying of crossings that require the operator to activate the locomotive horn and/or bell, and notifying of "silent" crossings that do not require that the operator activate the locomotive horn or bell.

In another exemplary embodiment, using the physics based planning model discussed above, train set-up information, on-board track database, on-board operating rules, location determination system, real-time closed power/brake control, and sensor feedback, the operator may be presented with information (e.g., a gauge on display) that allows the operator to see when the train will arrive at various locations, as illustrated in FIG. 9. The system allows the operator to adjust the trip plan (e.g., target arrival time). This information (actual estimated arrival time or information needed to derive off-board) can also be communicated to the dispatch center to allow the dispatcher or dispatch system to adjust the target arrival times. This allows the system to quickly adjust and optimize for the appropriate target function (for example trading off speed and fuel usage).

Figure 11:
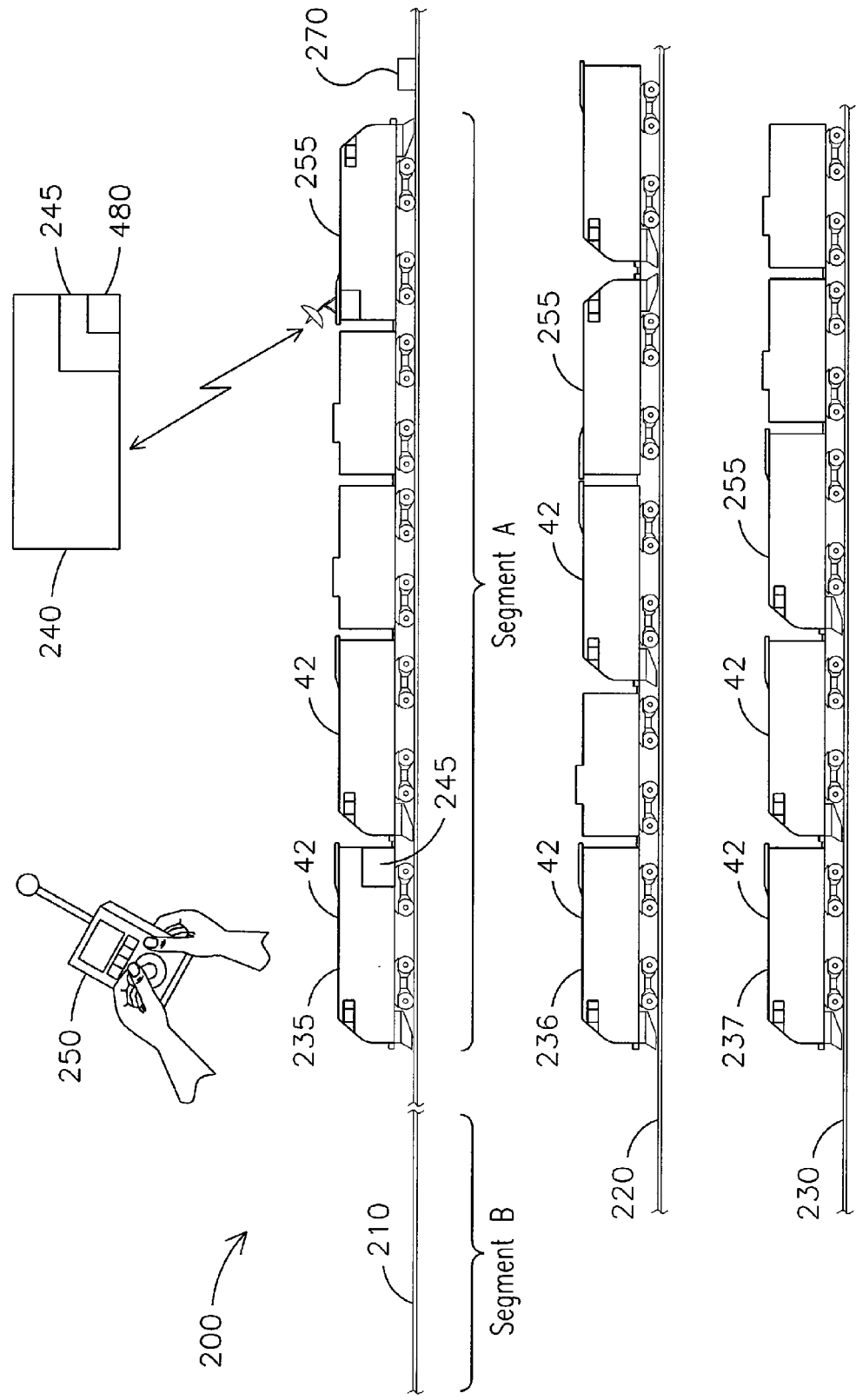
FIG. 11 depicts an exemplary embodiment of a network of railway tracks with multiple trains.

FIG. 11 depicts an exemplary embodiment of a network of railway tracks with multiple trains. In the railroad network 200, it is desirable to obtain an optimized fuel efficiency and time of arrival for the overall network of multiple interacting tracks 210, 220, 230, and trains 235, 236, 237. As illustrated, multiple tracks 210, 220, 230 are shown with a train 235, 236, 237 on each respective track. Though locomotive consists 42 are illustrated as part of the trains 235, 236, 237, those skilled in the art will readily recognize that any train may only have a single locomotive consist having a single locomotive. As disclosed herein, a remote facility 240 may also be involved with improving fuel efficiency and reducing emissions of a train through optimized train power makeup. This may be accomplished with a processor 245, such as a computer, located at the remote facility 240. In another exemplary embodiment a hand-held device 250 may be used to facilitate improving fuel efficiency of the train 235, 236, 237 through optimized train power makeup. Typically in either of these approaches, configuring of the train 235, 236, 237 usually occurs at a hump, rail yard, or the like, when the train is being compiled.

Alternatively, as discussed below, the processor 245 may be located on the train 235, 236, 237 or aboard another train, wherein train setup may be accomplished using inputs from the other train. For example, if a train has recently completed a mission over the same tracks, input from that train's mission may be supplied to the current train as it either is performing and/or is about to begin its mission. Thus, configuring the train may occur at train run time, and even during the run time. For example, real time configuration data may be utilized to configure the train locomotives. One such example is provided above with respect to using data from another train. Another exemplary example entails using other data associated with trip optimization of the train as discussed above. Additionally, the train setup may be performed using input from a plurality of sources, such as, but not limited to, a dispatch system, a wayside system 270, an operator, an off-line real time system, an external setup, a distributed network, a local network, and/or a centralized network.

Figure 12:
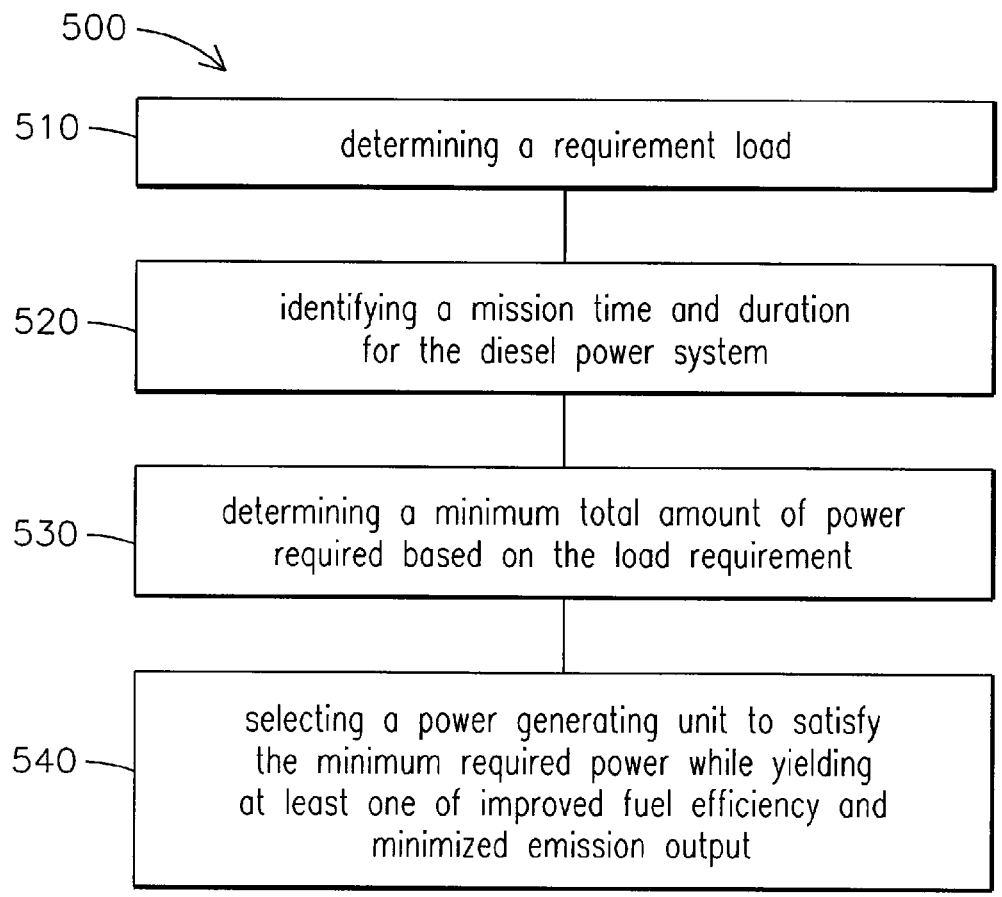
FIG. 12 is a flowchart of a method for improving fuel efficiency of a train through optimized train power makeup, according to an additional embodiment of the invention.

FIG. 12 is a flowchart depicting an exemplary embodiment of a method for improving fuel efficiency and reducing emission output through optimized train power makeup. As disclosed above, to minimize fuel use and emissions while preserving time arrival, in an exemplary embodiment acceleration and matched breaking are minimized. Undesired emissions may also be minimized by powering a minimal set of locomotives. For example, in a train with several locomotives or locomotive consists, powering a minimal set of locomotives at a higher power setting while putting the remaining locomotives into idle, unpowered standby, or an automatic engine start-stop ("AESS") mode as discussed below, will reduce emissions. This is at least partly because exhaust emissions after-treatment devices on the locomotives (e.g., catalytic converters) are at a temperature below which they optimally operate, when locomotives are run at lower power settings (e.g., notch 1-3). Therefore, using the minimum number of locomotives or locomotive consists to make the mission on time, operating at high power settings will allow for the exhaust emission treatment devices to operate at optimal temperatures, thereby further reducing emissions.

Figure 13:
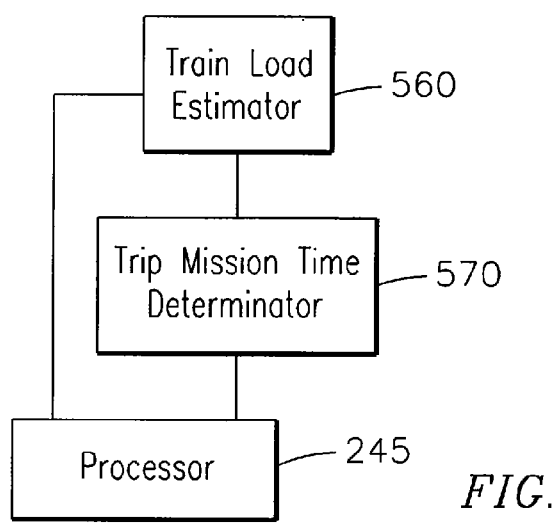
FIG. 13 depicts a block diagram of exemplary elements included in a system for optimized train power makeup.

The method illustrated in flowchart 500 in FIG. 12 provides for determining a train load, at 510. When the engine is used in other applications, the load is determined based on the engine configuration. The train load may be determined with a load, or train load, estimator 560, as illustrated in FIG. 13. In an exemplary embodiment the train load is estimated based on information obtained as disclosed in a train makeup docket 480, as illustrated in FIG. 11. For example, the train makeup docket 480 may be contained in the processor 245 (illustrated in FIGS. 11 and 13), wherein the processor 245 makes the estimation, or may be on paper wherein an operator makes the estimation. The train makeup docket 480 may include information such as the number of cars, car weight, car content, car age, etc. In another exemplary embodiment the train load is estimated using historical data, such as, but not limited to, prior train missions making the same trip, and similar train car configurations. As discussed above, using historical data may be accomplished with a processor or manually. In yet another exemplary embodiment, the train load is estimated using a rule of thumb or table data. For example, the operator configuring the train 235, 236, 237 may determine the train load required based on established guidelines such as, but not limited to, a number of cars in the train, types of cars in the train, weight of the cars in the train, and an amount of products being transported by the train. This same rule of thumb determination may also be accomplished using the processor 245.

Identifying a mission time and/or duration for the diesel power system, at 520, is disclosed. With respect to engines used in other applications, identifying a mission time and/or duration for the diesel power system may be equated to defining the mission time within which the engine configuration is expected to accomplish the mission. A determination is made about a minimum total amount of power required based on the train load, at 530. The locomotive is selected to satisfy the minimum required power while yielding improved fuel efficiency and/or minimized emission output, at 540. The locomotive may be selected based on a type of locomotive (based on its engine) needed and/or a number of locomotives (based on a number of engines) needed. [Similarly, with respect to diesel engines used in other power applications, such as but not limited to marine, OHV, and stationary power stations, multiple units of each are used to accomplish an intended mission unique for the specific application.

Towards this end, a trip mission time determinator 570, as illustrated in FIG. 13, may be used to determine the mission time based on information such as, but not limited to, weather conditions, track conditions, and the like. The locomotive makeup may be based on the types of locomotives needed, as a function of power output or otherwise, and/or a minimum number of locomotives needed. For example, based on the available locomotives, a selection is made of those locomotives that just meet the total power required. Towards this end, as an example, if ten locomotives are available, a determination of the power output from each locomotive is made. Based on this information, the fewest number and type of locomotives needed to meet the total power requirements are selected. For example, the locomotives may have different horse power (HP) ratings or starting tractive effort (TE) ratings. In addition to the total power required, the distribution of power and type of power in the train can be determined. For example, to limit the maximum coupler forces on heavy trains, the locomotives may be distributed within the train. Another consideration is the capability of the locomotive. It may be possible to put four DC locomotives on the head end of a train; however, four AC units with the same HP may not be used at the head end since the total drawbar forces may exceed designated limits.

In another exemplary embodiment, the selection of locomotives may not be based solely on reducing a number of locomotives used in a train. For example, if the total power requirement is minimally met by five of the available locomotives when compared to also meeting the power requirement by the use of three of the available locomotives, the five locomotives are used instead of the three. In view of these options, those skilled in the art will readily recognize that a minimum number of locomotives may be selected from a sequential (and random) set of available locomotives. Such an approach may be used when the train 235, 236, 237 is already compiled and a decision is being made at run time and/or during a mission wherein the remaining locomotives are not used to power the train 235, 236, 237, as discussed in further detail below.

While compiling the train 235, 236, 237, if the train 235, 236, 237 requires backup power, incremental locomotive 255, or locomotives, may be added (see FIG. 11). However this additional locomotive 255 is isolated to minimize fuel use, emission output, and power variation, but may be used to provide backup power in case an operating locomotive becomes inoperable, and/or to provide additional power to accomplish the trip within an established mission time. The isolated locomotive 255 may be put into an AESS mode to minimize fuel use while having the locomotive be available when needed. In an exemplary embodiment, if a backup, or isolated, locomotive 255 is provided, its dimensions (e.g., weight) may be taken into consideration when determining the train load.

Thus, as discussed above in more detail, determining minimum power needed to power the train 235, 236, 237 may occur at train run time and/or during a run (or mission). In this instance, once a determination is made as to optimized train power and the locomotives or locomotive consists 42 in the train 235, 236, 237 are identified to provide the requisite power needed, the additional locomotive(s) 255 not identified for use are put in the idle, or AESS, mode.

In an exemplary embodiment, the total mission run may be broken into a plurality of sections, or segments, such as but not limited to at least 2 segments, such as segment A and segment B as illustrated in FIG. 11. Based on the amount of time taken to complete any segment, the backup power provided by the isolated locomotive 255 is made available in case incremental power is needed to meet the trip mission objective. Towards this end, the isolated locomotive 255 may be utilized for a specific trip segment to get the train 235, 236, 237 back on schedule and then switched off for subsequent segments, if the train 235, 236, 237 remains on schedule.

Thus, in operation, the lead locomotive may put the locomotive 255 provided for incremental power into an isolation mode until the power is needed. This may be accomplished by use of wired or wireless modems or communications from the operator, usually on the lead locomotive, to the isolated locomotive 255. In another exemplary embodiment, the locomotives operate in a distributed power configuration and the isolated locomotive 255 is already integrated in the distributed power configuration, but is idle, and is switched on when the additional power is required. In yet another embodiment, the operator puts the isolated locomotive 255 into the appropriate mode.

In an exemplary embodiment, the initial setup of the locomotives, based on train load and mission time, is updated by the trip optimizer, as disclosed above, and adjustments to the number and type of powered locomotives are made. As an exemplary illustration, consider a locomotive consist 42 of three locomotives having relative available maximum power of 1, 1.5 and 0.75, respectively. (Relative available power is relative to a "reference" locomotive, which is used to determine the total consist power. For example, in the case of a '3000 HP' reference locomotive, the first locomotive has 3000 HP, the second 4500 HP, and the third 2250 HP.) Suppose that the mission is broken into seven segments. Given the above scenario, the following combinations are available and can be matched to the track section load: 0.75, 1, 1.5, 1.75, 2.25, 2.5, 3.25, which is the combination of maximum relative HP settings for the consist. Thus, for each respective relative HP setting mentioned above, for the 0.75 setting the third locomotive is on and the first and second are off, for 1 the first locomotive is on and the second and third are off, etc. In a preferred embodiment, the trip optimizer selects the maximum required load and adjusts via notch calls while minimizing an overlap of power settings. Hence, if a segment calls for between 2 and 2.5 (times 3000 HP) then locomotive 1 and locomotive 2 are used while locomotive 3 is in either idle or in standby mode, depending on the time it is in this segment and the restart time of the locomotive.

In another exemplary embodiment, an analysis may be performed to determine a trade off between emission output and locomotive power settings to maximize higher notch operation where the emissions from the exhaust after treatment devices are more optimal. This analysis may also take into consideration one of the other parameters discussed above regarding train operation optimization. This analysis may be performed for an entire mission run, segments of a mission run, and/or combinations of both.

FIG. 13 depicts a block diagram of exemplary elements included in a system for optimized train power makeup. As illustrated and discussed above, a train load estimator 560 is provided. A trip mission time determinator 570 is also provided. A processor 245 is also provided. As disclosed above, though directed at a train, similar elements may be used for other engines not being used within a rail vehicle, such as but not limited to off-highway vehicles, marine vessels, and stationary units. The processor 245 calculates a total amount of power required to power the train 235, 236, 237 based on the train load determined by the train load estimator 560 and a trip mission time determined by the trip mission time determinator 570. A determination is further made of a type of locomotive needed and/or a number of locomotives needed, based on each locomotive power output, to minimally achieve the minimum total amount of power required based on the train load and trip mission time.

The trip mission time determinator 570 may segment the mission into a plurality of mission segments, such as a segment A and a segment B, as discussed above. The total amount of power may then be individually determined for each segment of the mission. As further discussed above, an additional locomotive 255 is part of the train 235, 236, 237 and is provided for backup power. The power from the backup locomotive 255 may be used incrementally as a requirement is identified, such as but not limited to providing power to get the train 235, 236, 237 back on schedule for a particular trip segment. In this situation, the train 235, 236, 237 is operated to achieve and/or meet the trip mission time.

The train load estimator 560 may estimate the train load based on information contained in the train makeup docket 480, historical data, a rule of thumb estimation, and/or table data. Furthermore, the processor 245 may determine a trade off between emission output and locomotive power settings to maximize higher notch operation where the emissions from the exhaust after-treatment devices are optimized.

Figure 14:
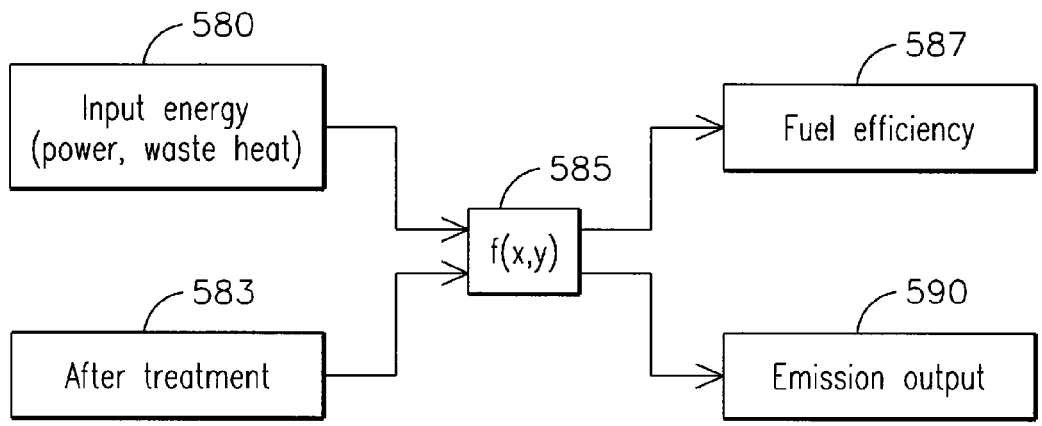
FIG. 14 depicts a block diagram of a transfer function for determining a fuel efficiency and emissions for a diesel powered system.

FIG. 14 depicts a block diagram of a transfer function for determining a fuel efficiency and emissions for a diesel powered system. Such diesel-powered systems include, but are not limited to, locomotives, marine vessels, OHV, and/or stationary generating stations. As illustrated, information pertaining to input energy 580 (such as power, waste heat, etc.) and information about an after treatment process 583 are provided to a transfer function 585. The transfer function 585 utilizes this information to determine an optimum fuel efficiency 587 and emission output 590.

Figure 15:
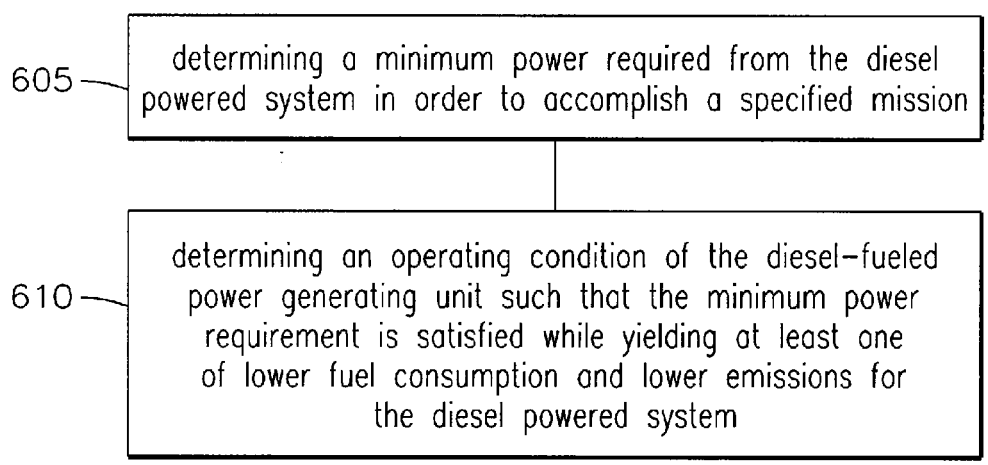
FIG. 15 depicts an exemplary embodiment of a flow chart determining a configuration of a diesel powered system having at least one diesel-fueled power generating unit.

FIG. 15 depicts an exemplary embodiment of a method for determining a configuration of a diesel-powered system having at least one diesel-fueled power generating unit. As shown in flowchart 600, the method includes determining a minimum power required from the diesel-powered system in order to accomplish a specified mission, at 605. An operating condition of the diesel-fueled power generating unit is determined such that the minimum power requirement is satisfied while yielding at least one of lower fuel consumption and/or lower emissions for the diesel powered system, as at 610. As disclosed above, the method illustrated in flowchart 600 is applicable for a plurality of diesel-fueled power generating units, such as, but not limited to, locomotives, marine vessels, OHVs, and/or stationary generating stations. Additionally, this flowchart 600 may be implemented using a computer software program that may reside on a computer readable media.

Figure 16:
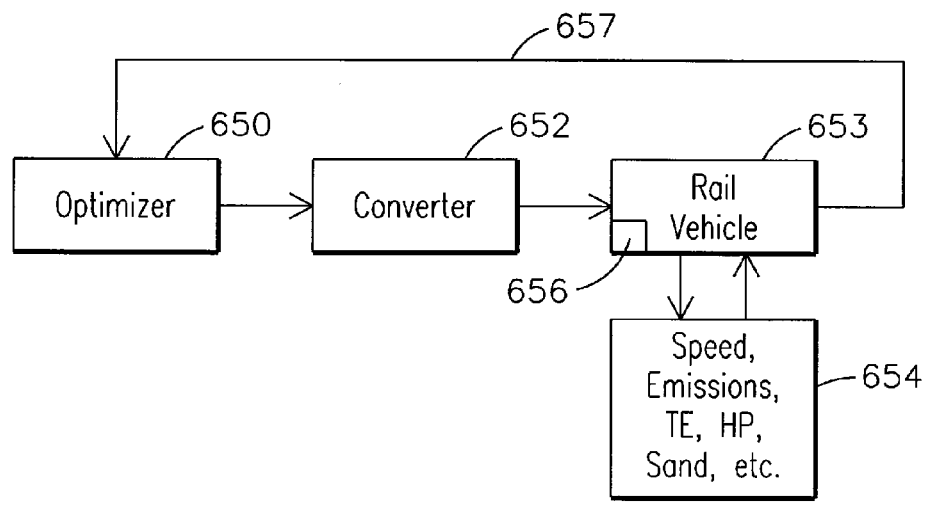
FIG. 16 depicts an exemplary embodiment of a closed-loop system for operating a rail vehicle.

FIG. 16 depicts an exemplary embodiment of a closed-loop system for operating a rail vehicle. As illustrated, the system includes an optimizer 650, a converter 652, a rail vehicle 653, and at least one output 654 from gathering specific information, such as, but not limited to, speed, emissions, tractive effort, horse power, and a friction modifier technique (e.g., applying sand). The output 654 may be determined by a sensor 656 that is part of the rail vehicle 653, or in another exemplary embodiment independent of the rail vehicle 653. Information initially derived from information generated from the trip optimizer 650 and/or a regulator is provided to the rail vehicle 653 through the converter 652. Locomotive data gathered by the sensor 656 from the rail vehicle is then communicated back to the optimizer 650 over a close-loop communication pathway 657.

The optimizer 650 determines operating characteristics for at least one factor that is to be regulated, such as speed, fuel, emissions, etc. The optimizer 650 determines at least one of a power and/or torque setting based on a determined optimized value. The converter 652 is provided to convert information about power, torque, speed, emissions, a friction modifying technique (such as but not limited to applying sand), setup, configurations, etc., into a form suitable for applying to the control inputs for the rail vehicle 653, usually a locomotive. Specifically, this information or data may be converted to an electrical signal.

Figure 17:
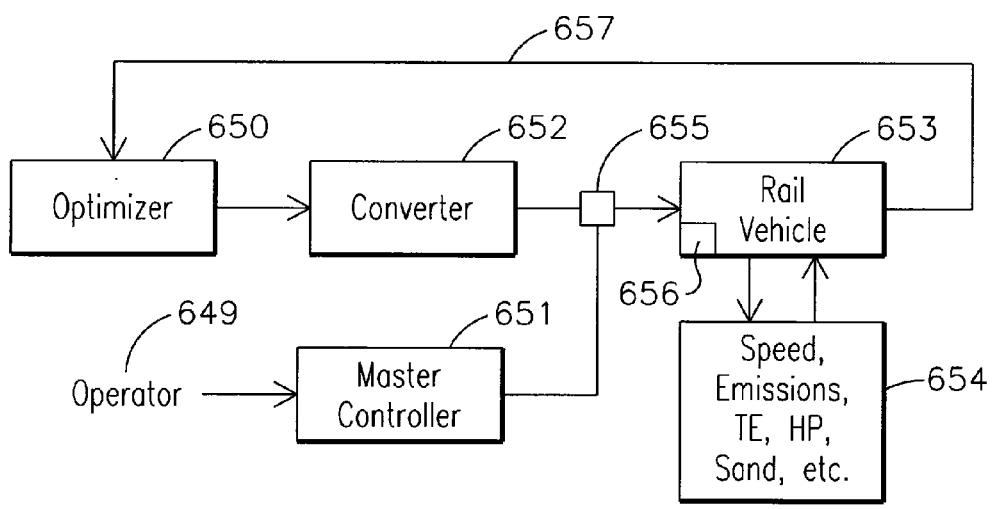
FIG. 17 depicts the closed loop system of FIG. 16 integrated with a master control unit.

As illustrated in further detail below, the converter 652 may interface with any one of a plurality of devices, such as a master controller, remote control locomotive controller, a distributed power drive controller, a train line modem, analog input, etc. FIG. 17 depicts the closed loop system integrated with a master control unit 651. The converter, for example, may selectively disconnect or disable the output of the master controller (or actuator) 651. (The master controller 651 is normally used by the operator to command the locomotive, as relating to power, horsepower, tractive effort, implementation of a friction modifying technique (such as but not limited to applying sand), braking (including at least one of dynamic braking, air brakes, hand brakes, etc.), propulsion, and the like. Those skilled in the art will readily recognize that the master controller may be used to control both hard switches and software-based switches used in controlling the locomotive.) Once the master controller 651 is disconnected, the converter 652 then generates control signals in place of the master controller 651. The disconnection of the actuator 651 may be by electrical wires, software switches, a configurable input selection process, etc. A switching device 655 is illustrated to perform this function. More specifically, the operator control input of the master controller 651 is disconnected.

Though FIG. 17 discloses a master controller 651, this is specific to a locomotive. Those skilled in the art will recognize that in other applications, such as those disclosed above, other devices may provide a function equivalent to that of the master controller as used in a locomotive. For example, an accelerator pedal is used in an OHV or transportation bus, and an excitation control is used on a generator. With respect to marine vessels, there may be multiple force producers (e.g., propellers), in different angles/orientation, that are controlled in a closed-loop manner.

As discussed above, the same technique may be used for other devices, such as a control locomotive controller, a distributed power drive controller, a train line modem, analog input, etc. Though not illustrated, those skilled in the art will readily recognize that the converter similarly could use these devices and their associated connections to the locomotive for applying input control signals to the locomotive. The communication system 657 for these other devices may be either wireless or wired. More specifically, the converter may be interfaced with devices (such as a drive controller, a modem, etc.) other than the master controller 651.

Figure 18:
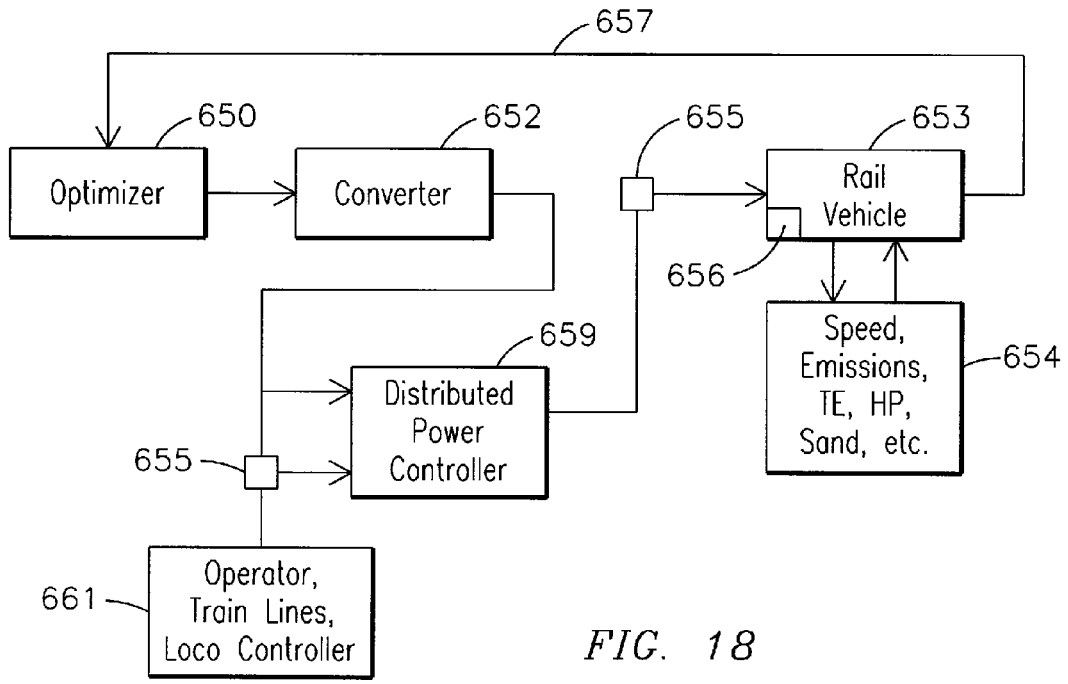
FIG. 18 depicts an exemplary embodiment of a closed-loop system for operating a rail vehicle integrated with another input operational subsystem of the rail vehicle.

FIG. 18 depicts an exemplary embodiment of a closed-loop system for operating a rail vehicle integrated with another input operational subsystem of the rail vehicle. For example, the distributed power drive controller 659 may receive inputs from various sources 661 (such as, but not limited to, the operator, train lines, and locomotive controllers) and transmit the information to locomotives in the remote positions. The converter 652 may provide information directly to the input of the DP controller 659 (as an additional input) or break one of the input connections and transmit the information to the DP controller 659. A switch 655 is provided to direct how the converter 652 provides information to the DP controller 659 as discussed above. The switch 655 may be a software-based switch and/or a wired switch. Additionally, the switch 655 is not necessarily a two-way switch. The switch may have a plurality of switching directions based on the number of signals it is controlling.

Figure 19:
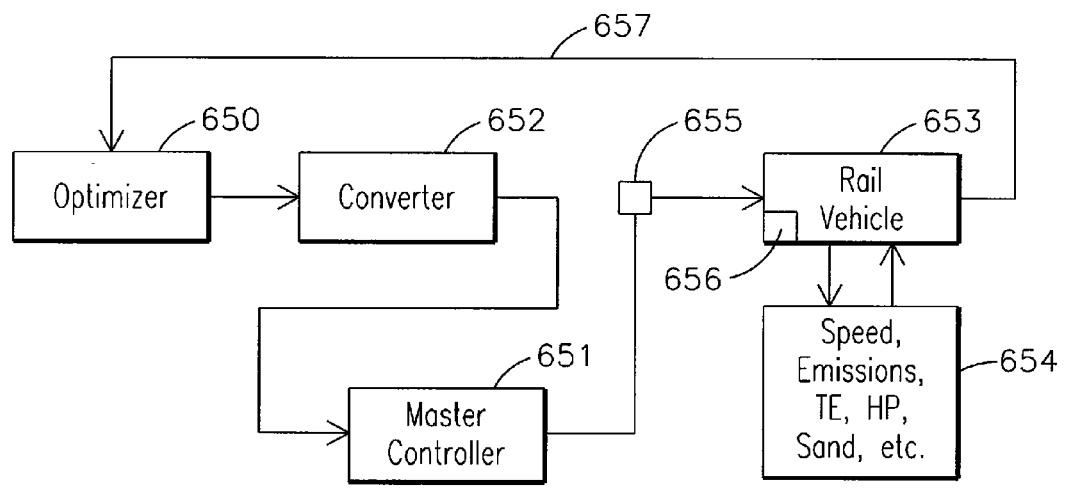
FIG. 19 depicts another exemplary embodiment of the closed-loop system with a converter which may command operation of the master control unit.

In another exemplary embodiment, the converter may command operation of the master controller, as illustrated in FIG. 19. The converter 652 has a mechanical means for moving the actuator 651 automatically based on electrical signals received from the optimizer 650.

Sensors 656 are provided aboard the locomotive to gather operating condition data 654, such as speed, emissions, tractive effort, horse power, etc. Locomotive output information from the sensors 656 is then provided to the optimizer 650, usually through the rail vehicle 653, thus completing the closed loop system.

Figure 20:
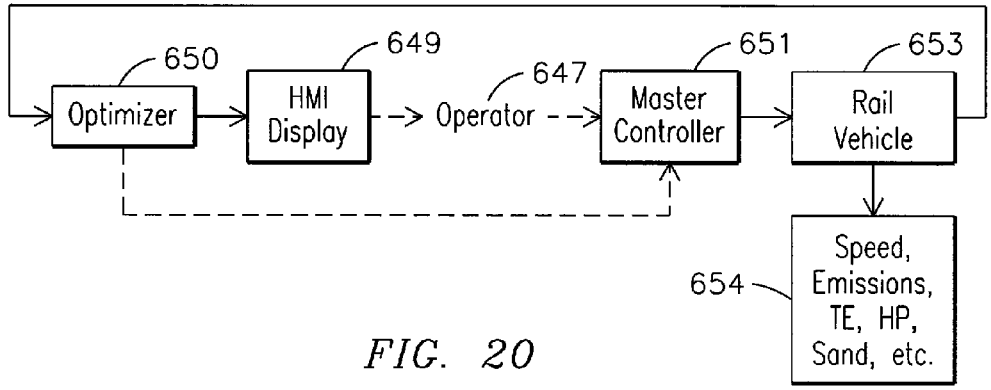
FIG. 20 depicts another exemplary embodiment of a closed-loop system.

FIG. 20 depicts another closed loop system, but where an operator is in the loop. The optimizer 650 generates the power/operating characteristic required for the optimum performance. The information is communicated to the operator 647, through a human machine interface (HMI) and/or display 649 or the like. Information could be communicated in various forms including audio, text or plots, or video displays. The operator 647 in this case can operate the master controller or pedals or any other actuator 651 to follow the optimum power level.

If the operator follows the plan, the optimizer continuously displays the next operation required. If the operator does not follow the plan, the optimizer may recalculate/re-optimize the plan, depending on the deviation and the duration of the deviation of power, speed, position, emission, etc. from the plan. If the operator is unable to meet an optimized plan to an extent where re-optimizing the plan is not possible or where safety criteria have been or may be exceeded, in an exemplary embodiment the optimizer may take control of the vehicle to ensure optimized operation, annunciate a need to consider the optimized mission plan, or simply record the occurrence for future analysis and/or use. In such an embodiment, the operator could retake control by manually disengaging the optimizer.

Figure 21:
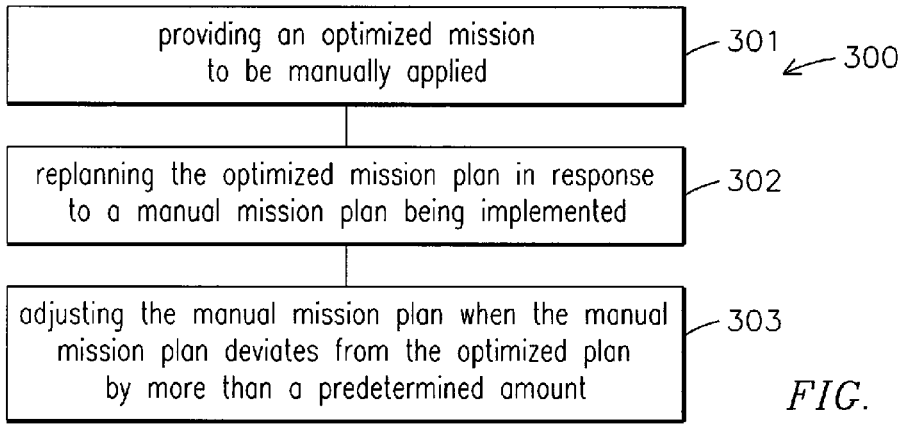
FIG. 21 is a flowchart showing an exemplary embodiment of a trip optimization method for when an operator input may be in the decision loop.

FIG. 21 depicts an exemplary embodiment of a flowchart 300 for when an operator input may be in the decision loop. An optimized plan is provided that may be manually applied, at 301. More specifically, an input device is available through which the operator may control the vehicle based on information contained in the optimized plan. The optimized mission plan is re-planned in response to a manual mission plan being implemented, at 302. When the manual plan deviates from the optimized plan by more than a predetermined amount, the manual plan may be adjusted, such as autonomously based on information contained in the optimized plan, at 303. For example, if the optimized mission plan provides for a certain speed for a given segment of the mission, if the manually applied mission plan results in exceeding that speed, the optimized mission plan may be autonomously implemented to apply a correction to insure the speed remains at an acceptable rate. Such an approach may be utilized for example when a hard limit is about to be breached or when a soft limit has been exceeded for a predetermine amount of time.

In another exemplary example, when the vehicle is being controlled based on the optimized mission plan, the operator is allowed to modify, adjust, or trim a value determined by the optimized mission plan by a select amount or for a given time period. By way of illustration, if the optimizer has commanded a specific velocity for a specific segment of track, but, as an example only, this is a segment of the mission that the operator has traversed previously and prefers a different velocity, the trip optimizer is configured to allow the operator to adjust the velocity, provided that the adjusted velocity is within a preset adjustment range as established within the trip optimizer. If the adjustment is outside of the adjustment range, the operator has an option to disengage the trip optimizer and then set the velocity preferred. Similarly, the optimizer may be configured to modify the operator command by a select amount.

Figure 22:
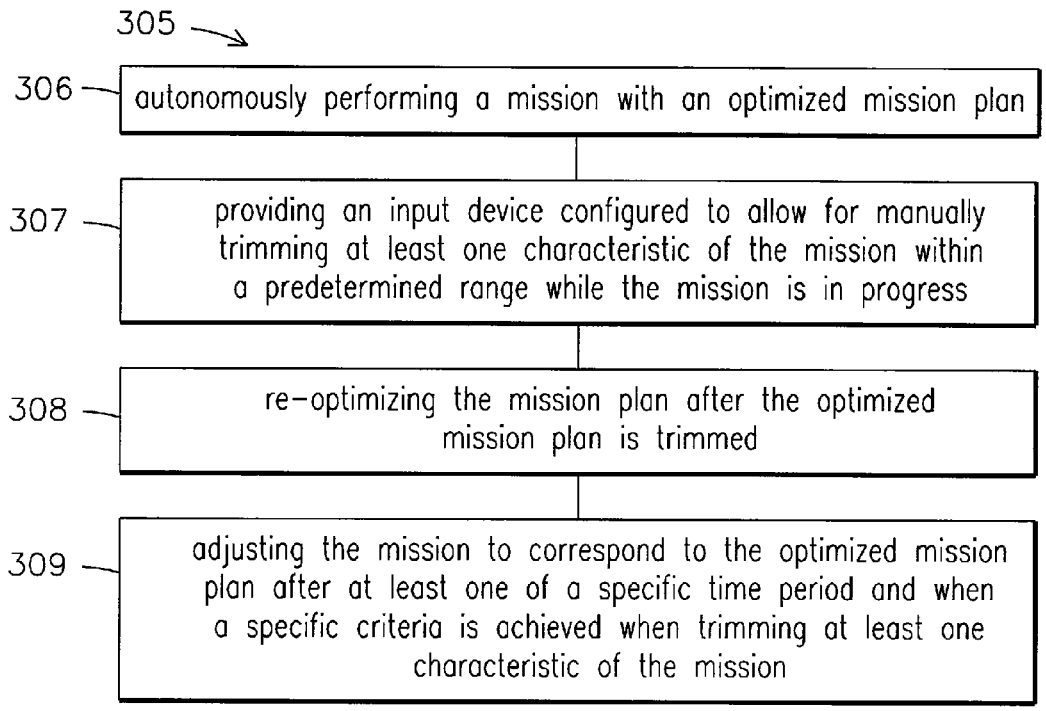
FIG. 22 is a flowchart illustrating an exemplary embodiment of a trip optimization method, where an operator interface is available for the operator to trim an optimized mission plan.

FIG. 22 shows a flowchart that depicts an exemplary embodiment of a trip optimization method, where an operator interface is available for the operator to adjust, modify, and/or trim an optimized mission plan or commands. In this flowchart 305, a mission is being autonomously performed according to an optimized mission plan, at 306. Autonomous performance may include performing the optimized mission using a closed-loop technique. The mission plan is manually adjusted. More specifically, an input device is provided which is configured to allow for manually trimming at least one characteristic of the mission within a predetermined range while the mission is in progress, at 307. The mission plan may be re-optimized after the optimized mission plan is trimmed, at 308. More specifically, re-optimization of the mission plan occurs at other times rather than only before implementation of the mission plan. The mission plan may be adjusted to correspond to the optimized mission plan after a specific time period and/or a specific criterion has been achieved when trimming at least one characteristic of the mission, at 308. For example, in cases where the operator desires to operate the locomotive at a given speed for a certain part of the mission, when the operator adjusts the mission plan, the operator may also implement a command or sequence for when the operator wants the optimized mission plan to be followed again, such as after leaving a tunnel. Prior to utilizing the optimized mission plan again, a re-plan of the optimized mission plan may be performed. The terms "adjusting" and "trimming" are both used here. Trimming is also meant to mean adjusting; however, trimming may be viewed as making a more minor adjustment.

Figure 23:
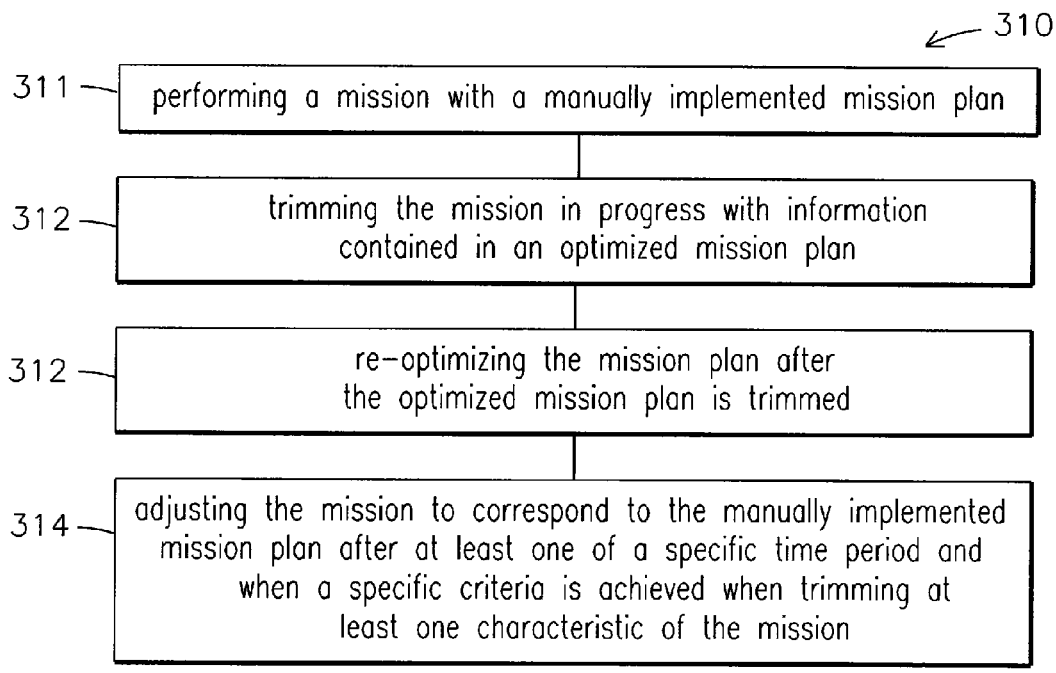
FIG. 23 is a flowchart illustrating an exemplary embodiment of a trip optimization method, where the optimizer may modify an operator's mission plan.

The converse of the above exemplary embodiment disclosed in FIG. 22 is also possible. More specifically, FIG. 23 shows a flowchart illustrating an exemplary embodiment of a trip optimization method where the optimizer may modify an operator's mission plan or commands. The flowchart 210 illustrates a mission that is performed according to a manually implemented mission plan, at 311. The manually implemented mission, while in progress, is trimmed, adjusted, and/or modified with information contained in an optimized mission plan, at 312. The mission plan is re-optimized after the manually implemented mission plan is trimmed, adjusted, and/or modified. As is further disclosed, the mission is adjusted to correspond to the manually implemented mission plan after a specific time period and/or when a specific criterion is achieved when trimming at least one characteristic of the mission.

In another exemplary example, the operator and the trip optimizer may work together to operate the diesel powered system. For example, the operator may control a characteristic, such as but not limited to pitch, and the optimizer is configured to control at least one other characteristic, such as but not limited to thrust. In another exemplary embodiment, where multiple thrusters and/or engines are available, the operator may control at least one thruster and/or engine and the trip optimizer may control at least one other thruster and/or engine.

Figure 24:
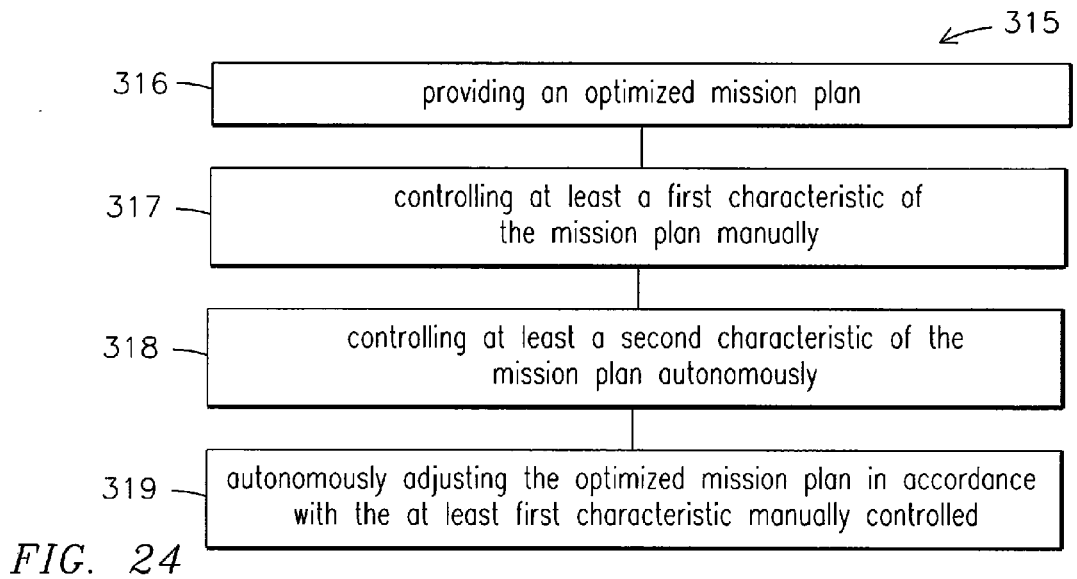
FIG. 24 is a flowchart illustrating an exemplary embodiment of a trip optimization method, where parts of mission are divided between at least the trip optimizer and another entity.

FIG. 24 depicts an exemplary embodiment of a flowchart illustrating where parts of mission are divided between at least the trip optimizer and another entity, such as but not limited to the operator. In this flowchart 315, an optimized mission plan is provided, at 316. At least one characteristic of the mission plan is controlled manually, at 317. At least another one characteristic of the mission plan is autonomously controlled, at 318. The optimized mission plan is autonomously adjusted, through a closed loop process in accordance with the at least one manually controlled characteristic, at 319.

Figure 25:
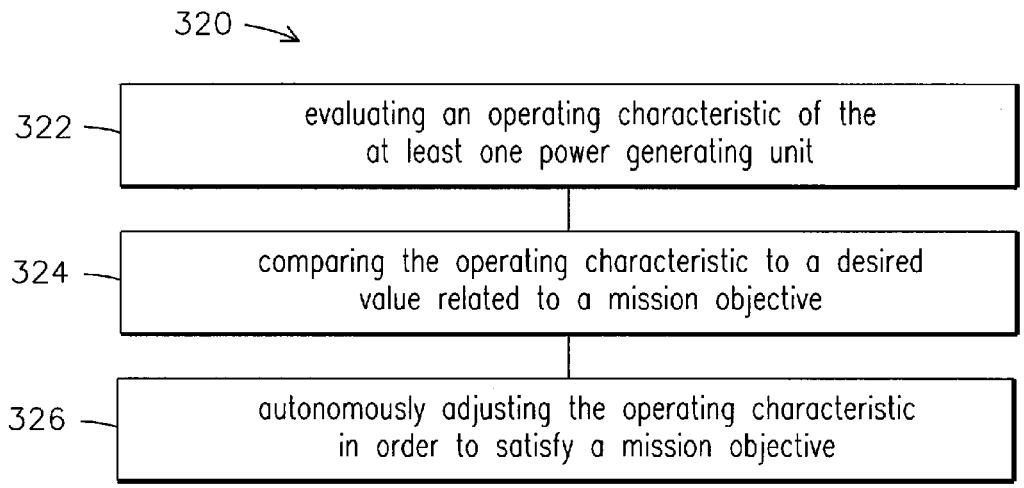
FIG. 25 is a flowchart showing an exemplary embodiment of a method for operating a powered system.
Figure 34:
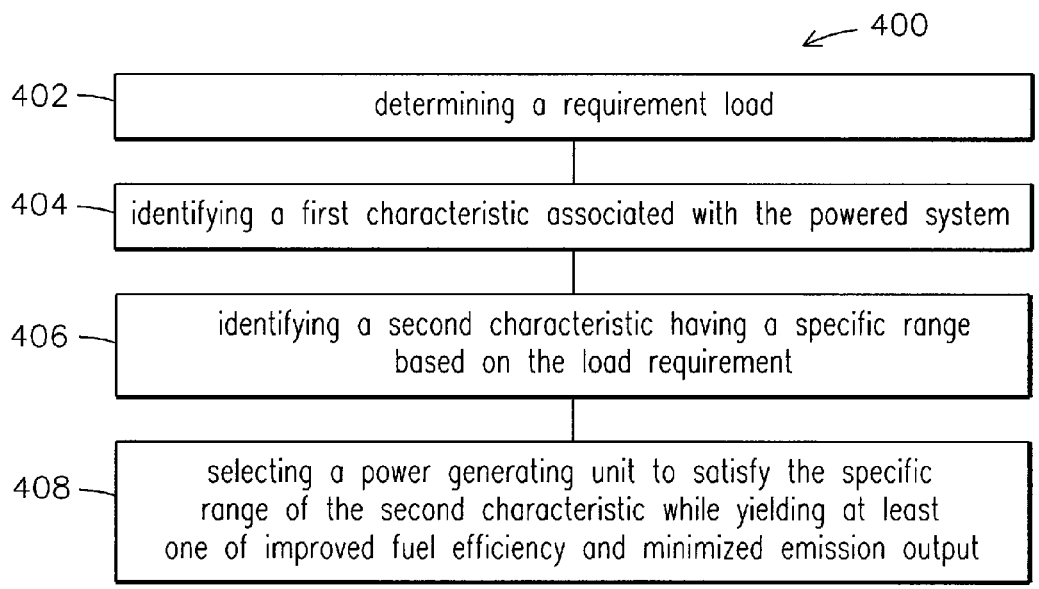
FIG. 34 depicts a flow chart illustrating an exemplary embodiment for improving fuel efficiency of a powered system through optimized power makeup.

The embodiments disclosed herein may also be used where a powered system is part of a fleet and/or a network of powered systems. FIG. 25 shows a flowchart 320 depicting an exemplary embodiment of a method for operating a powered system having at least one power generating unit, where the powered system may be part of a fleet and/or a network of powered systems. Evaluating an operating characteristic of at least one power generating unit is disclosed, at 322. The operating characteristic is compared to a desired value related to a mission objective, at 324. The operating characteristic is autonomously adjusted in order to satisfy a mission objective, at 326. As disclosed herein, autonomous adjustment may be performed using a closed-loop technique.

Figure 26:
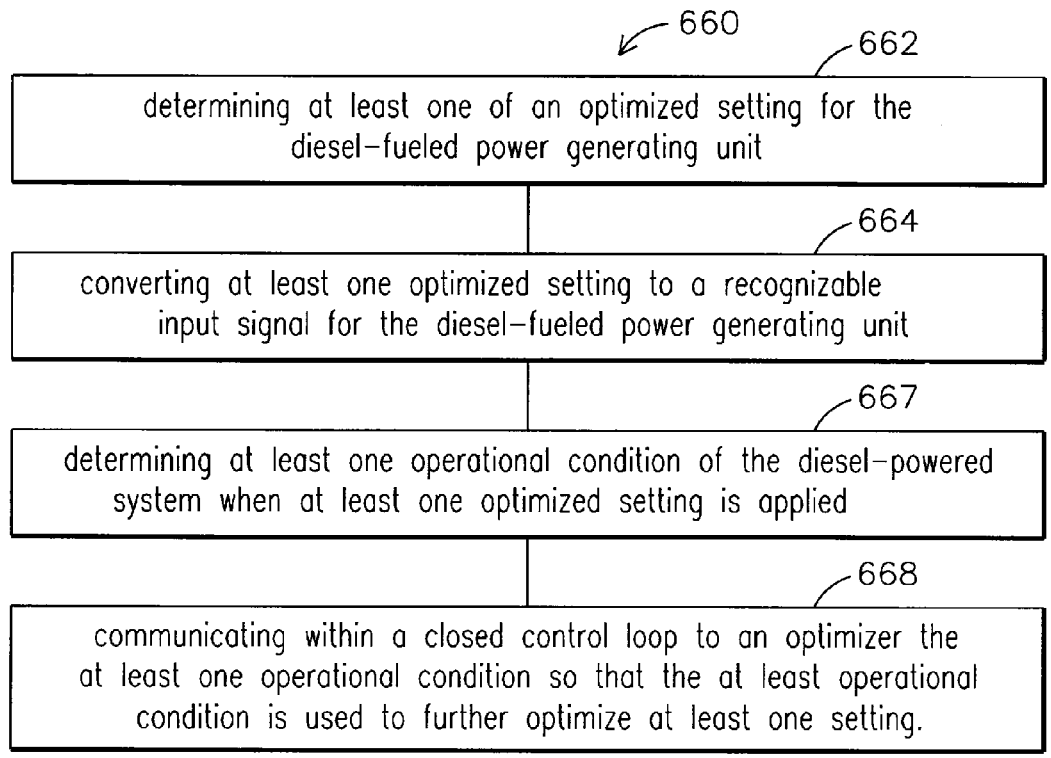
FIG. 26 is a flowchart showing an exemplary embodiment of a method for operating a rail vehicle in a closed-loop process.

FIG. 26 shows a flowchart 660 that depicts an exemplary embodiment of a method for operating a rail vehicle in a closed-loop process. The method includes determining an optimized setting for a locomotive consist, at 662. The optimized setting may include a setting for any setup variable such as, but not limited to, at least one of power level, optimized torque emissions, and/or other locomotive configurations. The optimized power level and/or the torque setting is converted to a recognizable input signal for the locomotive consist, at 664. At least one operational condition of the locomotive consist is determined when at least one of the optimized power level and the optimized torque setting is applied, at 667. The at least one operational condition is communicated to an optimizer within a closed control loop, for further use in optimizing at least one of power level and torque setting, at 668.

As disclosed above, the method shown in flowchart 660 may be performed using a computer software code having one or more computer software modules. Therefore, for rail vehicles that may not initially have the ability to utilize the method(s) disclosed herein, electronic media containing the computer software modules may be accessed by a computer on the rail vehicle so that the software modules may be loaded onto the rail vehicle for implementation. Electronic media is not meant to be limiting, since any of the computer software modules may also be loaded through an electronic media transfer system, including a wireless and/or wired transfer system, such as but not limited to using the Internet to accomplish the installation.

Locomotives produce emissions at rates based on notch levels. In reality, a lower notch level does not necessarily result in a lower emission per unit output, e.g., gm/hp-hr, and the reverse is true as well. Such emissions may include, but are not limited to, particulates, exhaust, and heat. Similarly, noise levels from a locomotive also may vary based on notch levels, in particular noise frequency levels. Therefore, when emissions are mentioned herein, those skilled in the art will readily recognize that exemplary embodiments of the invention are also applicable for reducing noise levels produced by a diesel powered system. Therefore, even though both emissions and noise are disclosed at various times herein, the term emissions should be read to also include noise.

When an operator calls for a specific horse power level, or notch level, the operator is expecting the locomotive to operate at a certain traction power or tractive effort. In an exemplary embodiment, to minimize emission output, the locomotive is able to switch between notch/power/engine speed levels while maintaining the average traction power desired by the operator. For example, suppose that the operator calls for notch setting 4 or 2000 HP. Then the locomotive may operate at notch 3 for a given period, such as a minute, and then move to notch 5 for a period and then back to notch 3 for a period such that the average power produced corresponds to notch 4. The locomotive moves to notch 5 because the emission output of the locomotive at this notch setting is already known to be less than when at notch 4. During the total time that the locomotive is moving between notch settings, the average is still notch 4, thus the tractive power desired by the operator is still realized.

The time for each notch is determined by various factors, such as but not limited to, the emissions at each notch, power levels at each notch, and the operator sensitivity. Those skilled in the art will readily recognize that embodiments of the invention are operatable when the locomotive is being operated manually, and/or when operation is automatically performed, such as but not limited to when controlled by an optimizer, and during low speed regulation.

In another exemplary embodiment, multiple set points are used. These set points may be determined by considering a plurality of factors such as, but not limited to, notch setting, engine speed, power, and engine control settings. In another exemplary embodiment, when multiple locomotives are used but may operate at different notch/power settings, the notch/power setting are determined as a function of performance and/or time. When emissions are being reduced, other factors that may be considered for a tradeoff include, but are not limited to, fuel efficiency and noise. Likewise, if the desire is to reduce noise, emissions and fuel efficiency may be considered. A similar analysis may be applied if fuel efficiency is what is to be improved.

Figure 27:
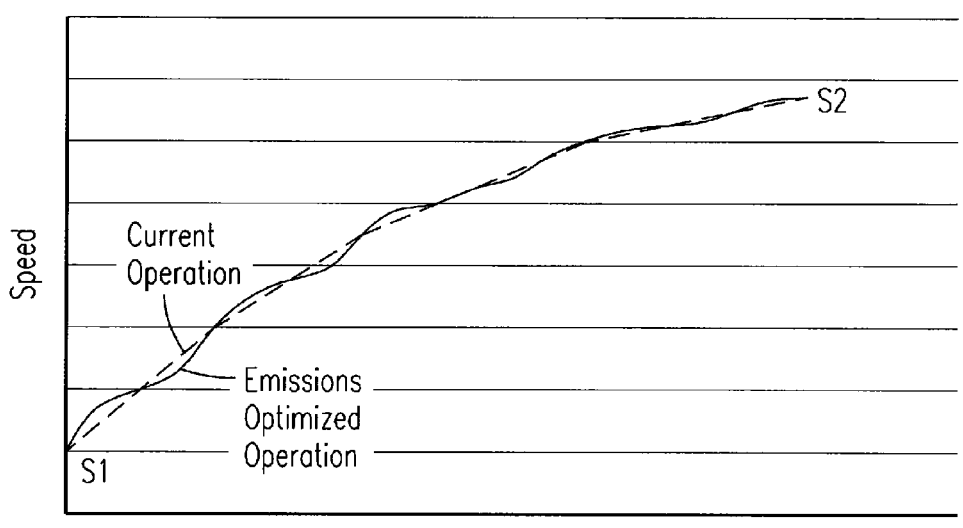
FIG. 27 depicts an embodiment of a speed versus time graph comparing current operations to emissions optimized operation.

FIG. 27 depicts an embodiment of a speed versus time graph comparing current operations to emissions optimized operation. The speed change compared to desirable speed can be arbitrarily minimized. For example, if the operator desires to move from one speed (S1) to another speed (S2) within a desired time, it can be achieved with minor deviations.

Figure 28:
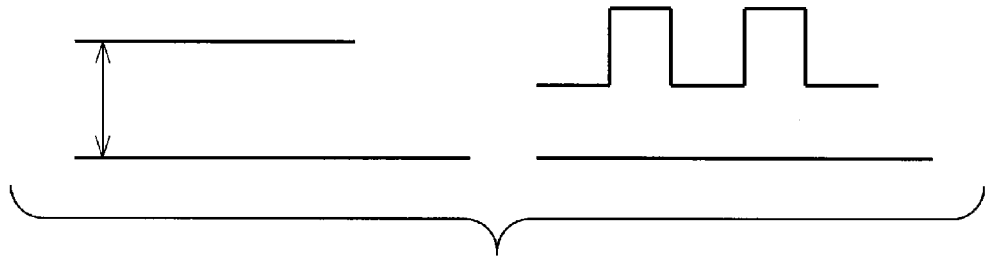
FIG. 28 depicts a modulation pattern compared to a given notch level.

FIG. 28 depicts a modulation pattern that results in maintaining a constant desired notch and/or horsepower. The amount of time at each notch depends on the number of locomotives and the weight of the train and its characteristics. Essentially, the inertia of the train is used to integrate the tractive power/effort to obtain a desired speed. For example, if the train is heavy the time between transitions of notches 3 to 5 and vice versa in the example can be large. In another example, if the number of locomotives for a given train is great, the times between transitions need to be smaller. More specifically, the time modulation and/or cycling will depend on train and/or locomotive characteristics.

As discussed previously, emission output may be based on an assumed notch distribution, but the operator/rail road is not required to have that overall distribution. Therefore it is possible to enforce the notch distribution over a period of time, over many locomotives over a period of time, and/or for a fleet locomotives over a period of time. By being provided with emission data, the trip optimizer described herein compares the desired notch/power setting with emission output based on notch/power settings and determines the notch/power cycle to meet the speed required while minimizing emission output. The optimization could be explicitly used to generate the plan, or the plan could be modified to enforce, reduce, and/or meet the emissions required.

Figure 29:
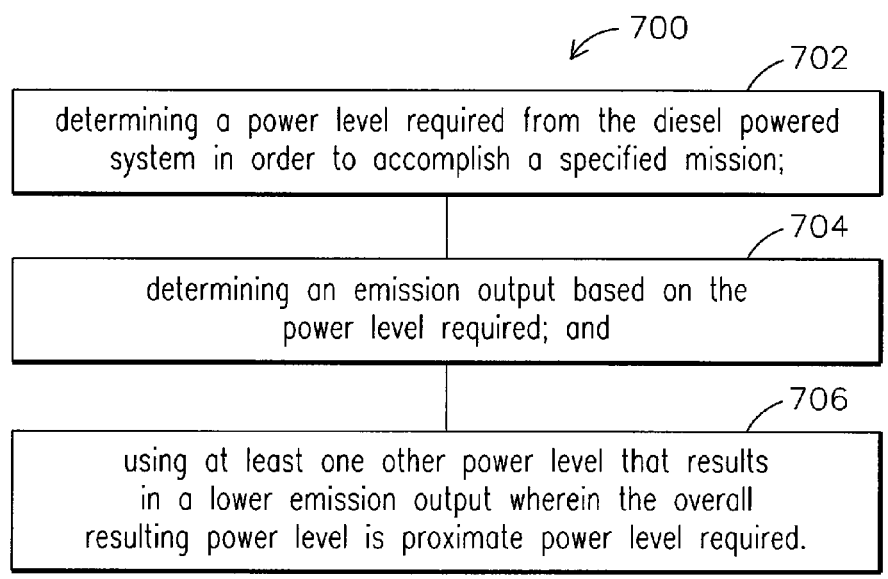
FIG. 29 depicts an exemplary flowchart for determining a configuration of a diesel powered system.

FIG. 29 depicts a flowchart 700 of an exemplary embodiment of a method for determining a configuration of a diesel powered system having at least one diesel-fueled power generating unit. The flowchart 700 provides for determining a minimum power, or power level, required from the diesel powered system in order to accomplish a specified mission, at 702. An emission output based on the minimum power, or power level, required is determined, at 704. Using at least one other power level that results in a lower emission output wherein the overall resulting power is proximate the power required, at 706, is also disclosed. Therefore, in operation, the desired power level with at least another power level may be used, and/or two power levels, not including the desired power level, may be used. In the second example as disclosed above, if the desired power level is notch 4, the two power levels used may include notch 3 and notch 5.

As disclosed, emission output data based on notch speed is provided to the trip optimizer. If a certain notch speed produces a high amount of emission, the trip optimizer can function by cycling between notch settings that produce lower amounts of emission output so that the locomotive will avoid operating at the particular notch while still meeting the speed of the avoided notch setting. For example, applying the same example provided above, if notch 4 is identified as a less than optimum operational setting because of emission output, but notch 3 and 5 produce lower emission outputs, the trip optimizer may cycle between notch 3 and 5 where that the average speed equates to speed realized at notch 4. Therefore, while providing speed associated with notch 4, the total emission output is less than the emission output expected at notch 4.

Therefore, when operating in this configuration, although speed constraints imposed based on defining notch limitations may not actually be adhered to, total emission output over a complete mission may be improved. More specifically, although a region may impose that rail vehicles are not to exceed notch 5, the trip optimizer may determine that cycling between notch 6 and 4 is preferable to reach the notch 5 speed limit but while also improving emission output, because emission outputs for the combination of notch 6 and 4 are better than when operating at notch 5 since either notch 4 or notch 6 or both are better than notch 5.

Figure 30:
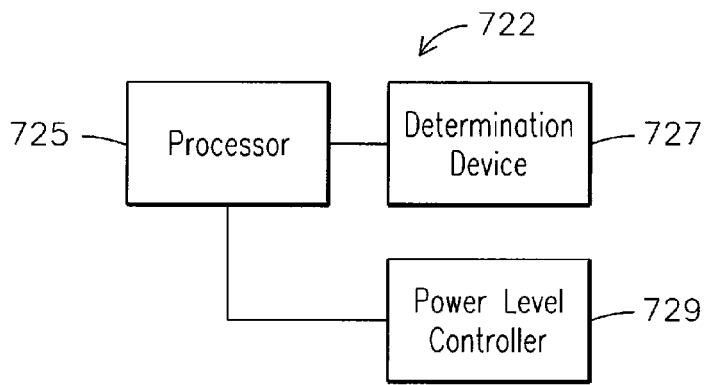
FIG. 30 depicts a system for minimizing emission output.

FIG. 30 illustrates a system 722 for minimizing emission output, noise level, etc., from a diesel powered system having at least one diesel-fueled power generating unit while maintaining a specific speed. The system 722 includes a processor 725 for determining a minimum power required from the diesel-powered system, such as the train 18, in order to accomplish a specified mission. The processor 725 may also determine when to alternate between two power levels. A determination device 727 is used to determine an emission output based on the minimum power required. A power level controller 729 for alternating between power levels to achieve the minimum power required is also included. The power level controller 729 functions to produce a lower emission output while the overall average resulting power is proximate the minimum power required.

Figure 31:
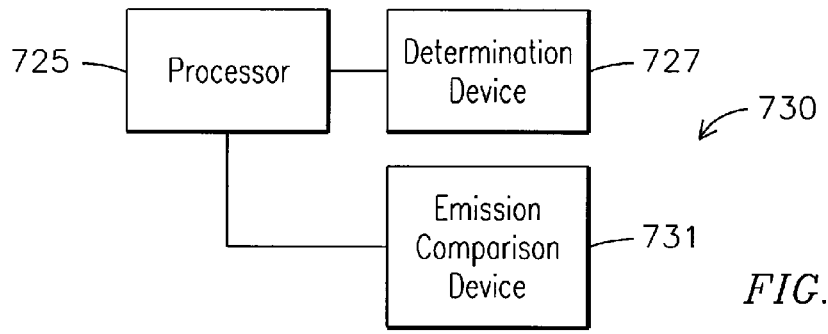
FIG. 31 depicts a system for minimizing emission output from a diesel powered system.

FIG. 31 illustrates a system 730 for minimizing one or more outputs (e.g., emission output and noise output) from a diesel powered system having at least one diesel-fueled power generating unit, while maintaining a specific speed. The system includes the determination device 727 for determining a power level required by the diesel-powered system in order to accomplish a specified mission. The determination device 727 may also determine an emission output based on the required power level. The system also includes an emission comparison device 731. The emission comparison device 731 compares emission outputs for other power levels with the emission output based on the power level required. The emission output of the diesel-fueled power generating unit, such as a train 18, is reduced based on the power level required by alternating between at least two other power levels which produce less emission output than the power level required, wherein alternating between the at least two other power levels produces an average power level proximate the power level required while producing a lower emission output than the emission output of the power level required. As disclosed herein, alternating power levels in this manner may simply result in using at least one other power level. Therefore, although characterized as an alternating operation, this term is not meant to be limiting. Towards this end, the system 730 may include a device (not shown) for alternating between the at least two power levels and/or using at least one other power level.

Although the above examples illustrate cycling between two notch levels to meet a third notch level, those skilled in the art will readily recognize that more than two notch levels may be used when seeking to meet a specific desired notch level. Therefore, three or more notch levels may be included in cycling to achieve a specific desired net level to improve emissions while still meeting speed requirements. Additionally, one of the notch levels that are alternated with may include the desired notch level. Therefore, at a minimum, the desired notch level and another notch level may be the two power levels that are alternated between.

Figure 32:
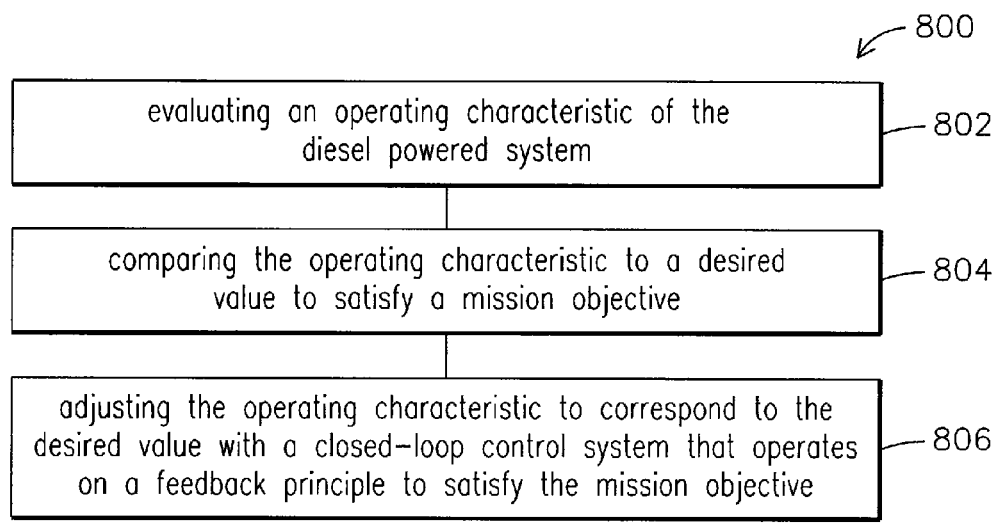
FIG. 32 depicts a method for operating a diesel powered system having at least one diesel-fueled power generating unit.

FIG. 32 discloses a flowchart 800 that illustrates an exemplary embodiment of a method for operating a diesel powered system having at least one diesel-fueled power generating unit. The mission objective may include consideration of at least one of total emissions, maximum emission, fuel consumption, speed, reliability, wear, forces, power, mission time, time of arrival, time of intermediate points, and/or braking distance. Those skilled in the art will readily recognize that the mission objective may further include other objectives based on the specific mission of the diesel powered system. For example, as disclosed above, a mission objective of a locomotive is different than that that of a stationary power generating system. Therefore the mission objective is based on the type of diesel powered system the method of flowchart 800 is utilized with.

The flowchart 800 discloses evaluating an operating characteristic of the diesel powered system, at 802. The operating characteristic may include at least one of emissions, speed, horse power, friction modifier, tractive effort, overall power output, mission time, fuel consumption, energy storage, and/or condition of a surface upon which the diesel powered system operates. Energy storage is important when the diesel powered system is a hybrid system having for example a diesel fueled power generating unit as its primary power generating system, and an electrical, hydraulic, or other power generating system as its secondary power generating system. With respect to speed, this operating characteristic may be further subdivided with respect to time varying speed and position varying speed.

The operational characteristic may further be based on a position of the diesel powered system when used in conjunction with at least one other diesel powered system. For example, in a train, when viewing each locomotive as a diesel powered system, a locomotive consist may be utilized with a train. Therefore there will be a lead locomotive and a remote locomotive. For those locomotives that are in a trail position, trail mode considerations are also involved. The operational characteristic may further be based on an ambient condition, such as but not limited to temperature and/or pressure.

Also disclosed in the flowchart 800 is comparing the operating characteristic to a desired value to satisfy the mission objective, at 804. The desired value may be determined from at least one of the operational characteristic, capability of the diesel powered system, and/or at least one design characteristic of the diesel powered system. With respect to the design characteristics of the diesel powered system, there are various modules of locomotives where the design characteristics vary. The desired value may be determined at a remote location, such as but not limited to a remote monitoring station, and/or at a location that is a part of the diesel powered system.

The desired value may be based on a location and/or operating time of the diesel powered system. As with the operating characteristic the desired value is further based on at least one of emissions, speed, horse power, friction modifier, tractive effort, ambient conditions including at least one of temperature and pressure, mission time, fuel consumption, energy storage, and/or condition of a surface upon which the diesel powered system operates. The desired value may be further determined based on a number of diesel-fueled power generating units that are either a part of the diesel powered system and/or a part of a consist, or at the sub-consist level as disclosed above.

Adjusting the operating characteristic to correspond to the desired value with a closed-loop control system that operates in a feedback process to satisfy the mission objective, at 806, is further disclosed. The feedback process may include feedback principals readily known to those skilled in the art. In general, but not to be considered limiting, the feedback process receives information and makes determinations based on the information received. The closed-loop approach allows for the implementation of the method of flowchart 800 without outside interference. However, if required due to safety issues, a manual override is also provided. The operating characteristic may be adjusted based on an ambient condition. As disclosed above, the method of flowchart 800 may also be implemented in a computer software code where the computer software code may reside on a computer readable media.

Figure 33:
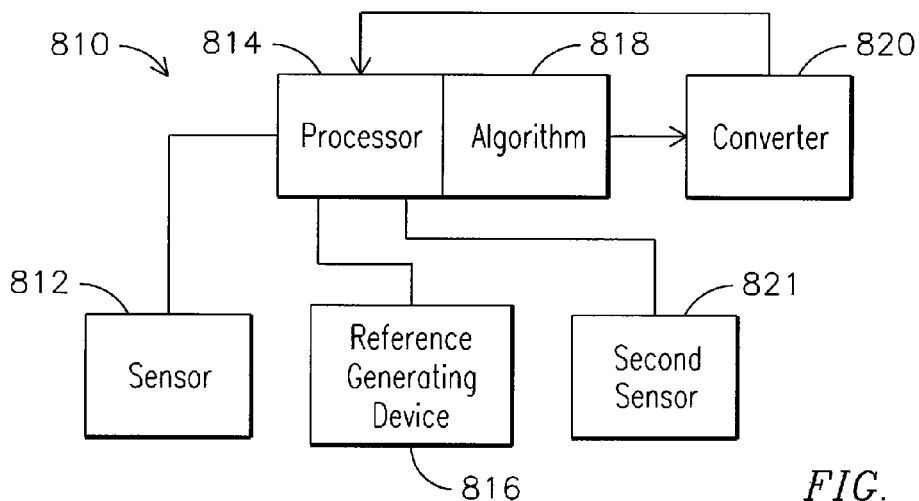
FIG. 33 depicts a block diagram of an exemplary system operating a diesel powered system having at least one diesel-fueled power generating unit.

FIG. 33 discloses a block diagram of an exemplary system for operating a diesel powered system having at least one diesel-fueled power generating unit. The system 810 includes a sensor 812 that is configured for determining at least one operating characteristic of the diesel powered system. In an exemplary embodiment, a plurality of sensors 812 are provided to gather operating characteristics from a plurality of locations on the diesel powered system and/or a plurality of subsystems within the diesel powered system. Those skilled in the art will also recognize that the sensor 812 may be an operation input device. Therefore, the sensor 812 can gather operating characteristics, or information, about emissions, speed, horse power, friction modifier, tractive effort, ambient conditions including at least one of temperature and pressure, mission time, fuel consumption, energy storage, and/or the condition of a surface upon which the diesel powered system operates. A processor 814 is in communication with the sensor 812. A reference generating device 816 is provided and is configured to identify the preferred operating characteristic. The reference generating device 816 is in communication with the processor 814. When the term "in communication" is used, those skilled in the art will readily recognize that the form of communication may be facilitated through a wired communication system/device and/or through a wireless communication system/device. The reference generating device 816 may be remote from the diesel powered system, a part of the diesel powered system, or both (i.e., part of the device 816 may be remote, another part local).

The processor 814 is outfitted with an algorithm 818 that operates in a feedback process for comparing the operating characteristic to the preferred operating characteristic, to determine a desired operating characteristic. A converter 820, in closed loop communication with the processor 814 and/or algorithm 818, is further provided to implement the desired operating characteristic. The converter 820 may be a master controller, a remote control controller, a distributed power controller, and/or a train line modem. More specifically, when the diesel powered system is a locomotive system, the converter may be a remote control locomotive controller, a distributed power locomotive controller, and a train line modem.

As further illustrated, the system 810 may include a second sensor 821. The second sensor is configured to measure at least one ambient condition, information about which is provided to the algorithm 818 and/or processor 814 to determine a desired operating characteristic. As disclosed above, exemplary examples of an ambient condition include, but are not limited to, temperature and pressure.

An additional embodiment of the present invention will now be described with respect to FIGS. 35 and 36, the former of which shows a powered system, such as a train 1016, for example, which is traveling along a predetermined route 1020 from an initial location 1018 to a final location 1019. (The term "initial" stage or location refers to any stage or location of the train 1016 or other powered system, typically at or before the occurrence of a system anomaly as discussed in more detail below. Thus, the initial stage or location may be the stage or location where the powered system commenced the mission in question, or a stage or location subsequent thereto.) The train 1016 relies on a power conversion system, such as an engine 1054 (FIG. 36), for example, as a primary source of power, and a secondary energy source 1038, to propel the train 1016 along the route 1020 from the initial location 1018 to the fixed final location 1019. As the train 1016 travels along the route 1020, a controller 1034 (see FIG. 36) continuously determines a handling location 1015 between the initial location 1018 and the final location 1019, to which the controller 1034 would direct the train 1016 in the event of an undesired or less than optimal operating condition of the engine 1054. In another embodiment, handling locations are determined on a periodic basis. (As should be appreciated, "continuously" refers to the controller carrying out another handling location determination as soon as it is finished with its current determination. "Periodic" refers to handling locations being determined on a regular but spaced-apart basis, such as every minute.)

Upon arriving at the handling location 1015, a number of options may be exercised to facilitate the train 1016 moving from the handling location 1015 to the final location 1019 along the predetermined route 1020. In one example, the engine 1054 may have experienced a partial degradation, and upon arriving at the handling location 1015, the train 1016 may be parked at the handling location 1015, such as at a siding, for example. The train 1016 may be subsequently separated into two or more sections, such that the locomotive 1017 may depart from the handling location 1015 to the final location 1019 (or a subsequent handling location further down the predetermined route 1020) with one section of the train 1016, after which the locomotive 1017 may return to the handling location 1015 to transport the remaining section of the train 1016 to the final location 1019 (or subsequent handling location). In another example, upon parking the train 1016 at the handling location 1015, a train operator or the controller 1034 may communicate with a dispatch center to request that a locomotive be brought to the handling location 1015 and coupled to the train 1016, after which the locomotive may transport the train 1016 to the final location 1019 (or a subsequent handling location further down the predetermined route 1020). Additionally, upon arriving at the handling location 1015, such as the siding, for example, the engine, control system, and/or other component of the system experiencing degradation may be repaired and/or replaced on-site or by a worker dispatched to the handling location 1015, for example. Additionally, in another example, while the train 1016 is parked at the handling location 1015, such as the siding, for example, an auxiliary power unit (APU) may be utilized to charge the secondary energy source 1038. The APU may be, for example, a small engine or an electrical plug-in outlet positioned at a siding, for example. In the example, upon charging the secondary energy source 1038 with the APU, the controller 1034 may control the charge level in the secondary energy source 1038, based upon minimizing the total energy consumed, as the train 1016 travels from the handling location 1015 to a subsequent handling location (or to the final location 1019). At the subsequent handling location, the APU may be utilized to recharge the secondary energy source 1038, such that the controller 1034 can manage the level of charge in the secondary energy source 1038 as the train 1016 progresses to a subsequent handling location. This process may be continued until the train 1016 reaches the final location 1019. In addition to the APU, any locomotive engine of a train having one or more locomotives may be utilized to charge the secondary energy source 1038. Additionally, upon dispatching another locomotive to the handling location 1015, the engine of this locomotive may be utilized to charge the secondary energy source 1038. Any external source may be utilized to charge the secondary energy source 1038 while the train 1016 is parked at the handling location 1015, or at subsequent handling locations, until the train 1016 arrives at the final location 1019, for example.

Undesired operating conditions may depend on mission requirements, and for example may include degradation or inoperability of the engine 1054 or other locomotive system or track components. Although FIG. 35 illustrates that the handling location 1015 is positioned on the predetermined route 1020 between the initial location 1018 and the final location 1019, the handling location 1015 need not be positioned on the predetermined route 1020, and may be located on a proximate side route, for example. Additionally, the handling location 1015 may not be positioned between the initial location 1018 and the final location 1019, and may coincide with the final location 1019, for example, based on the position of the train 1016 along the predetermined route 1020 at the time of engine anomaly, and/or the degree of degradation of the engine 1054 (i.e., entire or partial). For example, if the train 1016 has traveled 90% of the distance from the initial location 1018 to the final location 1019 and only experiences a partial or minor anomaly, the controller 1034 may determine that the handling location 1015 coincides with the final location 1019, and may direct the train 1016 to the end of the predetermined route 1020. Additionally, upon detecting a degradation of the engine 1054, the controller 1034 may communicate with a dispatch center, in order to request favorable speed restrictions and/or light signals along the predetermined route 1020 which reduce the need to brake and/or slow down, and thus the controller 1034 may determine that the handling location 1015 coincides with the final location 1019, for example.

In the case of stationary applications, engine performance may be considered to be degraded when operating parameters are outside prescribed emissions (including noise), temperature, and other operational limits. FIG. 36 illustrates an exemplary embodiment of a system 1000 for managing an amount of necessary stored energy in a secondary energy source 1038 of the train 1016 for the train 1016 to travel to a handling location 1015 upon the occurrence of an undesired operating condition of the power delivery system, such as the engine 1054 (supplied with energy via the alternator 1076 and the inverter 1074) of the train 1016. Thus, for example, upon the occurrence of an anomaly in the powered system that would potentially prevent the powered system from reaching the final location (or stage) 1019, the determined stored energy may be used to propagate the powered system to the proximate handling stage 1015, for repair or other action. In one embodiment, for example, the anomaly occurs in a primary power or energy source 1054 of the powered system, e.g., in a diesel internal combustion engine, which would hinder the powered system in reaching the final stage, and the stored energy is stored in a secondary power or energy source 1038 of the powered system, e.g., in a battery system.

As previously discussed, the controller 1034 continuously (or at least periodically) determines a handling location 1015, based on the initial location 1018 of the train 1016 (which may be, e.g., the current position of the train) and the final location 1019, and thus several handling locations 1015 may be positioned throughout the predetermined route 1020. At the instant that the controller 1034 determines an undesired operating condition of the engine 1054, the controller 1034 has already determined a handling location 1015 for the initial location 1018 of the train 1016 along the predetermined route 1020 at the instant of the undesired condition. Upon determining the undesired condition of the engine 1054, the controller 1034 ensures that the train 1016 travels from the initial location 1018 to the handling location 1015 along the predetermined route 1020. (As should be appreciated, the amount of energy in the secondary energy source 1038 is managed, and/or the handling location is chosen as a function of the energy in the secondary energy source, so that upon the occurrence of an undesired condition of the engine, there is enough energy in the secondary energy source for the train to travel to the handling location.)

Figure 35:
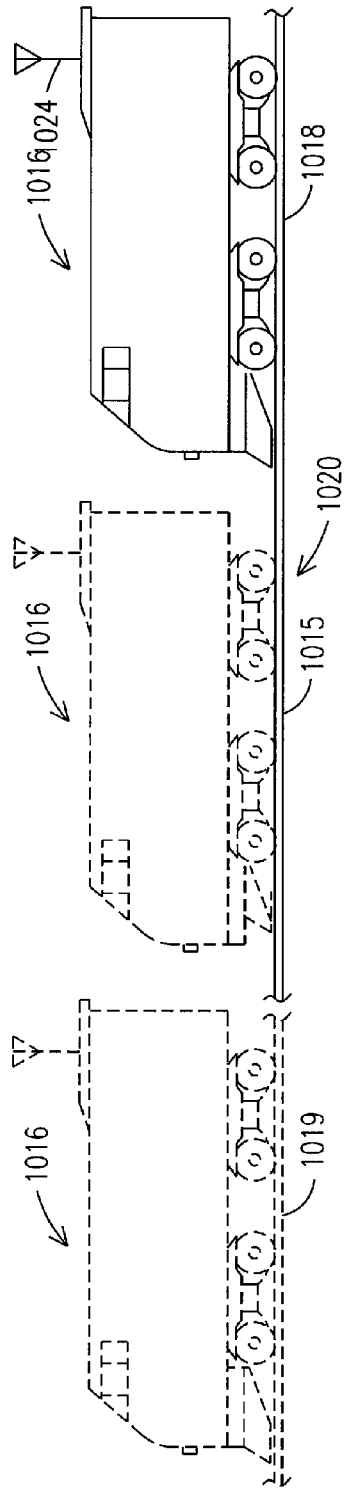
FIG. 35 is a block diagram of an exemplary embodiment of a system for managing energy within a secondary energy source in a powered system upon degradation of a power delivery system.

Although FIG. 35 illustrates a train 1016 with a locomotive 1017, exemplary embodiments of the invention are also applicable for other powered systems, such as but not limited to OHVs, marine vessels, stationary units, and agricultural vehicles, transport buses, and other vehicles, each which may use one or more diesel engines, or diesel internal combustion engines.

The system 1000 includes a position determination device such as a transceiver 1024 in wireless, infrared (IR), audible, optical, or manual communication with a plurality of location determination systems such as global positioning system (GPS) satellites 1044, 1046, for example. Although FIG. 35 illustrates a transceiver 1024 in communication with GPS satellites 1044, 1046, any type of position identification device which is capable of determining location can be used, such as speed sensors, or manual radio transmission operator inputs, for example. The transceiver 1024 determines a respective position coinciding with the initial location 1018 and the handling location 1015 of the train 1016 along the predetermined route 1020. The controller 1034 is coupled to the transceiver 1024, the engine 1054, and to the secondary energy source 1038. The controller 1034 continuously determines an amount 1055 (FIG. 37) of the necessary stored energy 1056 in the secondary energy source 1038 along the predetermined route 1020 sufficient for the train 1016 to travel from the initial location 1018 to the handling location 1015. The amount 1055 of the necessary stored energy 1056 varies with the initial location 1018 as the train 1016 travels along the predetermined route 1020. For example, as the train 1016 approaches the handling location 1015, the amount 1055 of necessary stored energy 1056 decreases, as the distance to be traveled decreases.

Figure 36:
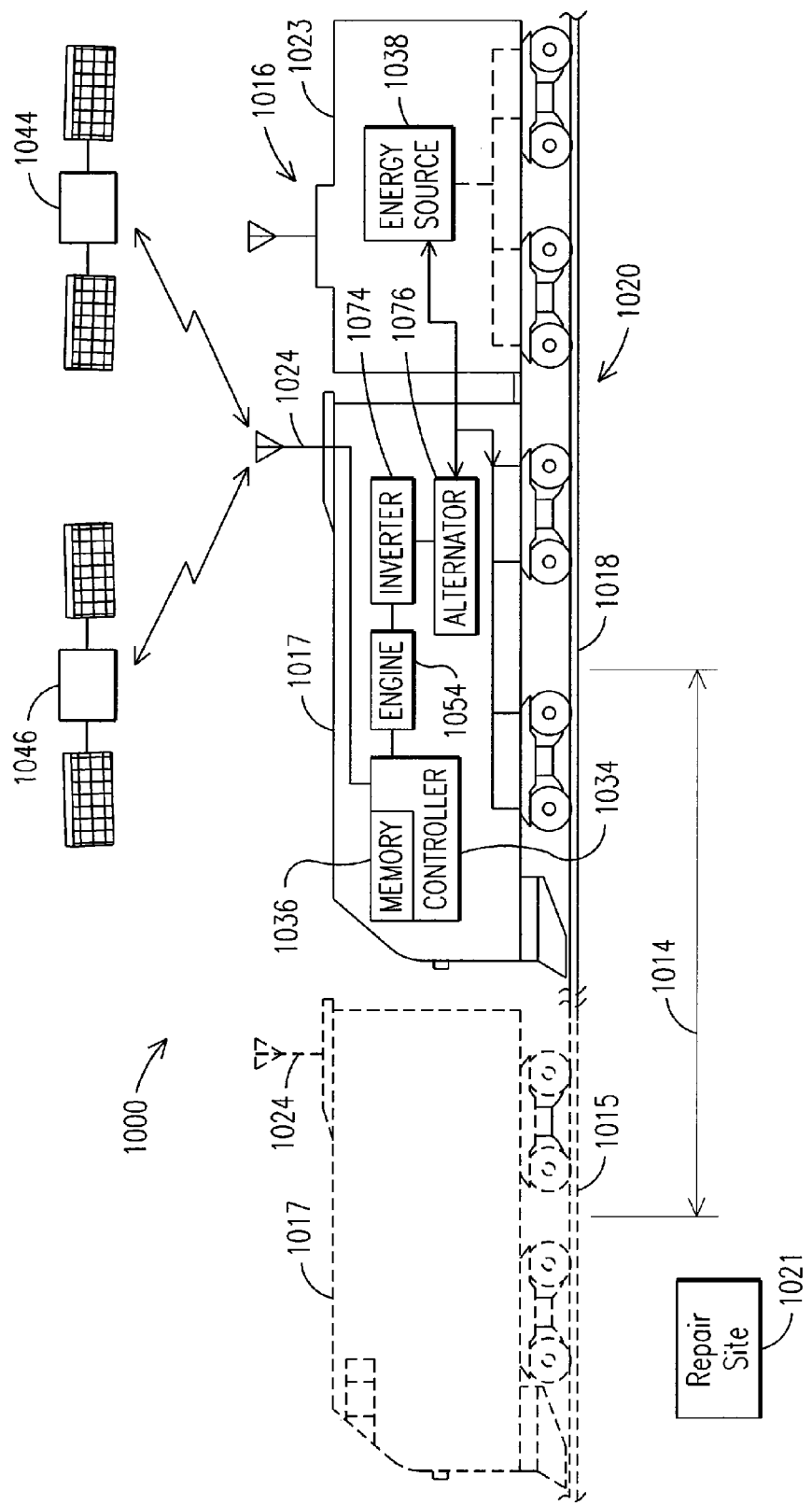
FIG. 36 is a block diagram of an exemplary embodiment of a system for managing energy within a secondary energy source in a powered system upon degradation of a power delivery system.

In the illustrated embodiment of FIG. 36, a repair site 1021 is located at the handling location 1015, and thus the train 1016 may be serviced at this location. However, a siding may be located at the handling location 1015, at which the train 1016 may be removed from the track to the siding, and thus prevent any blocking of the predetermined route 1020. Additionally, a number of other facilities may be positioned at the handling location 1015, such as a yard (for a locomotive-type powered system), a harbor or a platform (for a marine-based powered system), or a shop/stop (for OHV-based powered systems), among others.

The controller 1034 continuously determines a travel distance 1014 between the initial location 1018 and the handling location 1015 based on the initial location 1018 provided by the transceiver 1024, and the handling location 1015 stored within a memory 1036 of the controller 1034. The memory 1036 of the controller 1034 is preprogrammed with data of the predetermined route 1020 of the train 1016, including locations of repair sites 1021 and sidings among other locations along the predetermined route 1020, and track parameters (such as curvature and grade, for example) along the predetermined route 1020, for example. The controller 1034 continuously determines the necessary stored energy 1056 to travel along the travel distance 1014, based on a parameter of the train 1016 stored within the memory 1036, and a track/route parameter of the predetermined route 1020 between the initial location 1018 and handling location 1015 stored within the memory 1036. For example, the controller 1034 may determine the necessary stored energy 1056 to travel along the travel distance 1014 based upon the mass and/or length of the train 1016, and a curvature and/or grade of the predetermined route 1020 between the initial location 1018 and the handling location 1015. Alternatively, the controller 1034 may continuously determine the necessary stored energy to travel along the travel distance 1014 based upon a parameter of the train 1016 stored within the memory 1036, and previous data stored within the memory 1036 of a required energy to travel between the initial location 1018 and the handling location 1015 based upon the train parameter. Thus, the controller 1034 may determine that, on a previous trip along the predetermined route 1020, a train having one or more train parameters similar to those of the train 1016 required a pre-stored energy to travel from the initial location 1018 to the handling location 1015.

Figure 37:
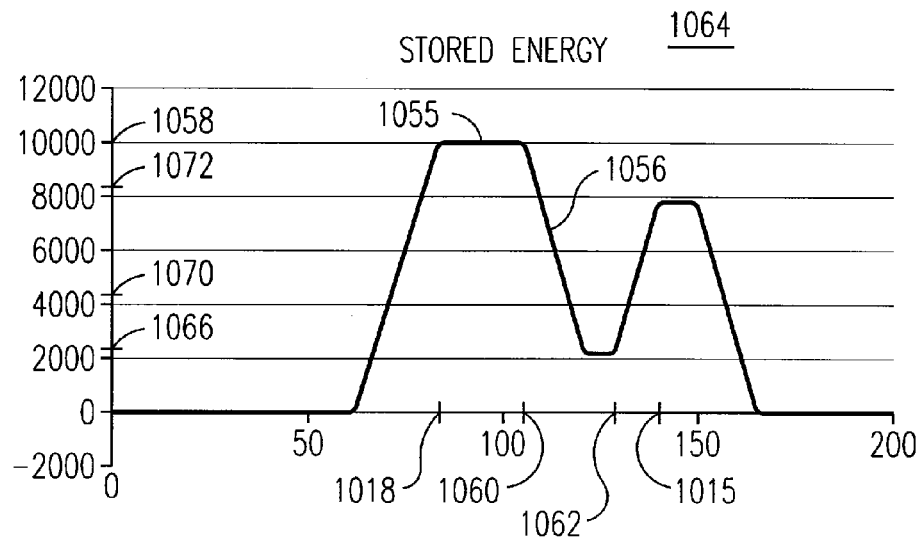
FIG. 37 is a plot of an exemplary embodiment of a storage schedule of energy within a secondary energy source in a powered system according to the present invention.

Although the embodiments of the present invention illustrated in FIGS. 35-37 discuss the train 1016 traveling along the predetermined route 1020 from the initial location 1018 to the final location 1019, one or more interim locations may be positioned along the predetermined route 1020 between the initial location 1018 and the final location 1019. Each of the interim locations may be a respective interim mission stored in the memory 1036 of the controller 1034, in terms of a consumed energy goal, a produced emissions goal, a consumed fuel goal, a crew change goal, or any reliability or performance-placed goals including one or more of location, power, emissions, reliability, fuel savings and wear, for example. In an exemplary embodiment, if the controller 1034 determines a degradation or failure of the engine 1054 along the predetermined route 1020 prior to an interim location representing an interim mission of a consumed energy goal, the controller 1034 will direct the train 1016 to the currently determined handling location 1015 based upon minimizing the amount of consumed energy to the handling location 1015, for example. In this example, the train 1016 may or may not comply with the interim mission of the consumed energy goal at the interim location, depending on whether the train 1016 actually reaches the interim location (i.e., the handling location 1015 is positioned beyond the interim location along the predetermined route 1020) and whether the actual energy consumed from the initial location 1018 to the interim location complies with the consumed energy goal, for example.

For stationary applications (e.g., those having an engine as a power source), the equivalent to the energy required to transport the train 1016 from the initial location 1018 to the final location 1019 may be represented by a power delivery mission, which is the amount of power delivered over the time duration of the stationary mission. Once an undesired condition of the engine is determined, based upon the emissions restrictions, temperature restrictions, and environmental restrictions, a load transient parameter is utilized as indicative of the amount of power delivered over a time duration to bring the engine to a handling state, which is equivalent to the handling location 1015 of the locomotive, for example. Also, for stationary applications, the emission restrictions, temperature restrictions, and environmental restrictions are typically used to determine which engines may provide backup power, in addition to what loads may be transferred.

Based on the condition of the power delivery system, or engine 1054 as illustrated in FIG. 36, the controller 1034 may select an appropriate handling location 1015 to transport the train 1016. Although the embodiments of the present invention illustrated in FIGS. 35-37 have heretofore been described with respect to the degradation or inoperability of an engine 1054, a degradation or inoperability of a control system, a part of a control system, a braking system, and/or any power delivery system or a component of a power delivery system, may cause the controller 1034 to propel the train 1016 to the handling location 1015, for example. As an example, if a control system that regulates the speed of the train 1016 becomes unreliable or inoperable, the controller 1034 may direct or control the train 1016 to the handling location 1015. As another example, if the braking system of a train 1016 becomes unreliable or inoperable prior to a large upcoming hill, the controller 1034 may immediately stop the train 1016 at a handling location 1015, instead of traveling over the large hill. If an undesirable or hazardous condition exists, the controller may 1034 may direct or control the train to a safe and/or secure handling location 1015 that is not the vicinity of other trains, populated areas, etc. Examples of handling locations 1015 that the controller 1034 would avoid during the occurrence of a hazardous condition would be an underportion of a tunnel, a train yard, or a dock or drilling platform, for example.

For marine applications, a handling location 1015 may be a port, dock, or open water, for example. In the event of an undesired operating condition of a marine system, in which the marine vessel is positioned at a port or dock, a dangerous condition may be created, and thus the marine vessel may be moved to open water to remove the dangerous condition, for example. As another example, if a marine vessel is positioned next to a drilling platform or a larger vessel to be tugged, and a position control system of the vessel is less than optimal, the marine vessel may be repositioned at a new location away from the drilling platform or larger vessel, for example. In OHV applications, if the brakes in the vehicle become degraded or inoperable, the vehicle may be repositioned to a location which minimizes any potential hazards to the crew, vehicle and related equipment.

Upon the occurrence of an undesired operating condition of the engine 1054 at the initial location 1018 (or upon the occurrence of some other system anomaly), the controller 1034 is configured to manage an amount of stored energy 1056 at a plurality of incremental locations 1060, 1062 between the initial location 1018 and the handling location 1015 by determining a storage schedule 1064 of the amount of stored energy 1056 in the secondary energy source 1038 at each respective incremental location 1060, 1062. The determination of the storage schedule 1064 is based upon the train parameter(s) and the track parameter(s) between the initial location 1018 and the handling location 1015. The storage schedule 1064 is determined based upon minimizing the amount of consumed energy in traveling between the initial location 1018 and the handling location 1015. As illustrated in the exemplary plot of a storage schedule 1064 in FIG. 36, the storage schedule 1064 includes a range of a storage level in the secondary energy source 1038 within a maximum charge level 1058. In an exemplary embodiment, the secondary energy source 1038 charges between a minimum charge level 1066 and a maximum charge level coinciding with the amount 1055 of stored energy 1056 at the initial location 1018 (FIG. 37). The minimum charge level 1066 and maximum charge level 1058 may exceed a previous minimum charge level 1070 and previous maximum charge level 1072, such that the necessary amount 1055 of stored energy 1056 may be adequately stored in the secondary energy source 1038.

Upon determining an undesired operating condition of engine 1054, the controller 1034 (in an automatic mode) or the locomotive operator (in a manual mode) transmits a wireless signal to a dispatch center. The transmission indicates the initial location 1018 and one or more train parameters, in order to request that the control signals and/or speed restrictions between the initial location 1018 and the handling location 1015 be modified, such that the train 1016 avoids (or minimizes) stopping or braking locations between the initial location 1018 and the handling location 1015, to avoid excessive fuel consumption, energy consumption, and emissions production. For example, the dispatch center may evaluate the initial location 1018 and the train parameters, and preset all of the control signals between the initial location 1018 and the handling location 1015 to a green status, for example, such that the train 1016 does not need to stop at any of the control signals. If the train 1016 travels to the handling location 1015 without each control signal being green, an excessive amount of fuel will be consumed, such as during the braking operation in which an amount of momentum will be lost which is later regained. Upon communicating with the dispatch center, the controller 1034 replans the trip along the predetermined route 1020 based on minimizing the total amount of energy consumed.

In stationary applications, as discussed above, the emissions restrictions are known, and in the event that some of the power delivery units are excessively stressed, the emissions restrictions may be exceeded. Thus, the power delivery units may be stressed such that the emissions restrictions are not exceeded.

Once the train 1016 arrives at a siding at the handling location 1015, a first portion of the train 1016 may be detached at the handling location 1015, and a second portion of the train 1016 may continue along the predetermined route 1020 to the final location 1019. An example of a circumstance in which the train 1016 may detach a first portion at the siding at the handling location 1015 would include an instance in which perishable and/or goods having an expedited delivery, for example, were located on the second portion of the train 1016. Once the second portion of the train 1016 departs from the handling location 1015 to the final location 1019, the controller 1034 remanages a level of energy within the secondary energy source 1038 such that a minimum amount of energy required to travel between the handling location 1015 and the final location 1019 is stored in the secondary energy source 1038 at the handling location 1015, and the second portion of the train 1016 arrives at the final location 1019. The controller 1034 determines a storage schedule of the energy level within the secondary energy source 1038 based upon a train parameter of the second portion of the train 1016 and a track parameter of the predetermined route 1020 between the handling location 1015 and the final location 1019.

Although FIGS. 35 and 36 include a train 1016 having a single locomotive 1017, the train may include a plurality of locomotives, such as three locomotives, for example. In an exemplary embodiment, a power delivery system in one locomotive may be degraded or inoperable, leaving two nominally functioning power delivery systems in the remaining two locomotives. The controller of the train determines at each incremental location between the initial location and the final location, whether to store an excess amount of primary energy from the remaining two power delivery systems in the secondary energy source, or to discharge an amount of energy from the secondary energy source. The controller determines whether to store the excess primary energy or discharge the amount of secondary energy based upon a track parameter at each incremental location between the initial location and the final location, a train parameter of the train traveling along the predetermined route, an energy demand at each incremental location based upon the track parameter and the train parameter, and a maximum available primary energy based upon a sum of the power delivery systems available from the functioning power delivery systems. For example, if the train includes three 4000 HP locomotives, only two of which include functioning power delivery systems, and the train requires 6000 HP to approach a hill, the controller may determine to store 2000 HP from the excess power delivery systems (8000 HP total) into the secondary energy source. If the hill requires 10000 HP of energy to travel over, the controller may discharge the stored 2000 HP from the secondary energy source, in addition to the 8000 HP total primary energy, in order to achieve the required 10000 HP to travel over the hill, for example.

As previously discussed, the embodiments of the present invention also apply to OHV applications, which involve a vehicle traveling along a route to a final location, such as a mine, for example. Additionally, the embodiments of the present invention also apply to marine applications, which involve a vessel traveling along a route to a dock, for example.

In stationary systems, in the event of an undesired operating condition of the engine, a reserve battery capacity may be utilized in order to start a backup engine, or reduce some low value loads, for example. As a result, the operating temperature of the engine may decrease. Thus, starting an additional engine or shutting down low value loads may achieve a handling power in the engine equivalent to the handling location 1015 along the predetermined route 1020. As previously discussed, the load transient parameter indicates the expected load versus time upon determining an undesired operating condition of the engine. Similar to the train 1016 discussed above, in which the train 1016 is positioned on the predetermined route 1020 and the controller 1034 is aware that the train 1016 is traveling to the final location 1019 (i.e., energy demand), in stationary applications the energy demand versus time prior to determining an undesired operating condition of the engine is also known (i.e., power delivery mission).

When selecting a secondary energy source 1038 for the locomotive 1017, the predetermined route 1020 between the initial location 1018 and the final location 1019 is considered, including the energy required and/or the power required for the train 1016 to travel from the initial location 1018 to the final location 1019. For example, a secondary energy source 1038 may be utilized, and the secondary energy source may be an energy battery which delivers an amount of energy over a relatively long time duration, or a power battery which may selectively deliver a large amount of energy for a relatively short time duration, to fulfill a large energy threshold at selective locations along the predetermined route, for example. In an exemplary embodiment, more than one secondary energy source may be utilized, in which one or more secondary energy source(s) may be responsible for propelling the train between the initial location 1018 and the final location 1019, and one or more secondary energy sources may be responsible for propelling the train to the handling location 1015 upon detecting an inoperable condition of the engine, for example. Thus, the secondary energy source used to propel the train between the initial location 1018 and the final location 1019 may charge/discharge at a frequent rate, such as once per day, for example, while the secondary energy sources used to propel the train to the handling location 1015 may only charge/discharge once per year, for example, based on the infrequency of an inoperable condition of the engine. In an exemplary embodiment, a secondary energy source used to propel the train from the initial location 1018 to the final location 1019 may be coupled with a lithium ion battery, for example, which is used to propel the train to the handling location 1015 upon the controller 1034 detecting an inoperable condition of the engine 1054, for example.

Figure 38:
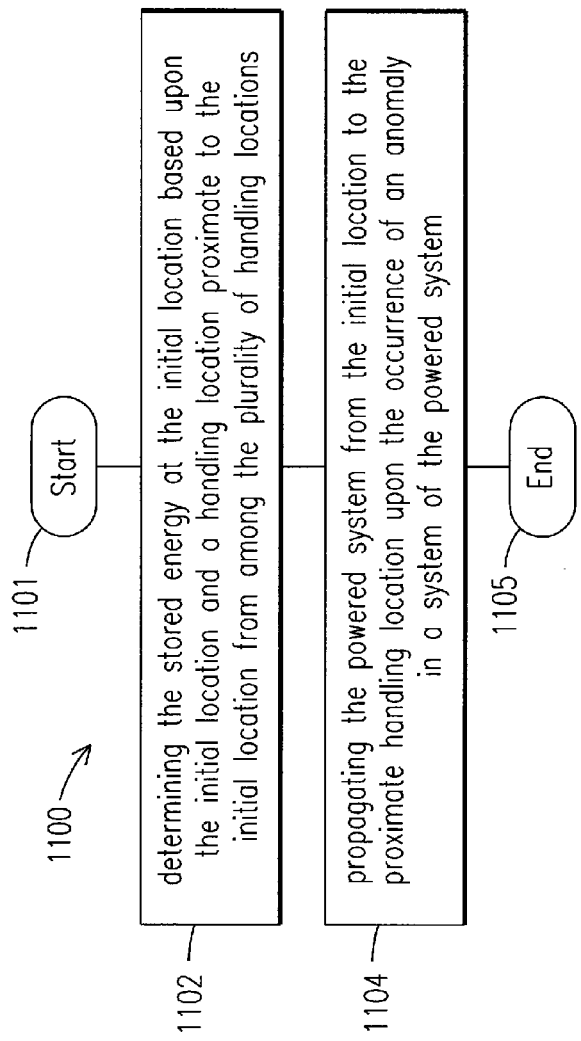
FIG. 38 depicts a method for managing energy within a secondary energy source in a powered system upon degradation of a power delivery system.

FIG. 38 illustrates an exemplary embodiment of a method 1100 for managing an amount of stored energy 1056 in a powered system. The powered system is configured to complete a mission from an initial location (or stage) 1018 to a final location (or stage) 1019. The method 1100 begins at 1101 by determining 1102 the stored energy 1056 at the initial location 1018 based upon the initial location and a handling location 1015 proximate to the initial location from among the plurality of handling locations. The method 1100 further includes propagating 1104 the powered system from the initial location 1018 to the proximate handling location 1015 upon the occurrence of an anomaly in a system of the powered system, before ending at 1105.

Figure 39:
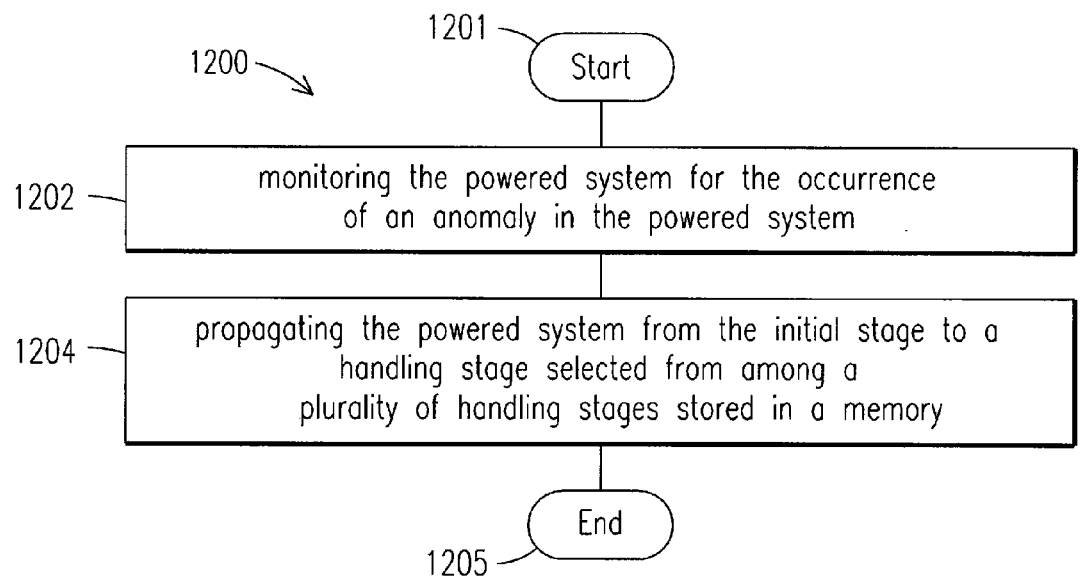
FIG. 39 depicts a method for managing energy within a secondary energy source in a powered system upon degradation of a power delivery system.

FIG. 39 illustrates an exemplary embodiment of a method 1200 for managing a powered system. The powered system is configured to complete a mission from an initial location (or stage) 1018 to a final location (or stage) 1019. The method 1200 begins at 1201 by monitoring 1202 the powered system for the occurrence of an anomaly in the powered system. Additionally, upon determining that an anomaly has occurred, the method 1200 includes propagating 1204 the powered system from the initial location (or stage) 1018 to a handling location (or stage) 1015 selected from among a plurality of handling stages stored in a memory 1036, before ending at 1205. The selected handling location (or stage) 1015 lies subsequent to the initial location (or stage) 1018 and up to and coincident with the final location (or stage) 1019. Unlike the method 1100 illustrated in FIG. 38, the method 1200 illustrated in FIG. 39 does not require a determination of stored energy required to transport the powered system from the initial location (or stage) 1018 to the handling location (or stage) 1015. For example, if a 10,000 HP powered system experiences an anomaly in which it experiences a 5000 HP reduction, the method 1200 would initially monitor 1202 this anomaly and propagate 1204 the powered system, based on the remaining available 5000 HP, from the initial location (or stage) 1018 to the handling location (or stage) 1015. In another example of a distributed power train, in which two locomotives are included in the train, the method 1200 may monitor 1202 an anomaly of an engine of one locomotive, and propagate 1204 the train from the initial location (or stage) 1018 to the handling location (or stage) 1015, based on the one remaining fuel tank and the functioning engine of the sole operational locomotive.

Based on the foregoing specification, the above-discussed embodiments of the invention may be implemented using computer programming or engineering techniques including computer software, firmware, hardware or any combination or subset thereof, wherein the technical effect is to manage an amount of stored energy in a powered system. Any such resulting program, having computer-readable code means, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM), etc., or any emitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system of the method embodiment of the invention. An apparatus for making, using or selling embodiments of the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody those discussed embodiments the invention.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

That which is claimed is:

1. A system for managing an amount of stored energy in a powered system, said powered system configured to complete a mission from an initial stage to a final stage, said system comprising:
   a controller including a memory configured to store a plurality of handling stages;
   wherein said controller is configured to determine the stored energy at said initial stage based upon said initial stage and a handling stage positioned between the initial stage and the final stage and selected from among the plurality of handling stages stored in memory; said stored energy being necessary to propagate said powered system from the initial stage to the handling stage upon the occurrence of an anomaly in said powered system.

2. The system of claim 1, wherein said powered system is one of an off-highway vehicle, a marine propulsion vehicle, a stationary powered system, and a rail vehicle.

3. The system of claim 2, wherein said powered system is a rail vehicle configured to travel along a route from an initial location to a final location, and said memory is configured to store a plurality of handling locations, said stored energy being necessary to transport said rail vehicle from the initial location to a proximate one of said plurality of handling location upon the occurrence of an anomaly in a primary power source of said rail vehicle.

4. The system of claim 3, wherein said stored energy is variable with the initial location of the rail vehicle as the rail vehicle travels along the route.

5. The system of claim 3, wherein said stored energy is based on a pre-stored energy in the memory, said pre-stored energy being equivalent to a necessary energy having transported a second rail vehicle from said initial location to said proximate handling location, said secondary rail vehicle having similar parameters to said rail vehicle.

6. The system of claim 3, wherein said determination of the stored energy is based on at least one of a travel distance between the initial location and the proximate handling location, a parameter of the rail vehicle pre-stored in the memory, or a route parameter between said initial location and the proximate handling location pre-stored in the memory.

7. The system of claim 3, wherein said proximate one of the plurality of handling locations is a secure location absent one of a hazardous and a populated condition.

8. The system of claim 3, wherein said handling locations are one of a repair site at which the rail vehicle may be serviced, and a siding adjacent to the route to position the rail vehicle such that the route is unblocked.

9. The system of claim 3, wherein said rail vehicle is a train having a plurality of locomotives, upon determining an anomaly in an engine of said first locomotive, said controller is configured to transport said train to said proximate handling location based on said stored energy; said train is configured to separate into a plurality of sections at said proximate handling location, said second locomotive is configured to transport respective portions of said train on respective trips from the proximate handling location to the final location.

10. The system of claim 3, wherein upon transporting said rail vehicle to the proximate handling location, said controller is configured to communicate with a remote dispatch center to request one of a locomotive to be transported to the proximate handling location to transport the rail vehicle from the proximate handling location to the final location and a repair crew is transported to the proximate handling location to repair the primary power source.

11. The system of claim 3, further comprising: a position determination device configured to determine said initial location, and a secondary energy source in which said controller manages the amount of stored energy, said controller being coupled to said position determination device and said secondary energy source.

12. The system of claim 11, wherein said controller is further coupled to said primary power source, and said controller is configured to determine the stored energy in the secondary energy source being necessary to transport the rail vehicle from the initial location to the proximate handling location upon detecting an anomaly in the primary power source.

13. The system of claim 12, wherein upon detecting said anomaly in the primary power source, said controller is configured to determine a storage schedule of the stored energy in the secondary energy source at a plurality of incremental positions between the initial location and the proximate handling location.

14. The system of claim 13, wherein said determination of the stored energy within the storage schedule is based on at least one of a travel distance between the initial location and the proximate handling location, a parameter of the rail vehicle pre-stored in the memory, and a route parameter between said initial location and the proximate handling location pre-stored in the memory, and said determination of the storage schedule is further based on minimizing an amount of consumed energy of said rail vehicle in traveling from said initial location to said proximate handling location.

15. The system of claim 13, wherein said determination of the storage schedule of the stored energy in the secondary energy source involves said controller decreasing a previous minimum charging level of the secondary energy source to a minimum charging level and increasing a previous maximum charging level of the secondary energy source to a maximum charging level to increase a charge capacity of the secondary energy source.

16. The system of claim 13, wherein said rail vehicle is a train having a first and second locomotive, and upon determining an anomaly in an engine of said first locomotive, said controller is configured to determine the storage schedule such that at said incremental positions, said secondary energy source is configured to one of store an amount of primary energy from an engine in said second locomotive, and discharge an amount of stored energy in the secondary energy source.

17. The system of claim 3, wherein the plurality of handling locations are positioned along the route from said initial location to said final location.

18. The system of claim 3, wherein upon determining the anomaly in the primary power source, said controller is configured to wirelessly communicate with a remote dispatch center to request a favorable wayside signal along the route from the initial location to the final location such that the stored energy is sufficient to transport the rail vehicle from the initial location to the final location.

19. A method for managing an amount of stored energy in a powered system, said powered system configured to complete a mission from an initial stage to a final stage, said method comprising:
- determining the stored energy at said initial stage based upon said initial stage and a handling stage positioned between said initial stage and said final stage, said handling stage being selected from among a plurality of handling stages stored in a memory; and
- propagating said powered system from the initial stage to the proximate handling stage upon the occurrence of an anomaly in said powered system.

20. The method of claim 19, wherein said powered system is one of an off-highway vehicle, a marine propulsion vehicle, a stationary powered system, and a rail vehicle.

21. A non-transitory computer readable media for managing an amount of stored energy in a powered system, said powered system configured to complete a mission from an initial stage to a final stage, a controller includes a memory configured to store a plurality of handling stages, said computer readable media comprising:
- a computer program code for determining the stored energy at said initial stage based upon said initial stage and a handling stage positioned between said initial stage and said final stage, said handling stage being selected from among said plurality of handling stages, said stored energy being necessary to propagate said powered system from the initial stage to the handling stage upon the occurrence of an anomaly in said powered system.

22. A method for managing a powered system, said powered system configured to complete a mission from an initial stage to a final stage, said method comprising:
- monitoring the powered system for the occurrence of an anomaly in the powered system; and
- upon determining that an anomaly has occurred, propagating the powered system from the initial stage to a handling stage selected from among a plurality of handling stages stored in a memory, wherein the selected handling stage lies subsequent to the initial stage and up to and coincident with the final stage.

23. The method of claim 22, wherein:
the powered system includes a primary energy source and a secondary energy source; and the method further comprises:
- monitoring the powered system for an anomaly in the primary energy source;
- prior to determining that an anomaly has occurred in the primary energy source, determining an amount of energy needed to propagate the powered system from the initial stage to the selected handling stage, said selected handling stage being selected based at least in part on a capacity of said secondary energy source meeting or exceeding the determined amount of energy; and
- using energy from the secondary energy source to propagate the powered system to the selected handling stage.

24. A system for managing an amount of stored energy in a powered system, said powered system configured to complete a mission from an initial stage to a final stage, said system comprising:
- said powered system including a diesel internal combustion engine and a battery system for storing said stored energy;
- a controller including a memory configured to store a plurality of handling stages;
- wherein said controller is configured to determine the stored energy in the battery system at said initial stage based upon said initial stage and a handling stage positioned between the initial stage and the final stage and selected from among the plurality of handling stages stored in memory; said stored energy being necessary to propagate said powered system from the initial stage to the handling stage upon the occurrence of an anomaly in said diesel internal combustion engine.

* * * * *